US010837914B2

(12) United States Patent
Klein et al.

(10) Patent No.: US 10,837,914 B2
(45) Date of Patent: Nov. 17, 2020

(54) IMPLEMENT ANALYZING DEVICE AND METHOD FOR UTILIZING THE SAME

(71) Applicant: Neogen Corporation, Lansing, MI (US)

(72) Inventors: Frank Eric Klein, Howell, MI (US); Andrew John Wheeler, Hollis Center, ME (US); Andrew John DenHartigh, Lansing, MI (US); William Hoerner, Lansing, MI (US); Nathaniel Banner, Lansing, MI (US); Damon Borich, Austin, TX (US); Andrea Grbavac, Austin, TX (US); Alejandro Silveyra, Austin, TX (US); Michelle Silveyra, Austin, TX (US); Zwckxally Obregon, Cedar Creek, TX (US)

(73) Assignee: NEOGEN CORPORATION, Lansing, MI (US)

( * ) Notice: Subject to any disclaimer, the term of this patent is extended or adjusted under 35 U.S.C. 154(b) by 66 days.

(21) Appl. No.: 15/488,793

(22) Filed: Apr. 17, 2017

(65) Prior Publication Data
US 2018/0180552 A1   Jun. 28, 2018

Related U.S. Application Data

(60) Provisional application No. 62/439,568, filed on Dec. 28, 2016.

(51) Int. Cl.
*G01N 21/78* (2006.01)
*G01N 35/00* (2006.01)
(Continued)

(52) U.S. Cl.
CPC ............ *G01N 21/78* (2013.01); *B01L 3/5023* (2013.01); *G01N 1/38* (2013.01);
(Continued)

(58) Field of Classification Search
None
See application file for complete search history.

(56) References Cited

U.S. PATENT DOCUMENTS

| 657,080 A | 9/1900 | Belden |
| 4,099,920 A | 7/1978 | Heiss |

(Continued)

FOREIGN PATENT DOCUMENTS

| EP | 0155747 A1 | 10/1985 |
| EP | 0299428 B2 | 1/2004 |

(Continued)

OTHER PUBLICATIONS

Aug. 8, 2017 International Search Report and Written Opinion for PCT/US2017/027890.

(Continued)

*Primary Examiner* — Kathryn Wright
(74) *Attorney, Agent, or Firm* — Honigman LLP; Douglas H. Siegel; Jonathan P. O'Brien

(57) ABSTRACT

An implement analyzing device that is sized for receiving more than one fluid retainer cartridge assembly is disclosed. The implement analyzing device includes a support member, a housing, a cartridge receiver, at least one cartridge heater, an imaging device and an implement analyzing device integrated circuit. The cartridge receiver is disposed within a cavity in the implement analyzing device and defines at least one cartridge viewing window. At least one cartridge heater disposed within the cavity and connected to the cartridge receiver. The imaging device is disposed within the cavity and arranged opposite the at least one cartridge viewing window. The implement analyzing device integrated circuit is communicatively coupled to the at least one cartridge heater and the imaging device.

27 Claims, 26 Drawing Sheets

(51) Int. Cl.
*G01N 1/38* (2006.01)
*B01L 3/00* (2006.01)
G01N 21/84 (2006.01)
G01N 21/77 (2006.01)

(52) U.S. Cl.
CPC .......... *G01N 35/00584* (2013.01); *B01L 2200/0621* (2013.01); *B01L 2200/0689* (2013.01); *B01L 2300/042* (2013.01); *B01L 2300/0681* (2013.01); *B01L 2300/087* (2013.01); *B01L 2300/0825* (2013.01); *G01N 21/8483* (2013.01); *G01N 2021/7759* (2013.01); *G01N 2035/00346* (2013.01)

(56) References Cited

U.S. PATENT DOCUMENTS

| | | |
|---|---|---|
| 4,353,868 A | 10/1982 | Joslin et al. |
| 4,409,988 A | 10/1983 | Greenspan |
| 4,599,219 A * | 7/1986 | Cooper .............. G01N 33/4905 356/39 |
| 4,770,853 A | 9/1988 | Bernstein |
| 4,857,454 A | 8/1989 | Freundlich et al. |
| 4,920,046 A | 4/1990 | McFarland et al. |
| 5,108,896 A | 4/1992 | Philo et al. |
| 5,158,869 A | 10/1992 | Pouletty et al. |
| 5,168,908 A | 12/1992 | Boyum |
| 5,223,401 A | 6/1993 | Foltz et al. |
| 5,238,649 A | 8/1993 | Nason |
| 5,424,220 A | 6/1995 | Goerlach-Graw et al. |
| 5,726,010 A | 3/1998 | Clark |
| 5,726,013 A | 3/1998 | Clark |
| 5,766,962 A | 6/1998 | Childs et al. |
| D405,539 S | 2/1999 | Poissant et al. |
| 5,874,216 A | 2/1999 | Mapes |
| 5,962,339 A | 10/1999 | Midgely |
| 5,985,675 A | 11/1999 | Charm et al. |
| D419,439 S | 1/2000 | Markovsky et al. |
| D424,956 S | 5/2000 | von Buelow et al. |
| 6,124,585 A | 9/2000 | Riedel et al. |
| 6,136,610 A | 10/2000 | Polito et al. |
| 6,207,369 B1 | 3/2001 | Wohlstadter et al. |
| 6,319,466 B1 | 11/2001 | Markovsky et al. |
| 6,372,516 B1 | 4/2002 | Sun |
| 6,514,769 B2 | 2/2003 | Lee |
| 6,524,804 B2 | 2/2003 | Degelaen et al. |
| 6,663,833 B1 | 12/2003 | Stave et al. |
| 7,044,919 B1 | 5/2006 | Catt et al. |
| 7,097,983 B2 | 8/2006 | Markovsky et al. |
| 7,172,897 B2 | 2/2007 | Blackburn et al. |
| 7,267,799 B1 | 9/2007 | Borich et al. |
| D571,475 S | 6/2008 | Sjo-Gaber et al. |
| 7,462,464 B1 | 12/2008 | Langeveld et al. |
| 7,558,259 B2 | 7/2009 | Eden |
| D612,514 S | 3/2010 | Johnston et al. |
| 7,785,899 B2 | 8/2010 | Saul et al. |
| 7,803,322 B2 | 9/2010 | Borich et al. |
| 7,879,624 B2 | 2/2011 | Sharrock |
| 7,897,365 B2 | 3/2011 | Salter et al. |
| 8,005,280 B2 | 8/2011 | Mott et al. |
| D647,209 S | 10/2011 | Muller et al. |
| 8,106,155 B2 | 1/2012 | Degelaen et al. |
| D682,432 S | 5/2013 | Khan et al. |
| 8,446,463 B2 | 5/2013 | Fleming et al. |
| 8,470,609 B2 | 6/2013 | Chen |
| 8,475,731 B2 | 7/2013 | Abraham et al. |
| 8,476,064 B2 | 7/2013 | Salter et al. |
| 8,524,501 B2 | 9/2013 | Adams |
| 8,698,881 B2 | 4/2014 | Fleming et al. |
| 8,848,988 B2 | 9/2014 | Plickert et al. |
| D717,459 S | 11/2014 | Lin et al. |
| 8,883,489 B2 | 11/2014 | Pang et al. |
| 9,008,373 B2 | 4/2015 | Markovsky et al. |
| 9,052,297 B2 | 6/2015 | Jakubowicz et al. |
| 9,057,724 B2 | 6/2015 | Saul |
| 9,063,137 B2 | 6/2015 | Saul et al. |
| D737,702 S | 9/2015 | Selberg et al. |
| D746,999 S | 1/2016 | Jonsson et al. |
| D759,253 S | 6/2016 | Bar-Or et al. |
| D762,860 S | 8/2016 | He et al. |
| 9,488,657 B2 | 11/2016 | Graham et al. |
| D828,574 S | 9/2018 | Fujiwara et al. |
| 2002/0127623 A1 | 9/2002 | Minshull et al. |
| 2002/0150501 A1 | 10/2002 | Robertson et al. |
| 2003/0207442 A1 | 11/2003 | Markovsky et al. |
| 2004/0096356 A1 | 5/2004 | Degelaen et al. |
| 2005/0036148 A1 | 2/2005 | Phelan |
| 2005/0052646 A1 | 3/2005 | Wohlstadter et al. |
| 2005/0112024 A1 | 5/2005 | Guo et al. |
| 2005/0220668 A1 | 10/2005 | Coville |
| 2005/0227370 A1 | 10/2005 | Ramel et al. |
| 2006/0066850 A1 | 3/2006 | Kimura |
| 2006/0115896 A1 | 6/2006 | Wong et al. |
| 2006/0160205 A1 * | 7/2006 | Blackburn .......... B01F 13/0059 435/287.2 |
| 2006/0292036 A1 | 12/2006 | Gould et al. |
| 2007/0110623 A1 | 5/2007 | Liu |
| 2008/0019887 A1 | 1/2008 | Lohmann et al. |
| 2008/0026451 A1 | 1/2008 | Braman et al. |
| 2008/0031779 A1 | 2/2008 | Polito et al. |
| 2008/0081002 A1 | 4/2008 | Petruno et al. |
| 2008/0295831 A1 | 12/2008 | Svehaug et al. |
| 2009/0023201 A1 | 1/2009 | Hongo et al. |
| 2009/0098022 A1 | 4/2009 | Tokhtuev et al. |
| 2009/0269760 A1 | 10/2009 | Samadpour |
| 2010/0012490 A1 | 1/2010 | Hsu |
| 2010/0055721 A1 | 3/2010 | Lambert et al. |
| 2010/0151460 A1 | 6/2010 | Winther |
| 2010/0267049 A1 | 10/2010 | Rutter et al. |
| 2011/0008880 A1 | 1/2011 | Uehata et al. |
| 2011/0171754 A1 | 7/2011 | Redmond et al. |
| 2011/0255756 A1 | 10/2011 | Harris et al. |
| 2012/0088230 A1 | 4/2012 | Givens et al. |
| 2012/0220051 A1 | 8/2012 | Yin et al. |
| 2013/0006146 A1 | 1/2013 | Vemalarajah |
| 2013/0280698 A1 | 10/2013 | Propper et al. |
| 2013/0309778 A1 | 11/2013 | Lowe et al. |
| 2014/0057362 A1 | 2/2014 | Markovsky et al. |
| 2014/0120556 A1 | 5/2014 | Moll et al. |
| 2014/0138260 A1 | 5/2014 | Briman |
| 2014/0154792 A1 | 6/2014 | Moynihan et al. |
| 2014/0271362 A1 | 9/2014 | Markovsky et al. |
| 2014/0334980 A1 | 11/2014 | Graham et al. |
| 2015/0004717 A1 | 1/2015 | McDevitt et al. |
| 2015/0140681 A1 | 5/2015 | Meng et al. |
| 2015/0276613 A1 | 10/2015 | Markovsky |
| 2016/0103075 A1 | 4/2016 | Borich et al. |
| 2016/0129445 A1 | 5/2016 | Corey et al. |
| 2016/0158746 A1 | 6/2016 | Taylor et al. |
| 2016/0187239 A1 | 6/2016 | Givens et al. |
| 2016/0310948 A1 | 10/2016 | Nowakowski et al. |
| 2017/0199152 A1 | 7/2017 | Briman |
| 2017/0370914 A1 | 12/2017 | Kasda et al. |

FOREIGN PATENT DOCUMENTS

| | | |
|---|---|---|
| EP | 1095270 B2 | 11/2010 |
| GB | 2460956 B | 11/2010 |
| GB | 2483077 A | 2/2012 |
| WO | 2006073500 A2 | 7/2006 |
| WO | 2009038798 A1 | 3/2009 |
| WO | 2011140476 A1 | 11/2011 |
| WO | 2012027583 A2 | 3/2012 |
| WO | 2012145730 A2 | 10/2012 |
| WO | 2013116847 A1 | 8/2013 |
| WO | 2014126918 A1 | 8/2014 |
| WO | 2015017591 A1 | 2/2015 |
| WO | 2016203019 A1 | 12/2016 |

OTHER PUBLICATIONS

Sep. 6, 2017 International Search Report and Written Opinion for PCT/US2017/027863.

(56) References Cited

OTHER PUBLICATIONS

Alere™ Reader, 7 pages, [date unknown].
Alexeter Techologies LLC "The Defender TSR™", 2 pages, believed to be publicly available before Apr. 17, 2016.
Charm EZ Lite brochure, May 2015, 2 pages.
Charm EZ brochure, Jun. 2015, 4 pages.
Charm EZ-M brochure, Sep. 2015, 4 pages.
Envirologix QuickComb product insert, Rev. Jan. 7, 2016, 6 pages.
ESEQuant Lateral Flow Reader, 3 pages, believed to be publicly available before Apr. 17, 2016.
IDEXX SNAPshot DSR Reader Operator's Guide, 2008, 100 pages.
Integrated EZ Split Key Cup, Product Training Procedures, 2012, 24 pages.
Neogen Corporation's User's Guide for Reveal AccuScan III, Nov. 2010, 9 pages.
Neogen Corporation's presentation regarding AccuScan Gold, Nov. 2015, 21 pages.
Neogen Corporation's user guide presentation regarding AccuScan Pro, Aug. 2012, 13 pages.
Neogen Corporation's product and directions for use regarding Reveal Q+ product line, 2014, 2 pages.
2007 Neogen Corporation's Product Brochure for Reveal AccuScan III, 2 pages.
2012 Neogen Corporation's Product Brochure for AccuScan Pro, 1 page.
2014 Neogen Corporation's AccuScan Pro User Manual, 14 pages.
2014 Neogen Corporation's Product Brochure for AccuScan Gold, 2 pages.
2015 Neogen Corporation's AccuScan Gold Manual, 12 pages.
Photographs of Accuscan Gold device, 4 pages, publicly available before Apr. 17, 2016.
Photographs of Accuscan Pro device, 4 pages, publicly available before Apr. 17, 2016.
Ploughshare Biodetection device, believed to be publicly available before Apr. 17, 2016, 1 page.
Reveal Sciences CareType™ Analysis System, 2 pages, 2009.
Siemens Medical Solutions USA, Inc.'s "Clinitek Status+ Urine Analyzer", 4 pages, believed to be publicly available before Apr. 17, 2016.
Skannex BioAssay Reader Systems™ SkanMulti, 2 pages, believed to be publicly available before Apr. 17, 2016.
Technical Specification of Neogen AccuScan II Reader, Version Jul. 3, 2006, 9 pages.
VICAM's Vertu Lateral Flow Reader, 1 page, believed to be publicly available before Apr. 17, 2016.
U.S. Appl. No. 29/596,011, filed Mar. 3, 2017, Pending.
U.S. Appl. No. 29/600,835, filed Apr. 17, 2017, Pending.
U.S. Appl. No. 15/488,627, filed Apr. 17, 2017, Pending.
U.S. Appl. No. 29/596,011, filed Mar. 3, 2017, U.S. Pat. No. D834,721, Issued.
U.S. Appl. No. 29/600,835, filed Apr. 17, 2017, U.S. Pat. No. D829,337, Issued.
U.S. Appl. No. 15/488,627, filed Apr. 17, 2017, U.S. Pat. No. 9,833,783, Issued.
U.S. Appl. No. 29/653,674, filed Jun. 18, 2018, Allowed.
U.S. Appl. No. 29/666,401, filed Oct. 12, 2018, Pending.

\* cited by examiner

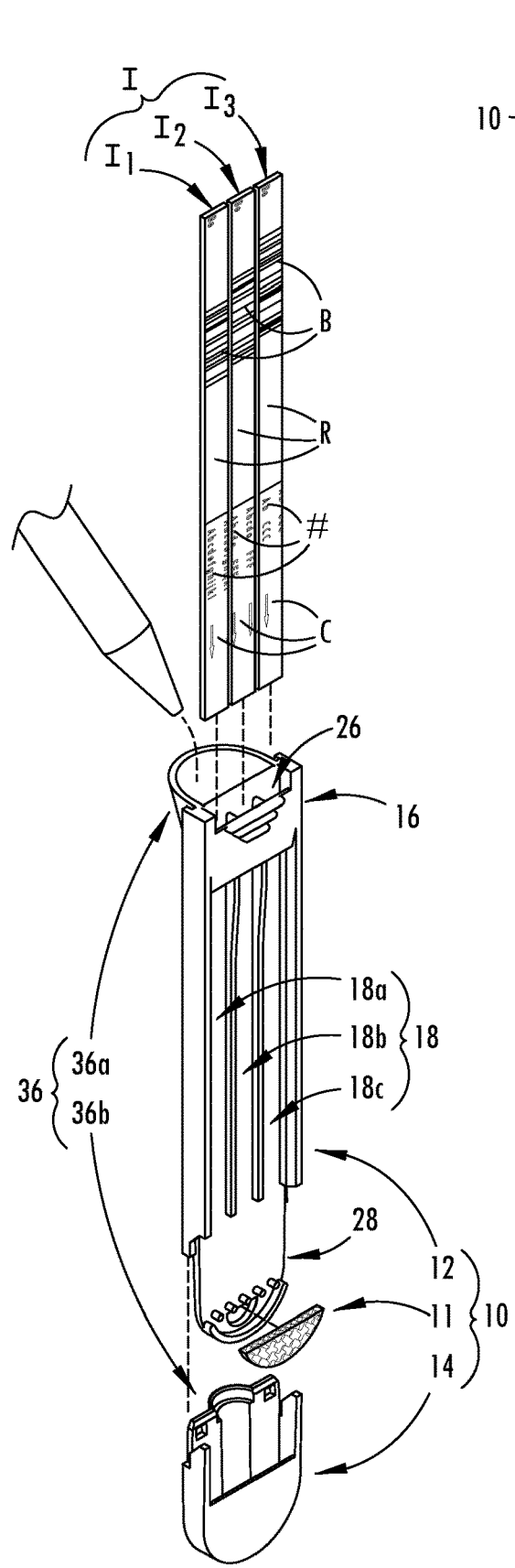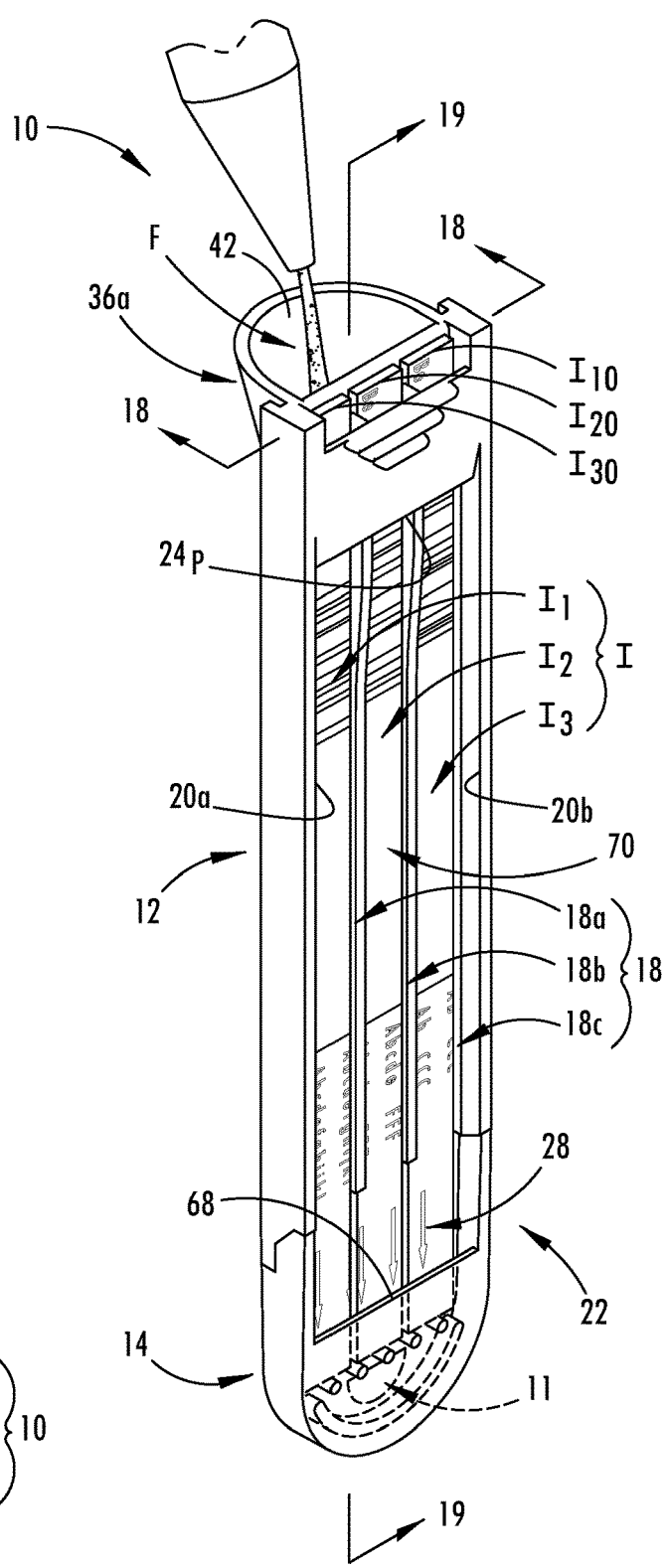
FIG. 1A
FIG. 1B

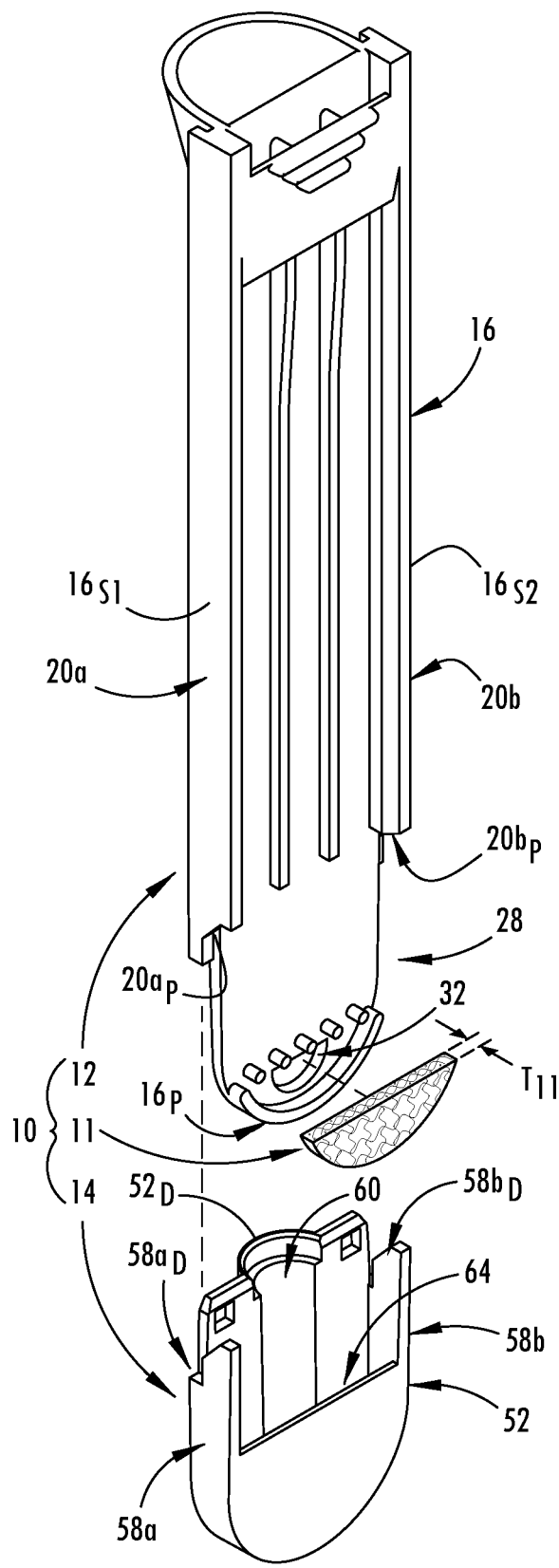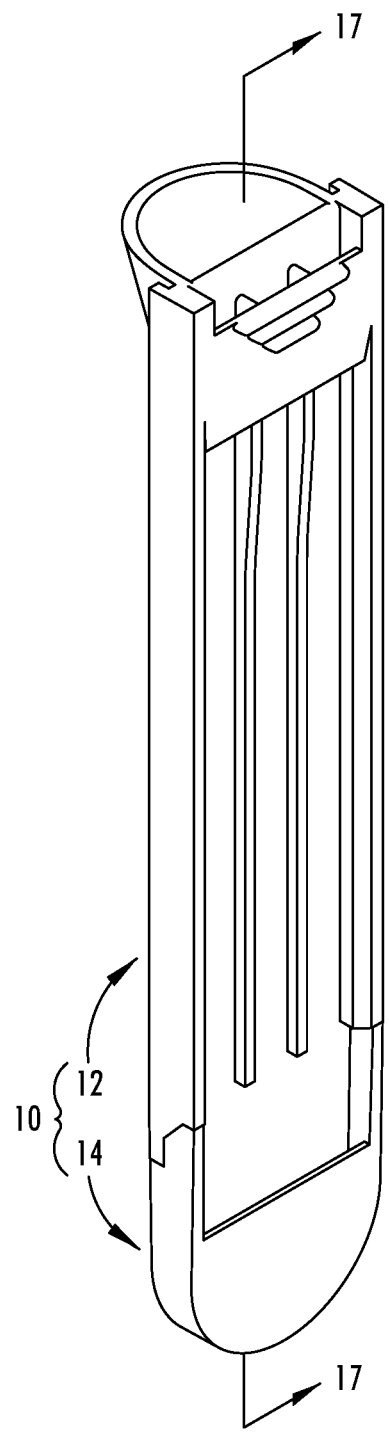
FIG. 14A
FIG. 14B

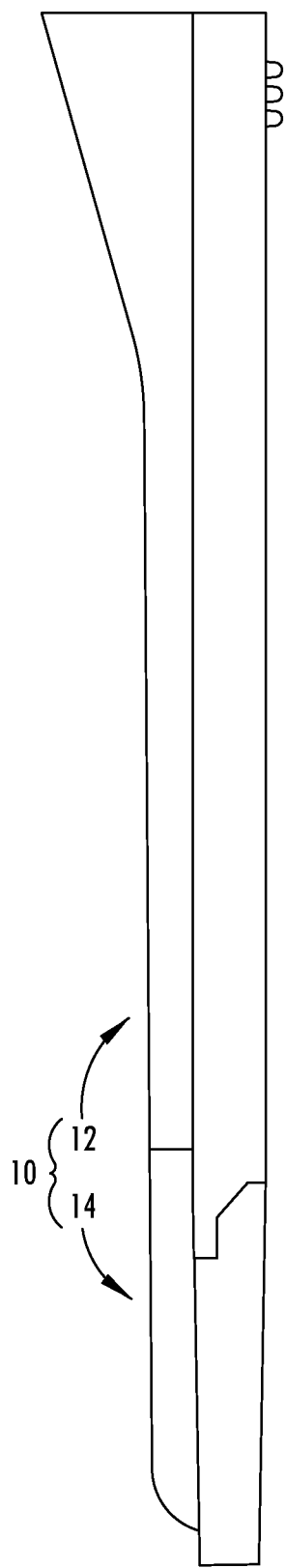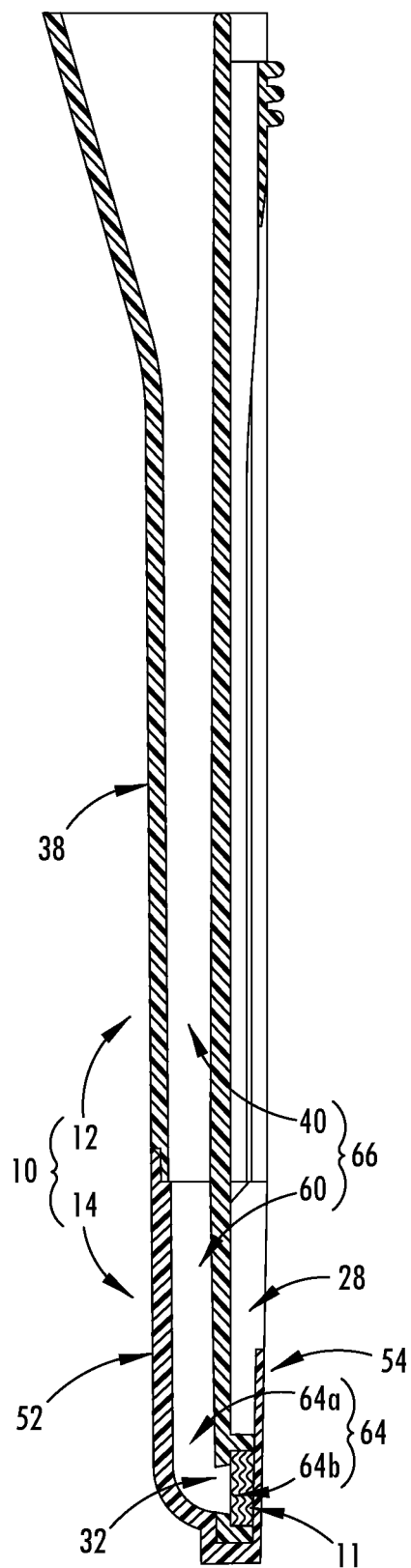
FIG. 16  FIG. 17

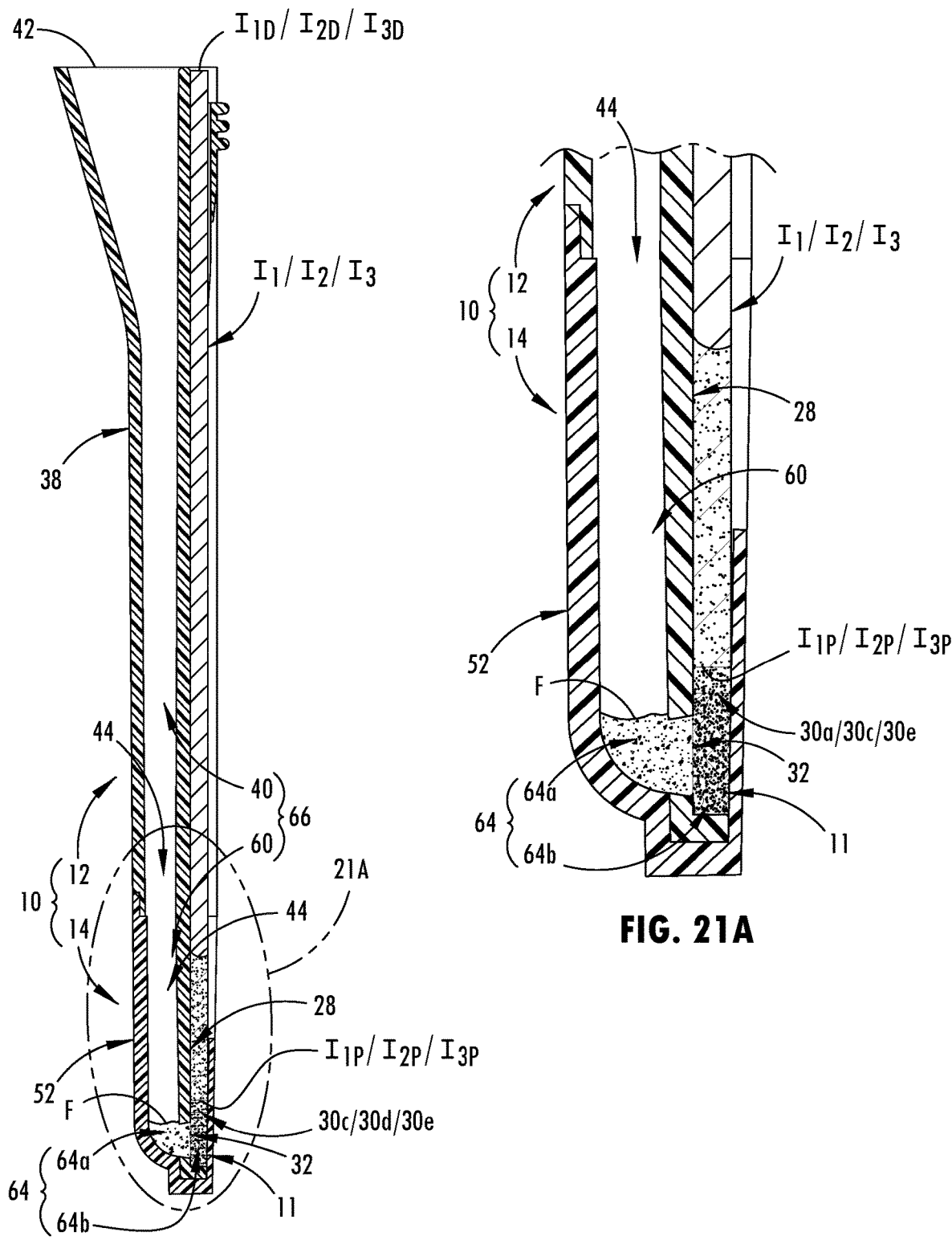

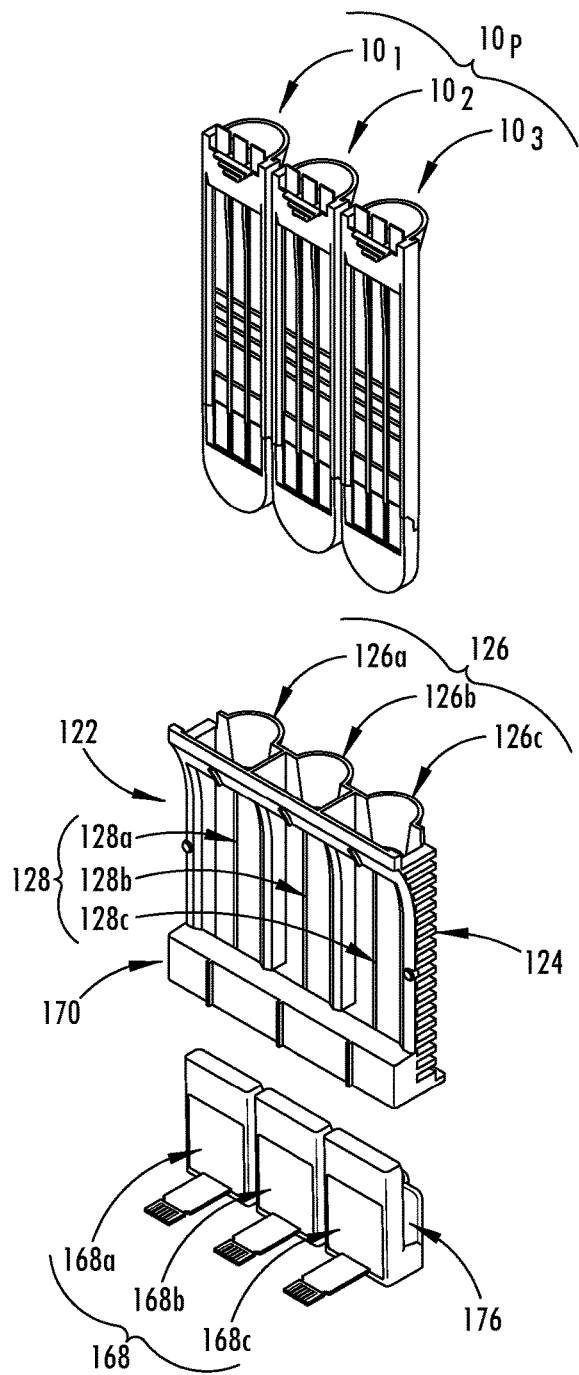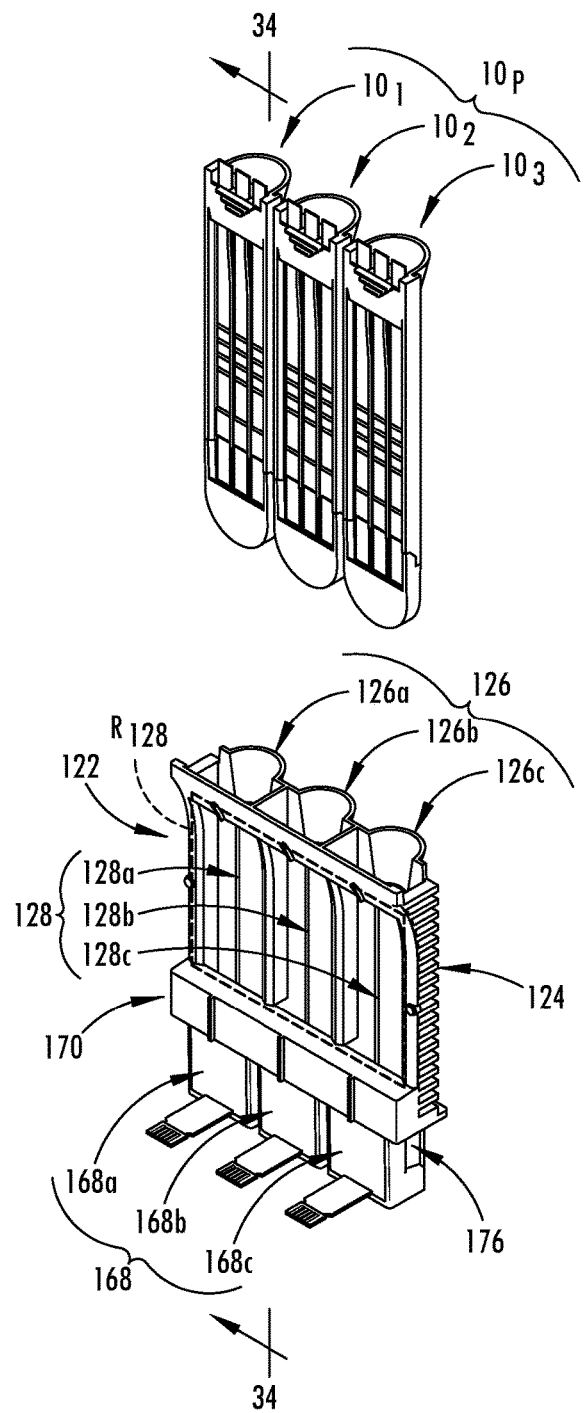
FIG. 32
FIG. 33

IMPLEMENT ANALYZING DEVICE AND METHOD FOR UTILIZING THE SAME

CROSS-REFERENCE TO RELATED APPLICATIONS

This U.S. patent application claims priority to U.S. Provisional Application 62/439,568 filed on Dec. 28, 2016, the disclosure of which is considered part of the disclosure of this application and is hereby incorporated by reference in its entirety.

TECHNICAL FIELD

This disclosure relates to devices and methods for assaying test samples.

BACKGROUND

Implement analyzing device are known. While existing implement analyzing devices perform adequately for their intended purpose, improvements to implement analyzing devices are continuously being sought in order to advance the arts.

SUMMARY

This section provides a general summary of the disclosure, and is not a comprehensive disclosure of its full scope or all of its features.

One aspect of the disclosure provides an implement analyzing device that is sized for receiving more than one fluid retainer cartridge assembly. The implement analyzing device includes a support member, a housing, a cartridge receiver, at least one cartridge heater, an imaging device and an implement analyzing device integrated circuit. The housing is connected to the support member. Each of the support member and the housing defines an outer surface and an inner surface. The inner surface of each of the support member and the housing form a cavity. The cartridge receiver is disposed within the cavity and connected to the inner surface of one or both of the support member and the housing. The cartridge receiver defines at least one cartridge viewing window. The at least one cartridge heater is disposed within the cavity and connected to the cartridge receiver. The imaging device is disposed within the cavity and arranged opposite the at least one cartridge viewing window. The implement analyzing device integrated circuit communicatively coupled to the at least one cartridge heater and the imaging device. The implement analyzing device integrated circuit includes data processing hardware that executes instructions stored on memory hardware for operating the at least one cartridge heater and the imaging device.

Implementations of the disclosure may include one or more of the following optional features. For example, the cartridge receiver includes a body defining at least one first opening and at least one second opening. The at least one first opening formed by the body of the cartridge receiver is aligned with a cartridge receiver passage extending through the housing.

In some examples, the at least one cartridge heater is defined by a body that includes: a base portion; a front portion; and a rear portion. Each of the base portion, the front portion and the rear portion is defined by a cartridge supporting surface. The cartridge supporting surface of each of the base portion and the front portion are defined by a substantially flat surface. The cartridge supporting surface of the rear portion includes a substantially flat surface that is interrupted by a curved or arcuate surface portion.

In some instances, the at least one first opening is defined by: a first cartridge receiving opening; a second cartridge receiving opening; and a third cartridge receiving opening.

In some implementations, the at least one cartridge heater may include: a first cartridge heater; a second cartridge heater; and a third cartridge heater. The first cartridge heater corresponds to, is located opposite and axially aligned with the first cartridge receiving opening of the at least one first opening. The second cartridge heater corresponds to, is located opposite and axially aligned with the second cartridge receiving opening of the at least one first opening. The third cartridge heater corresponds to, is located opposite and axially aligned with the third cartridge receiving opening of the at least one first opening.

In some examples, each of the first cartridge heater, the second cartridge heater and the third cartridge heater are connected to the implement analyzing device integrated circuit. The implement analyzing device integrated circuit selectively activates each of the first cartridge heater, the second cartridge heater and the third cartridge heater.

In some implementations, the front portion and the rear portion of the body are not connected by side portions.

In some configurations, the implement analyzing device further includes: a fan or a temperature sensor. The fan may be located within the cavity and is connected to the implement analyzing device integrated circuit. The temperature sensor is located within the cavity and is connected to the implement analyzing device integrated circuit.

In other configurations, the implement analyzing device further includes: an imaging device integrated circuit connected to the imaging device. The imaging device integrated circuit is communicatively-coupled to the implement analyzing device integrated circuit.

In yet other configurations, the implement analyzing device further includes: a plurality of light sources arranged within the cavity and connected to the imaging device integrated circuit. The plurality of light sources are directed toward the at least one cartridge viewing window.

In some examples, the imaging device integrated circuit independently operates each light source of the plurality of light sources. In other examples, the plurality of light sources are light emitting diode light sources.

In some instances, the imaging device is aligned with a region of the at least one cartridge viewing window.

In some implementations, the imaging device is a complementary metal oxide semiconductor (CMOS) sensor.

In some examples, one or both of the support member and the housing define a plurality of passages extending through the support member or the housing. The plurality of passages may include a user interface passage that is sized for permitting access to a user interface. The user interface is communicatively-coupled to the implement analyzing device integrated circuit.

In some instances, the user interface is a capacitive touch touchscreen.

In some implementations, the plurality of passages include a data input passage that is sized for permitting access to an optical scanner. The optical scanner is communicatively-coupled to the implement analyzing device integrated circuit. In other examples, the plurality of passages includes one or more data input/output passages that is sized for permitting access to one or more universal serial bus ports, one or more secure digital card ports, or an Ethernet port. In yet other examples, the one or more universal serial bus ports, the one or more secure digital card ports, or the Ethernet port is communicatively-coupled to the implement analyzing device integrated circuit. In some instances, the plurality of passages includes one or more power passages for permitting insertion of a power cord to communicatively couple the implement analyzing device integrated circuit to a power source.

In an example, the implement analyzing device integrated circuit includes data processing hardware and memory hardware.

Another aspect of the disclosure provides a method. The method includes the step of obtaining an implement analyzing device that includes: an opening formed through a cartridge receiver; data processing hardware; and an imaging device in communication with the data processing hardware. The method also includes the step of obtaining one or more test strip assays. The test strip assays are configured to chemically react with a chemical analyte after contact with a fluid. The method also includes the step of inserting the one or more test strip assays into the cartridge receiver and receiving at the data processing hardware: image data from the imaging device. The imaging device captures the image data within a field of view directed toward the opening formed through the cartridge receiver. The method also includes the step of detecting, by the data processing hardware, the one or more test strip assays received by the cartridge receiver based on the image data and obtaining by the data processing hardware: test information associated with each detected test strip assay. For each detected test strip assay, the method includes executing by the data processing hardware an analysis routine on the corresponding test strip assay based on the corresponding test information. The analysis routine is configured to: analyze color and/or intensity information within a result region located on the corresponding test strip assay based on the image data received from the imaging device. The method also includes determining a test result indicating a presence and/or concentration of the chemical analyte within the fluid based on the analyzed color and/or intensity information.

Implementations of the disclosure may include one or more of the following optional features. For example, the method may further include the step of: providing one or more fluid retainer cartridge assemblies. The one or more fluid retainer cartridge assemblies is configured to retain the fluid and fluid retainer cartridge assemblies. The method also includes the step of: inserting one or more test strip assays in the one or more fluid retainer cartridge assemblies. The method also includes the step of: inserting the one or more fluid retainer cartridge assemblies into the cartridge receiver.

In some implementations, the one or more fluid retainer cartridge assemblies include two fluid retainer cartridge assemblies and the one or more test strip assays include two test strip assays. The inserting step includes inserting one strip assay into one of the two fluid retainer cartridge assemblies and inserting the other strip assay into the other of the fluid retainer cartridge assemblies.

In some examples, the method further includes the steps of: after obtaining the test information associated with the one or more test strip assays inserted in the one or more fluid retainer cartridge assemblies, measuring, by the data processing hardware, a level of the fluid retained by the corresponding inserted fluid retainer cartridge assembly; and determining, by the data processing hardware, whether the measured level of the fluid is at least a threshold fluid level. The threshold fluid level is specified by the test information.

The method also includes: in response to determining that the measured level of the fluid is at least the threshold fluid level, executing the analysis routine on each detected test strip assay retained by the corresponding inserted fluid retainer cartridge assembly.

In some instances, the method further includes the step of: after obtaining the test information associated with the one or more test strip assays inserted in the one or more fluid retainer cartridge assemblies, initiating, by the data processing hardware, a timer in response to determining that the measured level of the fluid is at least the threshold fluid level. The analysis routine determines the test result associated with each detected test strip assay retained by the corresponding inserted fluid retainer cartridge assembly when the timer satisfies an analysis duration, the analysis duration specified by the test information.

In some examples, the method further includes the steps of: after obtaining the test information associated with the one or more test strip assays inserted in the one or more fluid retainer cartridge assemblies, selectively activating, by the data processing hardware, at least one heating device in communication with the data processing hardware and thermally coupled to a corresponding inserted fluid retainer cartridge assembly based on a desired temperature of the retained fluid, the desired temperature specified by the test information associated with at least one detected test strip assay retained by the corresponding inserted fluid retainer cartridge assembly; and selectively deactivating, by the data processing hardware, the corresponding heating device after a prescribed period of time specified by the test information.

In some instances, selectively activating at least one heating device includes selectively activating at least two heating devices independently from one another, one heating device thermally coupled to inserted fluid retainer cartridge assembly, the other heating device thermally coupled to the other inserted fluid retainer cartridge assembly.

In some implementations, obtaining test information associated with each detected test strip essay includes: analyzing the image data received from the imaging device to identify one or more indicia markings disposed on each detected test strip assay; determining a unique test strip identifier associated with each detected test strip assay based on identified indicia markings; retrieving from memory hardware in communication with the data processing hardware, the test information associated with each detected test strip essay using the corresponding unique test strip identifier.

In some instances, the one or more indicia markings is selected from barcode data, alphanumerical data, and color data.

In some implementations, obtaining the test information associated with each detected test strip essay includes: receiving barcode data from an optical scanner in communication with the data processing hardware, the optical scanner configured to scan the barcode data from each detected test strip assay; determining a unique test strip identifier associated with each detected test strip assay based on the scanned barcode data; and retrieving from memory hardware in communication with the data processing hardware, the test information associated with each detected test strip essay using the corresponding unique test strip identifier.

In some examples, the analysis routine analyzes intensity information includes line intensity of one or more result lines superimposed in the result region of the corresponding test strip assay.

In some instances, the analysis routine is further configured to: determine a rate of change in line intensity of the one or more result lines; and predict the test result indicating the presence and/or concentration of the chemical analyte within the fluid based on the rate of change in line intensity.

In some examples, executing the analysis routine on the corresponding test strip assay includes: executing a result line centering routine on the corresponding test strip assay to center one or more result lines superimposed in the result region of the corresponding test strip assay, the result line centering routine configured to: identify the one or more result lines superimposed in the result region based on the image data received from the imaging device; and adjust a position of the one or more result lines to align with result line centering information specified, the line centering information specified by the test information associated with the corresponding test strip assay.

In some implementations, the method further includes: executing, by the data processing hardware, a graphical user interface on a screen in communication with the data processing hardware. The graphical user interface is configured to display the test result for each detected test strip assay.

In some instances, executing the analysis routine includes: executing a first analysis routine on a first detected test strip assay and a second analysis routine on a second detected test strip assay.

In some examples, the first and second detected test strip assays are retained by a single fluid retainer cartridge assembly inserted into the cartridge receiver.

In some implementations, the first detected test strip assay is retained by a first fluid retainer cartridge assembly inserted into the cartridge receiver and the second detected test strip assay is retained by a second fluid retainer cartridge assembly inserted into the cartridge receiver.

In some instances, the method further includes executing a third analysis routine on a third detected test strip assay simultaneously with the first and second analysis routines.

In some examples, the first, second and third detected test strip assays are all retained by a single fluid retainer cartridge assembly inserted into the cartridge receiver.

In some implementations, the first detected test strip assay is retained by a first fluid retainer cartridge assembly inserted into the cartridge receiver, the second detected test strip assay is retained by a second fluid retainer cartridge assembly inserted into the cartridge receiver, and the third detected test strip assay is retained by a third fluid retainer cartridge assembly inserted into the cartridge receiver.

Yet another aspect of the disclosure provides a method. The method includes: receiving, at data processing hardware, image data from an imaging device in communication with the data processing hardware. The imaging device captures the image data within a field of view directed toward an opening formed through a cartridge receiver. The method also includes detecting, by the data processing hardware, one or more test strip assays received by the cartridge receiver based on the image data. The test strip assays configured to chemically react with a chemical analyte after contact with a fluid. The method also includes obtaining, by the data processing hardware, test information associated with each detected test strip assay. For each detected test strip assay, the method includes executing, by the data processing hardware, an analysis routine on the corresponding test strip assay based on the corresponding test information. The analysis routine configured to: analyze color and/or intensity information within a result region located on the corresponding test strip assay based on the image data received from the imaging device; and determine a test result indicating a presence and/or concentration of the chemical analyte within the fluid based on the analyzed color and/or intensity information.

Implementations of the disclosure may include one or more of the following optional features. For example, the detecting the one or more test strip assays received by the cartridge receiver includes detecting the one or more test strip assays retained by one or more fluid retainer cartridge assemblies removably-inserted into the cartridge receiver. Each fluid retainer assembly is configured to retain the fluid and two or more test strip assays.

In some examples, detecting the one or more test strip assays received by the cartridge receiver includes detecting a plurality of test strip assays retained by two or more fluid retainer cartridge assemblies removably-inserted into the cartridge receiver. Each of the two or more fluid retainer cartridge assemblies removably-inserted into the cartridge receiver retaining at least one of the detected plurality of test strip assays.

In some instances, after obtaining the test information associated with each detected test strip assay, the method further includes: for each removably-inserted fluid retainer cartridge assembly: measuring, by the data processing hardware, a level of the fluid retained by the corresponding removably-inserted fluid retainer cartridge assembly; determining, by the data processing hardware, whether the measured level of the fluid is at least a threshold fluid level, the threshold fluid level specified by the test information; and in response to determining the measured level of the fluid is at least the threshold fluid level, executing the analysis routine on each detected test strip assay retained by the corresponding removably-inserted fluid retainer cartridge assembly.

In some implementations, the method further includes: initiating, by the data processing hardware, a timer in response to determining the measured level of the fluid is at least the threshold fluid level. The analysis routine determines the test result associated with each detected test strip assay retained by the corresponding removably-inserted fluid retainer cartridge assembly when the timer satisfies an analysis duration, the analysis duration specified by the test information.

In some examples, after obtaining the test information associated with each detected test strip assay, the method further includes: for each removably-inserted fluid retainer cartridge assembly: selectively activating, by the data processing hardware, at least one heating device in communication with the data processing hardware and thermally coupled to a corresponding removably-inserted fluid retainer cartridge assembly based on a desired temperature of the retained fluid, the desired temperature specified by the test information associated with at least one detected test strip assay retained by the corresponding removably-inserted fluid retainer cartridge assembly; and selectively deactivating, by the data processing hardware, the corresponding heating device after a prescribed period of time specified by the test information.

In some instances, selectively activating at least one heating device includes selectively activating at least two heating devices independently from one another when at least two fluid retainer cartridge assemblies are removably-inserted into the cartridge receiver. Each heating device is thermally coupled to a corresponding removably-inserted fluid retainer cartridge assembly and thermally isolated from the one or more other fluid retainer cartridge assemblies.

In some implementations, obtaining test information associated with each detected test strip essay includes: analyzing the image data received from the imaging device to identify one or more indicia markings disposed on each detected test strip assay; determining a unique test strip identifier associated with each detected test strip assay based on identified indicia markings; and retrieving from memory hardware in communication with the data processing hardware, the test information associated with each detected test strip essay using the corresponding unique test strip identifier.

In some examples, the one or more indicia markings include at least one of barcode data, alphanumerical data, or color data.

In some instances, obtaining the test information associated with each detected test strip essay includes: receiving barcode data from an optical scanning device in communication with the data processing hardware, the optical scanning device configured to scan the barcode data from each detected test strip assay; determining a unique test strip identifier associated with each detected test strip assay based on the scanned barcode data; and retrieving from memory hardware in communication with the data processing hardware, the test information associated with each detected test strip essay using the corresponding unique test strip identifier.

In some implementations, the analysis routine analyzes intensity information includes line intensity of one or more result lines superimposed in the result region of the corresponding test strip assay.

In some examples, the analysis routine is further configured to: determine a rate of change in line intensity of the one or more result lines; and predict the test result indicating the presence and/or concentration of the chemical analyte within the fluid based on the rate of change in line intensity.

In some instances, executing the analysis routine on the corresponding test strip assay includes executing a result line centering routine on the corresponding test strip assay to center one or more result lines superimposed in the result region of the corresponding test strip assay. The result line centering routine configured to: identify the one or more result lines superimposed in the result region based on the image data received from the imaging device; and adjust a position of the one or more result lines to align with result line centering information specified, the line centering information specified by the test information associated with the corresponding test strip assay.

In some examples, after executing the analysis routine on the corresponding test strip assay, the method further includes storing the test result for the corresponding test strip assay in memory hardware in communication with the data processing hardware.

In some implementations, the method further includes executing, by the data processing hardware, a graphical user interface on a screen in communication with the data processing hardware. The graphical user interface is configured to display the test result for each detected test strip assay.

In some instances, executing the analysis routine includes simultaneously executing a first analysis routine on a first detected test strip assay and a second analysis routine on a second detected test strip assay.

In some examples, the first and second detected test strip assays are retained by a single fluid retainer cartridge assembly removably-inserted into the cartridge receiver.

In some implementations, the first detected test strip assay is retained by a first fluid retainer cartridge assembly removably-inserted into the cartridge receiver, and the second detected test strip assay is retained by a second fluid retainer cartridge assembly removably-inserted into the cartridge receiver.

In some instances, the method further includes executing a third analysis routine on a third detected test strip assay simultaneously with the first and second analysis routines.

In some examples, the first, second and third detected test strip assays are all retained by a single fluid retainer cartridge assembly removably-inserted into the cartridge receiver.

In some implementations, the first detected test strip assay is retained by a first fluid retainer cartridge assembly removably-inserted into the cartridge receiver, the second detected test strip assay is retained by a second fluid retainer cartridge assembly removably-inserted into the cartridge receiver, and the third detected test strip assay is retained by a third fluid retainer cartridge assembly removably-inserted into the cartridge receiver.

The details of one or more implementations of the disclosure are set forth in the accompanying drawings and the description below. Other aspects, features, and advantages will be apparent from the description and drawings, and from the claims.

DESCRIPTION OF DRAWINGS

The drawings described herein are for illustrative purposes only of selected configurations and not all possible implementations, and are not intended to limit the scope of the present disclosure.

FIG. 1A is an exploded perspective view of a fluid retainer cartridge assembly and a plurality of implements positioned relative to the fluid retainer cartridge assembly.

FIG. 1B is an assembled perspective view of the fluid retainer cartridge assembly of FIG. 1A and the plurality of implements positioned within the fluid retainer cartridge assembly.

FIG. 14A is a front exploded view of the fluid retainer cartridge assembly of FIG. 1A.

FIG. 14B is a front assembled view of the fluid retainer cartridge assembly of FIG. 14A.

FIG. 16 is a side view of the fluid retainer cartridge assembly of FIG. 14B or FIG. 15B.

FIG. 17 is a cross-sectional view of the fluid retainer cartridge assembly according to line 17-17 of FIG. 14B or FIG. 15B.

FIG. 21 is another cross-sectional view of the fluid retainer cartridge assembly according to FIG. 20.

FIG. 21A is an enlarged view according to line 21A of FIG. 21.

FIG. 32 is an exploded view of a subassembly of the implement analyzing device including the plurality of cartridge heaters of FIG. 31 and a cartridge receiver.

FIG. 33 is an assembled view of the subassembly of FIG. 32.

Like reference symbols in the various drawings indicate like elements.

DETAILED DESCRIPTION

Figure 2:
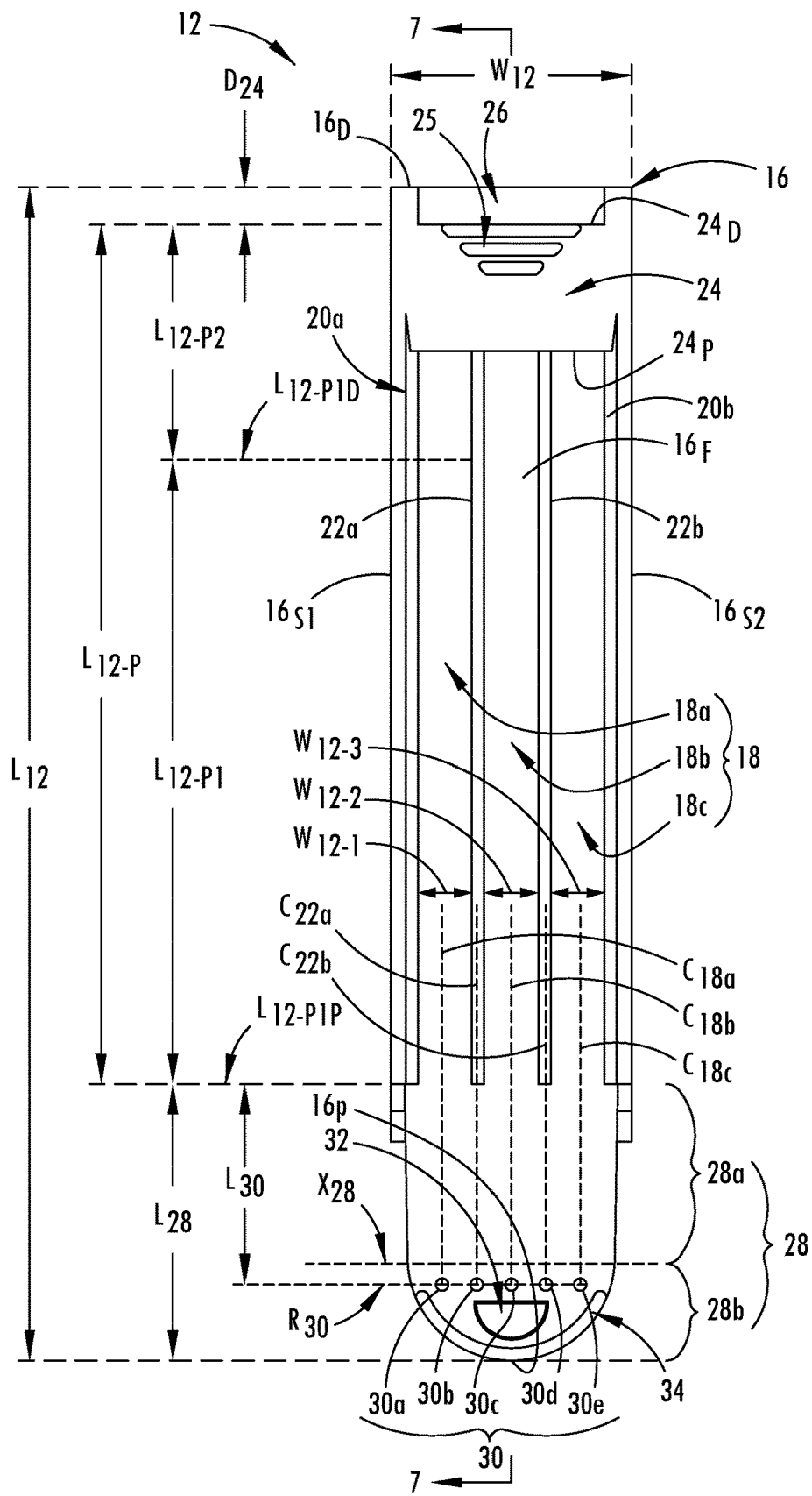
FIG. 2 is a front view of a base portion of the fluid retainer cartridge assembly of FIG. 1A.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

Referring to FIGS. 1A and 1B, a fluid retainer cartridge assembly is shown generally at 10. The fluid retainer cartridge assembly 10 includes a base portion 12 and a cap portion 14 that is fluidly-connected to the base portion 12. The fluid retainer cartridge assembly 10 may optionally include a fluid filter 11 that may be connected to the base portion 12.

As will be explained in greater detail in the following disclosure (at FIGS. 18-22), the base portion 12 and the cap portion 14 collectively retain at least one (e.g., three) implement I (see, e.g., FIGS. 1A-1B) while the base portion 12 guides an amount of fluid F, for example, raw milk (see, e.g., FIG. 1B) into a fluid-receiving void defined by the cap portion 14. If optionally included, the fluid filter 11 may filter the fluid F. Once the fluid F arrives in the fluid-receiving void of the cap portion 14, the fluid F contacts the at least one implement I. In an example, the at least one implement I may be a test strip assay and the fluid F may include a chemical analyte (e.g., a veterinary antibiotic, such as a beta-lactam or tetracycline) that chemically reacts with the at least one test strip assay I. In an example as seen in FIG. 1A, each implement $I_1$, $I_2$, $I_3$ of the plurality of implements I may include indicia markings, such as, for example, one or more of barcode data B, alphanumerical data # (e.g., letters and/or numbers), color data C or the like that may be read by an imaging device 136 (see, e.g., FIGS. 25-26) of an implement analyzing device 100 (see, e.g., FIG. 23) that can monitor, read and analyze the one or more implements I before, during or after being contacted with the fluid F. Preloaded cartridge assemblies 10 may include an identification marker on the cartridge itself that can be interpreted and used to identify the set of tests present. Barcode data B may include one-dimensional or multi-dimensional barcodes.

Although an exemplary fluid F may include, for example, raw milk as described above, other fluids F may be interfaced with the fluid retainer cartridge assembly 10. For example, other exemplary fluids F may include, but is not limited to: blood, saliva, corn fluid or the like. Furthermore, the fluid F may be interfaced with the fluid retainer cartridge assembly 10 at any desirable temperature, such as, for example, room temperature, a temperature that is lower than room temperature (as a result of, for example, cooling or chilling the fluid F) or a temperature that is higher than room temperature (as a result of, for example, warming or heating the fluid F).

Each of the base portion 12 and the cap portion 14 may be formed from a thermoplastic or other material suitable for injection molding, such as, acrylonitrile butadiene styrene (ABS plastic). Other exemplary materials may include polypropylene, polystyrene, nylon, polycarbonate, and thermoplastics infused with polymers (e.g., graphite, carbon fibers, glass-reinforced) to enhance thermal conductivity. The thermoplastic material may promote, for example, sufficient heat transfer of heat from an external heating source in order to warm or heat the fluid F that is disposed within the fluid retainer cartridge assembly 10.

Figure 3:
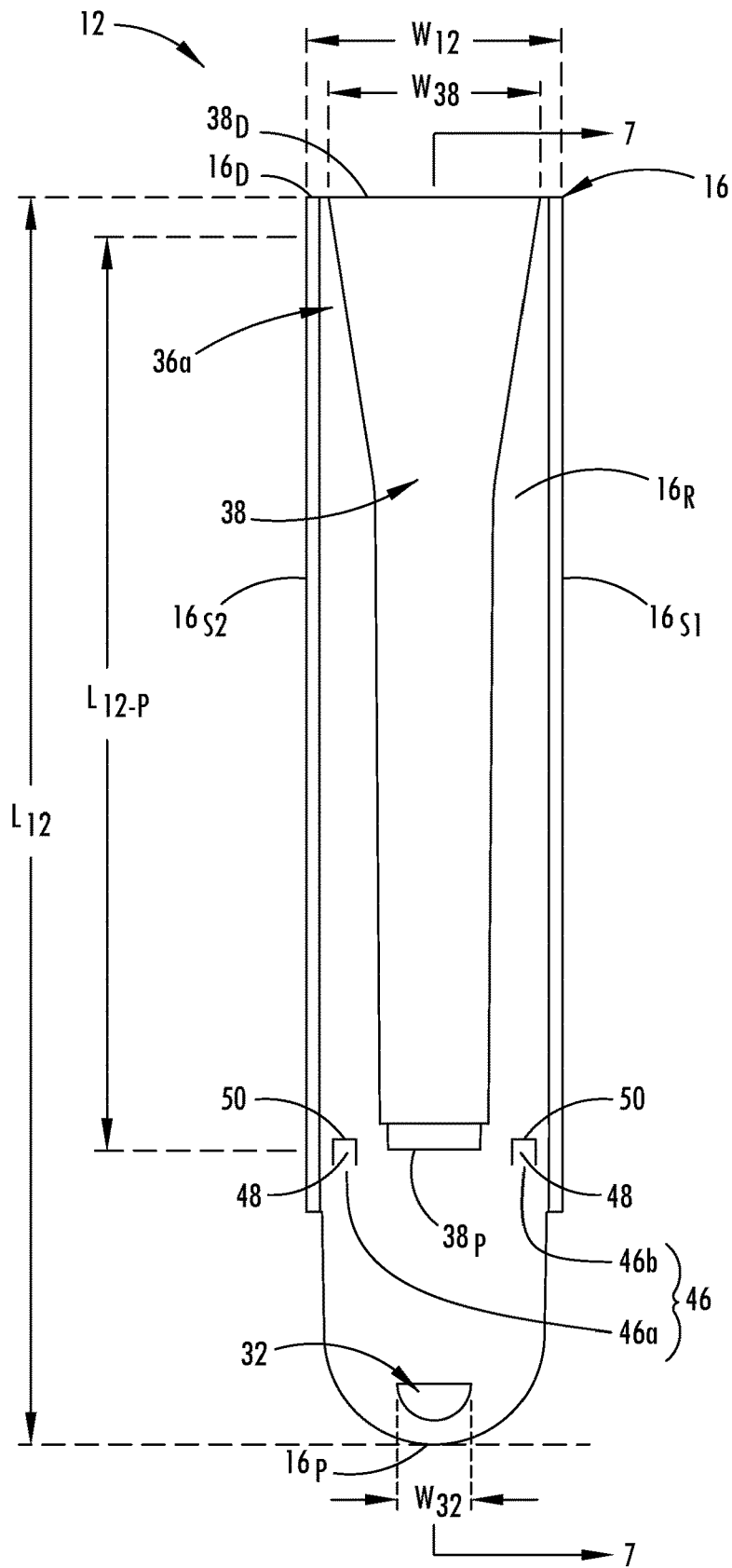
FIG. 3 is a rear view of the base portion of FIG. 2.
Figure 4:
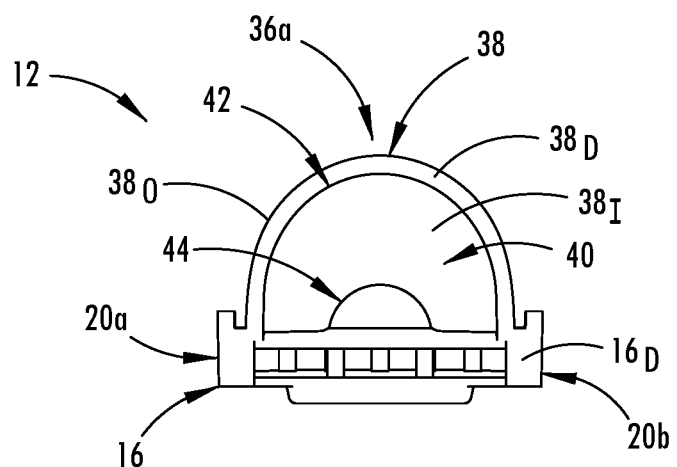
FIG. 4 is a top view of the base portion of FIG. 2.
Figure 5:
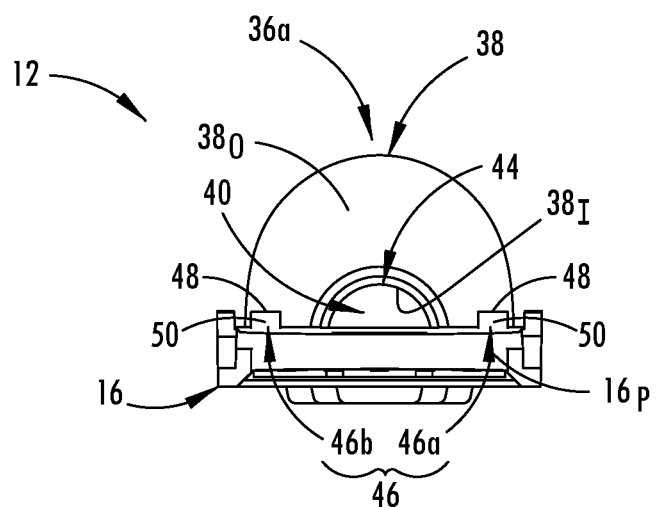
FIG. 5 is a bottom view of the base portion of FIG. 2.
Figure 6:
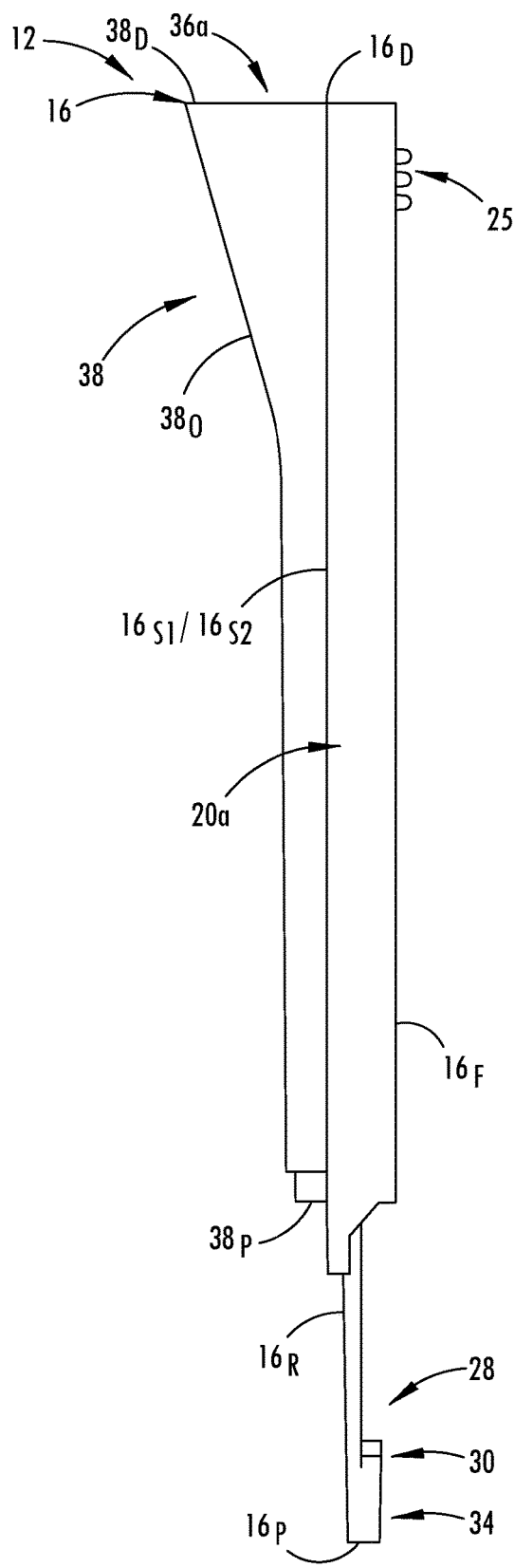
FIG. 6 is a side view of the base portion of FIG. 2.

Referring to FIGS. 2-7, the base portion 12 includes a body 16 that is generally defined by a front surface $16_F$ (see, e.g., FIG. 2), a rear surface $16_R$, (see, e.g., FIG. 3) a distal end surface $16_D$ (see, e.g., FIG. 4), a proximal end surface $16_P$ (see, e.g., FIG. 5), a first side surface $16_{S1}$ (see, e.g., FIG. 6) and a second side surface $16_{S2}$ (see, e.g., FIGS. 3 and 6). As seen in FIGS. 2-3, the base portion 12 is further generally defined by a length $L_{12}$ extending between the distal end surface $16_D$ and the proximal end surface $16_P$. The base portion 12 is yet even further generally defined by a width $W_{12}$ extending between the first side surface $16_{S1}$ and the second side surface $16_{S2}$.

Referring to FIG. 2, the front surface $16_F$ of the body 16 of the base portion 12 generally defines more than one implement-receiving channel 18 (e.g., three implement-receiving channels 18a-18c) extending along a portion $L_{12-P}$ of the length $L_{12}$ of the base portion 12. The more than one implement-receiving channel 18 may be defined by a first sidewall flange 20a, a second sidewall flange 20b, a first rib 22a and a second rib 22b.

The first sidewall flange 20a extends away from the front surface $16_F$ and is arranged proximate the first side surface $16_{S1}$. The second sidewall flange 20b extends away from the front surface $16_F$ and is arranged proximate the second side surface $16_{S2}$. The first rib 22a extends away from the front surface $16_F$ and is arranged proximate the first sidewall flange 20a. The second rib 22b extends away from the front surface $16_F$ and is arranged proximate but spaced-apart from second sidewall flange 20b.

The first sidewall flange 20a is spaced apart from the first rib 22a at a distance equal to a first portion $W_{12-1}$ of the width $W_{12}$ of the base portion 12 for defining a first implement-receiving channel 18a of the more than one implement-receiving channels 18. The first rib 22a is spaced apart from the second rib 18b at a distance equal to a second portion $W_{12-2}$ of the width $W_{12}$ of the base portion 12 for defining a second implement-receiving channel 18b of the more than one implement-receiving channels 18. The second rib 22b is spaced apart from the second sidewall flange 20b at a distance equal to a third portion $W_{12-3}$ of the width $W_{12}$ of the base portion 12 for defining a third implement-receiving channel 18c of the more than one implement-receiving channels 18.

With continued reference to FIG. 2, the front surface $16_F$ of the body 16 of the base portion 12 further defines an implement distal end retainer portion 24. The implement distal end retainer portion 24 extends across the width $W_{12}$ of the base portion 12 and connects the first sidewall flange 20a to the second sidewall flange 20b. Furthermore, the implement distal end retainer portion 24 may be further defined by a distal end $24_D$ and a proximal end $24_P$; the distal end $24_D$ may be arranged at a distance $D_{24}$ away from the distal end surface $16_D$ of the body 16 of the base portion 12 for defining an access port 26 that is sized for permitting insertion of, for example, a user's finger therein for grasping any of the one or more implements I for inserting or removing the one or more implements I from the more than one implement-receiving channels 18. The implement distal end retainer portion 24 may also include a series of friction ribs 25 that may assist a user in grasping the fluid retainer cartridge assembly 10 when inserting or removing the fluid retainer cartridge assembly 10 into/from an implement analyzing device 100 (see, e.g., FIG. 23) that can monitor, read and analyze the one or more implements I before, during or after being contacted with the fluid F.

Figure 7:
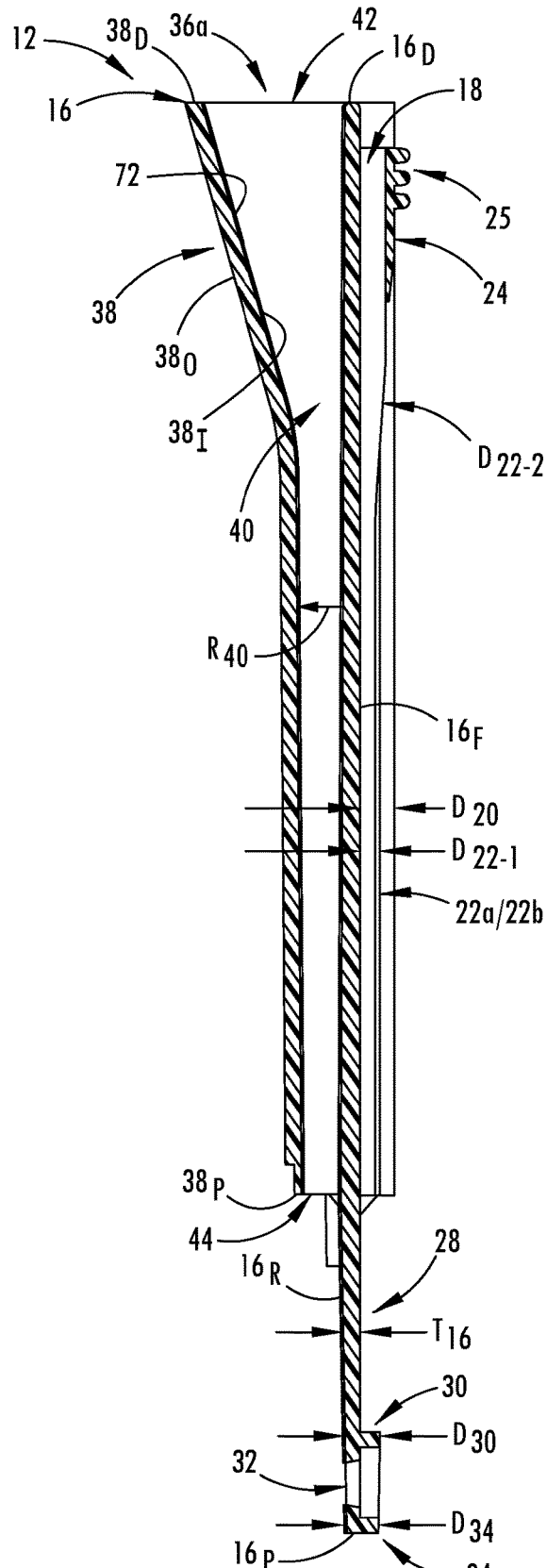
FIG. 7 is a cross-sectional view of the base portion according to line 7-7 of FIG. 2.

With reference to FIGS. 2 and 7, each of the first sidewall flange 20a and the second sidewall flange 20b may extend away from the front surface $16_F$ of the body 16 of the base portion 12 at a substantially constant distance $D_{20}$ (see, e.g., FIG. 7) along the portion $L_{12-P}$ of the length $L_{12}$ of the base portion 12. Each of the first rib 22a and the second rib 22b may extend away from the front surface $16_F$ of the body 16 of the base portion 12 at a substantially constant distance $D_{22-1}$ (see, e.g., FIG. 7) along a first segment $L_{12-P1}$ (see, e.g., FIG. 2) of the portion $L_{12-P}$ of the length $L_{12}$ of the base portion 12. The first segment $L_{12-P1}$ of the portion $L_{12-P}$ of the length $L_{12}$ of the base portion 12 may be bound by a proximal end $L_{12-P1P}$ and a distal end $L_{12-P1D}$. In some examples, each of the first rib 22a and the second rib 22b may extend away from the front surface $16_F$ of the body 16 of the base portion 12 at a progressively-increasing distance $D_{22-2}$ (see, e.g., FIG. 7) from the distal end $L_{12-P1D}$ of the first segment $L_{12-P1}$ of the portion $L_{12-P}$ of the length $L_{12}$ of the base portion 12 along a second segment $L_{12-P2}$ (see, e.g., FIG. 2) of the portion $L_{12-P}$ of the length $L_{12}$ of the base portion 12 toward the proximal end $24_P$ of the implement distal end retainer portion 24.

As seen in FIG. 2, a portion (i.e., tongue portion 28) of the front surface $16_F$ of the body 16 of the base portion 12 does not include any of the first sidewall flange 20a, the second sidewall flange 20b, the first rib 22a and the second rib 22b. In an example as seen in FIG. 1B, when the one or more implements I are interfaced with the fluid retainer cartridge assembly 10, the one or more implements I may extend out of the more than one implement-receiving channels 18 and over the tongue portion 28.

Referring to FIG. 2, the tongue portion 28 may be defined by a length $L_{28}$ extending between the proximal end $L_{12-P1P}$ of the first segment $L_{12-P1}$ of the portion $L_{12-P}$ of the length $L_{12}$ of the base portion 12 and proximal-most/lower-most portion of the proximal end surface $16_P$ of the body 16 of the base portion 12. In some instances, the proximal end surface $16_P$ may include an arcuate shape that partially defines the tongue portion 28. Furthermore, proximal end surface $16_P$ connects (see, e.g., dashed line $X_{28}$ extending across the tongue portion 28) the first side surface $16_{S1}$ to the second side surface $16_{S2}$. Yet even further, as see in FIG. 2, the first side surface $16_{S1}$ is substantially parallel to the second side surface $16_{S2}$ along the length $L_{28}$ of the tongue portion 28. Therefore, in an example, the tongue portion 28 may be generally defined by: (1) a substantially square or rectangular portion 28a defined in part by the first side surface $16_{S1}$ and the second side surface $16_{S2}$ and (2) a substantially 'half moon' portion 28b defined by the proximal end surface $16_P$, which is demarcated from the substantially square or rectangular portion 28a by the dashed line $X_{28}$.

Although the first sidewall flange 20a, the second sidewall flange 20b, the first rib 22a and the second rib 22b do not extend away from the front surface $16_F$ of the body 16 of the base portion 12 defined by the tongue portion 28, a plurality of projections 30 extend away from the front surface $16_F$ of the body 16 of the base portion 12 defined by the tongue portion 28 at a distance $D_{30}$ (see, e.g., FIG. 7). In some implementations, the plurality of projections 30 may be substantially cylindrical (or they may have another shape for evenly distributing and selectively flowing the fluid F, as described below), and may be linearly-arranged in a row (see, e.g., dashed line $R_{30}$ extending across the 'half moon' portion 28b, which is substantially parallel to the dashed line $X_{28}$). Furthermore, the row $R_{30}$ of the plurality of projections 30 may extend from the 'half moon' portion 28b of the tongue portion and may be arranged at a length $L_{30}$ (see, e.g., FIG. 2) away from the proximal end $L_{12-P1P}$ of the first segment $L_{12-P1}$ of the portion $L_{12-P}$ of the length $L_{12}$ of the base portion 12.

In an example, as seen in FIG. 2, the plurality of projections 30 may be defined by a first projection 30a, a second projection 30b, a third projection 30c, a fourth projection 30d and a fifth projection 30e. In some implementations, the plurality of projections 30 including the first-through-fifth projections 30a-30e may be arranged relative to the first-through-third implement-receiving channels 18a-18c as follows: (1) the first projection 30a may be aligned with a center (see, e.g., dashed line $C_{18a}$) of the first portion $W_{12-1}$ of the width $W_{12}$ defining the first implement-receiving channel 18a, (2) the second projection 30b may be aligned with a center (see, e.g., dashed line $C_{22a}$) of the first rib 22a that partially defines each of the first and second implement-receiving channels 18a, 18b, (3) the third projection 30c may be aligned with a center (see, e.g., dashed line $C_{18b}$) of the second portion $W_{12-2}$ of the width $W_{12}$ defining the second implement-receiving channel 18b, (4) the fourth projection 30d may be aligned with a center (see, e.g., dashed line $C_{22b}$) of the second rib 22b that partially defines each of the second and third implement-receiving channels 18b, 18c and (5) the fifth projection 30e may be aligned with a center (see, e.g., dashed line $C_m$) of the third portion $W_{12-3}$ of the width $W_{12}$ defining the third implement-receiving channel 18c.

In an example, the tongue portion 28 may further define a fluid-flow passage 32 extending through a thickness $T_{16}$ (see, e.g., FIG. 7) of the body 16 of the base portion 12. The thickness $T_{16}$ of the body 16 of the base portion 12 (as defined by the tongue portion 28) is bound by the front surface $16_F$ of the body 16 of the base portion 12 and the rear surface $16_R$ of the body 16 of the base portion 12. Furthermore, as seen in FIGS. 2-3, the fluid-flow passage 32 may be defined by the substantially 'half moon' portion 28b of the tongue portion 28. In some instances, the fluid-flow passage 32 may include a smaller, but substantially proportional 'half-moon' geometry compared to the 'half moon' portion 28b of the tongue portion 28 and includes a maximum width $W_{32}$ (see, e.g., FIG. 3) that extends between an laterally-outward-most portion of each of the second projection 30b and the fourth projection 30d.

In yet another example, the tongue portion 28 may further define a fluid-flow guide rib 34. The fluid-flow guide rib 34 may extend away from the front surface $16_F$ of the body 16 of the base portion 12 defined by the substantially 'half moon' portion 28b of the tongue portion 28 at a distance $D_{34}$ (see, e.g., FIG. 7). Furthermore, as seen in FIG. 2, the fluid-flow guide rib 34 may include an arcuate shape and extend away from the front surface $16_F$ of the body 16 of the base portion 12 defined by the substantially 'half moon' portion 28b of the tongue portion 28 proximate the proximal end surface 16p of the body 16 of the base portion 12.

Referring to FIG. 1A, the fluid retainer cartridge assembly 10 may further define a fluid guide portion 36. In an example, the fluid guide portion 36 may be defined by a funnel portion 36a formed by the base portion 12 and a fluid conduit portion 36b formed by the cap portion 14.

Referring to FIGS. 3-7, the funnel portion 36a is generally defined by a funnel body 38 that extends away from the rear surface $16_R$ of the base portion 12. As seen in FIG. 3, the funnel body 38 may be defined by a distal surface $38_D$, which may be defined, in part, by the distal surface $16_D$ of the body 16 of the base portion 12, and a proximal surface $38_P$. With continued reference to FIG. 3, the funnel body 38 may include a length defined approximately by the portion $L_{12-P}$ of the length $L_{12}$ of the base portion 12. The funnel body 38 may be defined by a width $W_{38}$ that narrows for at least a portion of the length $L_{12-P}$ of the funnel body 38 as the funnel body 38 extends from the distal surface $38_D$ to the proximal surface $38_P$.

Referring to FIG. 7, the funnel body 38 is generally defined by an inner surface $38_I$ and an outer surface $38_O$. The inner surface $38_I$ is arranged in an opposing relationship with respect to the rear surface $16_R$ of the body 16 of the base portion 12 and forms a fluid-flow passage 40 extending through the funnel body 38. Access to the fluid-flow passage 40 is formed by an upstream opening 42 (see, e.g., FIGS. 4 and 7) that permits entry of the fluid F into the funnel body 38 and a downstream opening 44 (see, e.g., FIGS. 4 and 5) that permits the fluid F to exit the funnel body 38.

The fluid-flow passage 40 may be defined by an arcuate channel having a radius $R_{40}$ or radial geometric component. Furthermore, as seen in FIG. 7, the radius $R_{40}$ may be greater near the distal surface $38_D$ of the funnel body 38 such that the upstream opening 42 forms a larger opening or mouth portion of the fluid-flow passage 40 of the funnel body 38 than that of the downstream opening 44, which may form a relatively smaller opening or throat portion of the fluid-flow passage 40 of the funnel body 38.

Figures 15A, 15B:
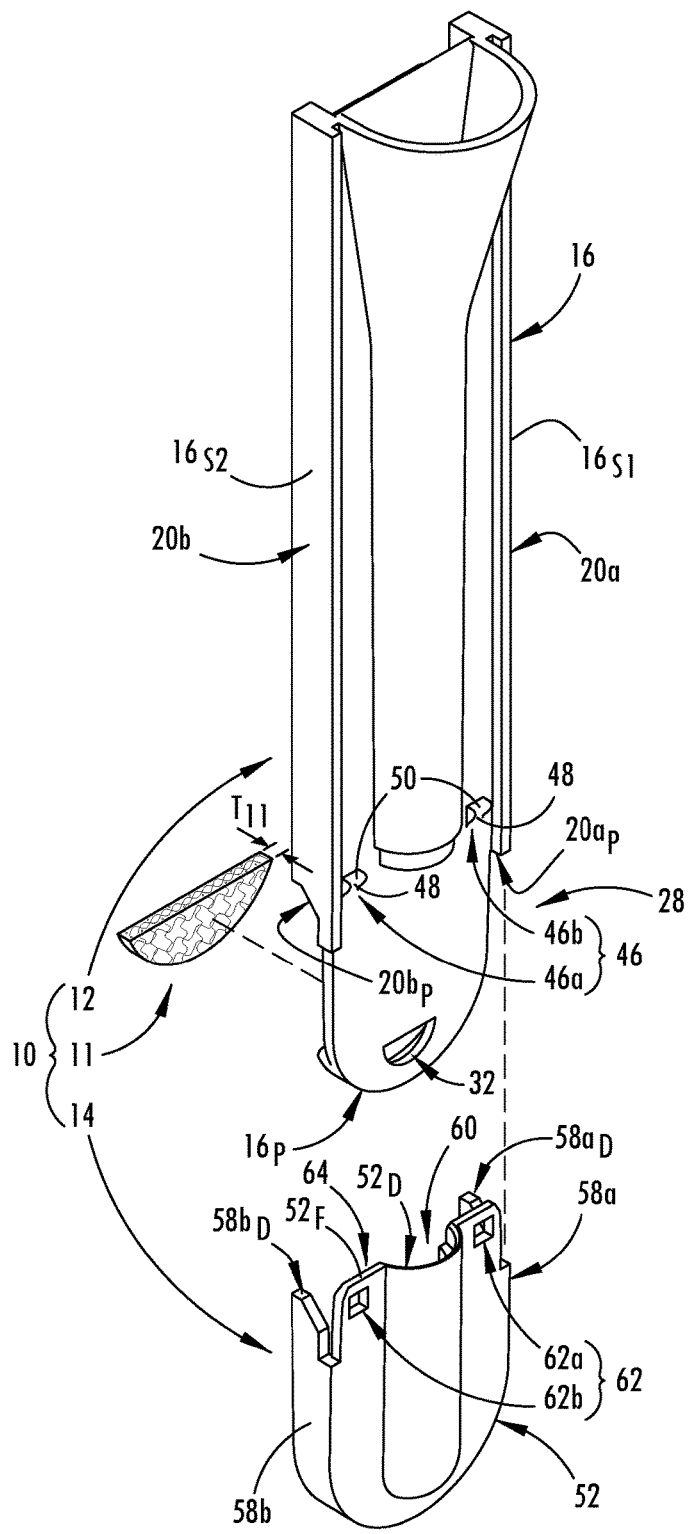
FIG. 15A is a rear exploded view of the fluid retainer cartridge assembly of FIG. 1A.
FIG. 15B is a rear assembled view of the fluid retainer cartridge assembly of FIG. 15A.

Referring to FIGS. 3 and 5, the rear surface $16_R$ of the base portion 12 may also define a cap-retainer portion 46. The cap-retainer portion 46 may defined by a pair of protrusions including a first protrusion 46a and a second protrusion 46b that extend away from the rear surface $16_R$ of the base portion 12. The first protrusion 46a and the second protrusion 46b may be respectively arranged near opposite sides of the funnel body 38 and near the proximal surface $38_P$ of the funnel body 38. Each of the first protrusion 46a and the second protrusion 46b may be defined by a ramp surface 48 and latch surface 50 (FIG. 15A).

Referring to FIGS. 8-13, the cap portion 14 of the fluid retainer cartridge assembly 10 includes a body 52 and a tongue-receiving housing 54 connected to the body 52. The body 52 is generally defined by a front surface $52_F$, a rear surface $52_R$, a distal end surface $52_D$, a proximal end surface $52_P$, a first side surface $52_{S1}$ and a second side surface $52_{S2}$. The cap portion 14 is further generally defined by a length $L_{14}$ (see, e.g., FIGS. 8-9 and 12-13) extending between the distal end surface $52_D$ and the proximal end surface $52_P$. The cap portion 14 is yet even further generally defined by a width $W_{14}$ (see, e.g., FIGS. 8-11) extending between the first side surface $52_{S1}$ and the second side surface $52_{S2}$.

Figure 8:
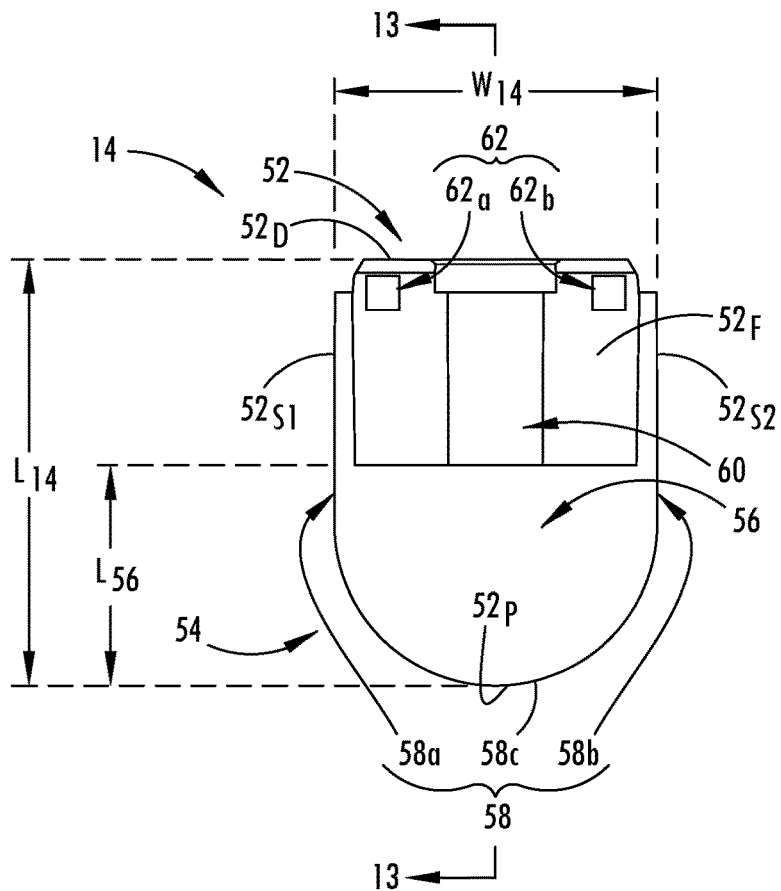
FIG. 8 is a front view of a cap portion of the fluid retainer cartridge assembly of FIG. 1A.

As seen in FIG. 8, the tongue-receiving housing 54 may be defined by an implement proximal end retainer portion 56 and a flange portion 58 defined by a first sidewall flange segment 58a, a second sidewall flange segment 58b and an arcuate flange segment 58c. The implement proximal end retainer portion 56 extends across a width $W_{14}$ of the base portion 14 and is connected to each of the first sidewall flange segment 58a, the second sidewall flange segment 58b and the arcuate flange segment 58c. The implement proximal end retainer portion 56 extends away from the arcuate flange segment 58c toward the distal end surface $52_D$ of the body 52 at a length $L_{56}$; the length $L_{56}$ of the implement proximal end retainer portion 56 may be equal to approximately half of the length $L_{14}$ of the cap portion 14.

With continued reference to FIG. 8, the first sidewall flange segment 58a extends away from the front surface $52_F$ and is arranged proximate the first side surface $52_{S1}$. The second sidewall flange segment 58b extends away from the front surface $52_F$ and is arranged proximate the second side surface $52_{S2}$. The arcuate flange segment 58c extends away from the front surface $52_F$ and is arranged proximate the proximal surface $52_P$.

Figure 12:
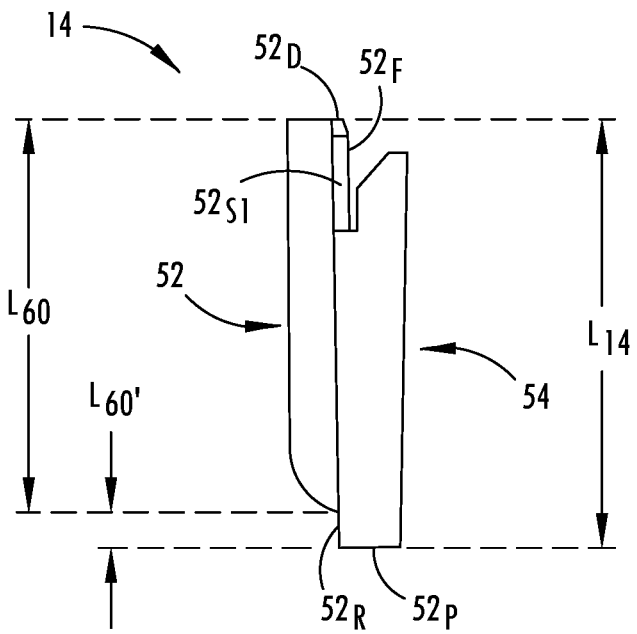
FIG. 12 is a side view of the cap portion of FIG. 6.
Figure 13:
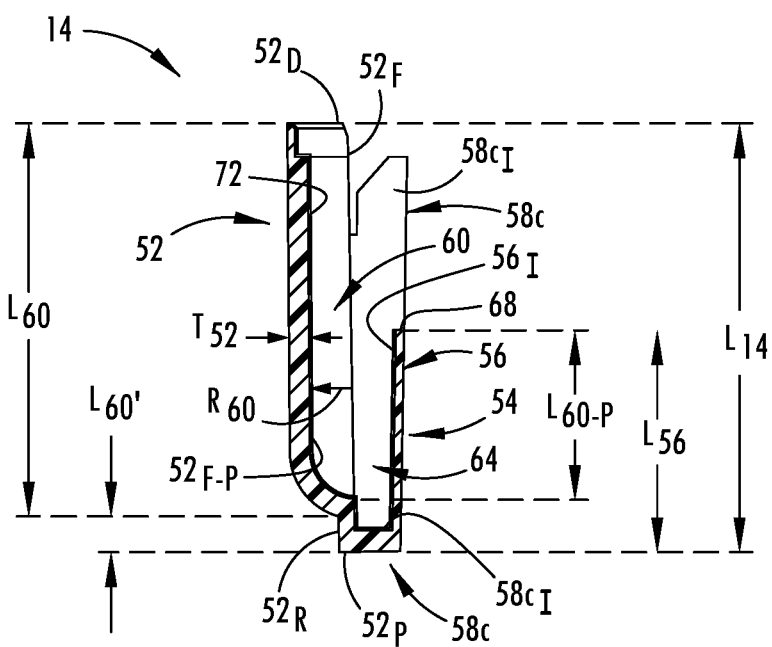
FIG. 13 is a cross-sectional view of the base portion according to line 13-13 of FIG. 8.

Referring to FIG. 13, the body 52 of the cap portion 14 may include a substantially constant thickness $T_{52}$. As seen in FIGS. 8-13, the body 52 defined by the substantially constant thickness $T_{52}$ is not substantially planar, and, as a result, the body 52 may form an arcuate-shaped channel 60 (see, e.g., FIGS. 8, 10, 13) defined by a radius $R_{60}$ (see, e.g., FIGS. 10, 13) or radial geometric component extending into the front surface $52_F$ of the body 52, which results in the rear surface $52_R$ of the body 52 defining an arcuate projection.

Figure 9:
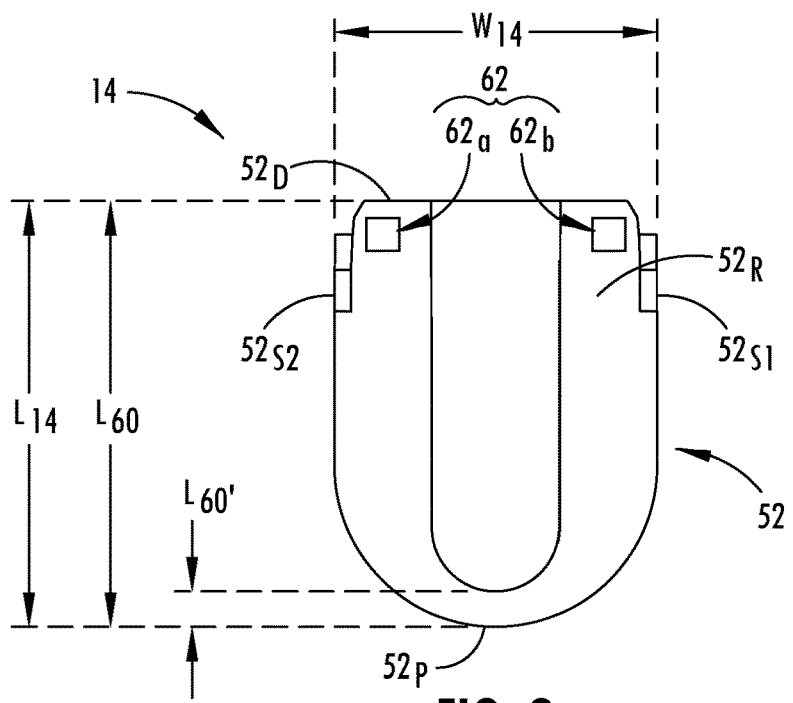
FIG. 9 is a rear view of the cap portion of FIG. 6.

Referring to FIGS. 9 and 12-13, the arcuate-shaped channel 60 may be defined by a length $L_{60}$ that extends along a portion of the length $L_{14}$ of the cap portion 14 from the distal end surface $52_D$ of the body 52 toward the proximal end surface $52_P$ of the body 52. Furthermore, a remainder of the length $L_{14}$ of the cap portion 14 where the arcuate-shaped channel 60 is not formed is shown generally at $L_{60}'$. Yet even further, as seen in FIG. 13, a portion $L_{60-P}$ of the length $L_{60}$ of the arcuate-shaped channel 60 extends along a portion of the length $L_{56}$ of the implement proximal end retainer portion 56.

Referring to FIGS. 8-9, a pair of protrusion-receiving passages 62 extend through the thickness $T_{52}$ of the body 52. The pair of protrusion-receiving passages 62 may defined by a first protrusion-receiving passage 62a and a second protrusion-receiving passage 62b. The first protrusion-receiving passage 62a and the second protrusion-receiving passage 62b may be respectively arranged near opposite sides of the arcuate-shaped channel 60.

Figure 10:
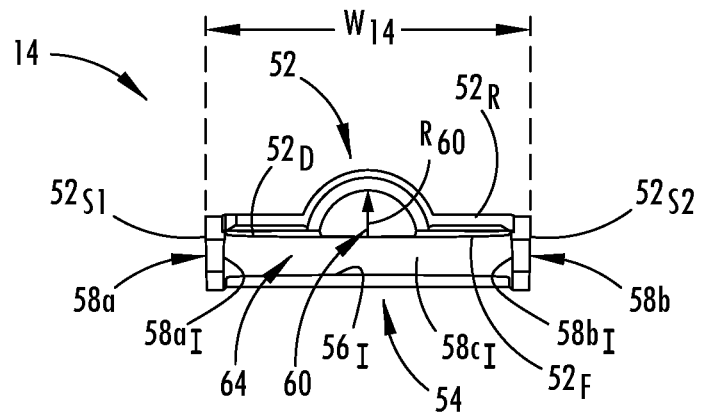
FIG. 10 is a top view of the cap portion of FIG. 6.
Figure 11:
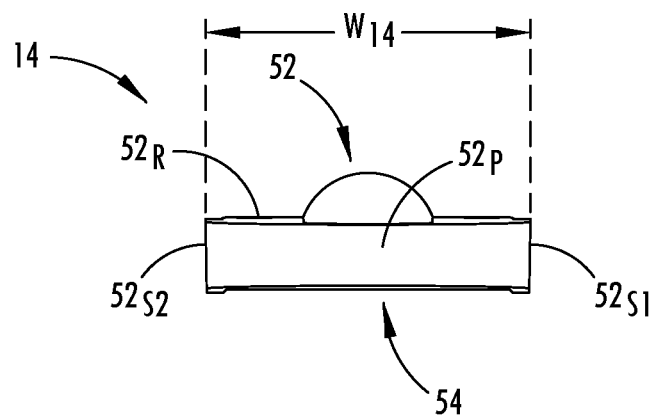
FIG. 11 is a bottom view of the cap portion of FIG. 6.

As seen in FIGS. 10 and 13, the cap portion 14 forms a fluid-receiving void 64. The fluid-receiving void 64 is generally defined by an inner surface $56_I$ of the implement proximal end retainer portion 56, an inner surface $58_I$ of the arcuate flange segment 58c, a portion of an inner surface $58a_I$, $58b_I$ of each of the first sidewall flange segment 58a and the second sidewall flange segment 58b that extends along the length $L_{56}$ of the implement proximal end retainer portion 56, and a portion $52_{F-P}$ of the front surface $52_F$ that extends along the length $L_{56}$ of the implement proximal end retainer portion 56.

Referring to FIGS. 14A-15B, a method for forming the fluid retainer cartridge assembly 10 is described. In a first optional step, as seen at FIGS. 14A and 15A, the fluid filter 11 may be inserted on the front surface $16_F$ in the substantially half-moon portion 28b of the tongue portion 28 and between projections 30 and fluid-flow guide rib 34 (i.e., as described herein-below, the fluid filter 11 may be inserted in a downstream fluid-receiving void 64b). The fluid filter 11 may be sized and configured to be arranged in this location in a friction-fit relationship. Furthermore, the fluid filter 11 may be sized to have a thickness $T_{11}$ that is similar to the height of the projections 30 and/or fluid-flow guide rib 34 above the front surface $16_F$, e.g., the distance $D_{30}$ less the thickness $T_{16}$, or the distance $D_{34}$ less the thickness $T_{16}$ (FIG. 7). Although an implementation of the fluid retainer cartridge assembly 10 may include the fluid filter 11, the fluid filter 11 may be omitted from the design of the fluid retainer cartridge assembly 10.

Although an implementation of the fluid retainer cartridge assembly 10 may include one fluid filter 11 as described above, the fluid retainer cartridge assembly 10 may include one or more second filters. In an example, a second filter or pre-filter 11a may be connected to the base portion 12. Because the pre-filter 11a is located upstream of the filter 11, the pre-filter 11a may be referred to as an upstream filter and the filter 11 may be referred to as a downstream filter. In an implementation, the pre-filter 11a may be disposed within the fluid-flow passage 40 extending through the funnel body 38 proximate or near the distal surface $38_D$ of the funnel body 38. Therefore, the pre-filter 11a may filter a 'dirty' fluid F prior to the fluid F being passed through the fluid filter 11.

As seen in FIGS. 14A and 15A, the distal end surface $52_D$ of the body 52 of the cap portion 14 is axially aligned with the proximal end surface $16p$ of the body 16 of the base portion 12. Furthermore, as seen in FIGS. 14A and 15A, the tongue portion 28 of the base portion 12 is axially aligned with the fluid-receiving void 64 formed by the tongue-receiving housing 54 of the cap portion 14. When the base portion 12 and the cap portion 14 are axially aligned as described above, the fluid-flow passage 40 extending through the funnel body 38 of the base portion 12 is axially aligned with the arcuate-shaped channel 60 formed by the body 52 of the cap portion 14.

With reference to FIG. 14A, the first side surface $16si$ defining a proximal end $20a_P$ of the first sidewall flange 20a of the base portion 12 may define a recess that corresponds to a projection defined by a distal end $58a_D$ of the first sidewall flange segment 58a of the cap portion 14. Similarly, as seen in FIG. 15A, the second side surface $16_{S2}$ defining a proximal end $20b_P$ of the second sidewall flange 20b of the base portion 12 may define a recess that corresponds to a projection defined by a distal end 58$b_D$ of the second sidewall flange segment 58b of the cap portion 14.

Furthermore, as seen in FIG. 15A, when the base portion 12 and cap portion 14 are axially aligned as described above, the cap-retainer portion 46 (of the base portion 12) defined by the first protrusion 46a and the second protrusion 46b are axially aligned with the pair of protrusion-receiving passages 62 (of the cap portion 14) defined by the first protrusion-receiving passage 62a and the second protrusion-receiving passage 62b. As the tongue portion 28 of the base portion 12 is inserted into the fluid-receiving void 64 of the cap portion 14, the ramp surface 48 of each of the first protrusion 46a and the second protrusion 46b contacts and rides adjacent the front surface 52$_F$ (proximate the distal end surface 52$_D$) of the body 52 for respectively advancing each of the first protrusion 46a and the second protrusion 46b into the first protrusion-receiving passage 62a and the second protrusion-receiving passage 62b. Just after the ramp surface 48 of each of the first protrusion 46a and the second protrusion 46b has been respectively aligned with the first protrusion-receiving passage 62a and the second protrusion-receiving passage 62b, the body 52 (proximate the distal end surface 52$_D$) of the cap portion 14 flexes over the latch surface 50 of each of the first protrusion 46a and the second protrusion 46b for removably-attaching the cap portion 14 to the base portion 12 as seen in FIGS. 14B and 15B.

Referring to FIGS. 16-17, the base portion 12 and the cap portion 14 are shown in a removably-attached configuration after the first protrusion 46a and the second protrusion 46b are arranged within the first protrusion-receiving passage 62a and the second protrusion-receiving passage 62b. With reference to FIG. 17, the fluid-flow passage 40 extending through the funnel body 38 of the base portion 12 is fluidly-connected to the arcuate-shaped channel 60 formed by the body 52 of the cap portion 14 for forming an axial fluid conduit 66 of the fluid retainer cartridge assembly 10. Furthermore, as seen in FIG. 17, after the first protrusion 46a and the second protrusion 46b are arranged within the first protrusion-receiving passage 62a and the second protrusion-receiving passage 62b for removably-attaching the base portion 12 to the cap portion 14, the tongue portion 28 of the base portion 12 is fully axially disposed within the fluid-receiving void 64 formed by the tongue-receiving housing 54 of the cap portion 14 such that the tongue portion 28 fluidly-divides the fluid-receiving void 64 into an upstream fluid-receiving void 64a and the downstream fluid-receiving void 64b. The upstream fluid-receiving void 64a is in fluid communication with the downstream fluid-receiving void 64b by way of the fluid-flow passage 32 of the tongue portion 28.

If the fluid filter 11 is disposed within the downstream fluid-receiving void 64b, any fluid F that passes from the upstream fluid-receiving void 64a to the downstream fluid-receiving void 64b by way of the fluid-flow passage 32 will be filtered by the fluid filter 11; in such an implementation, the upstream fluid-receiving void 64a may be referred to as an unfiltered reservoir portion of the fluid-receiving void 64 and the downstream fluid-receiving void 64b may be referred to as a filtered reservoir portion of the fluid-receiving void 64. However, if the fluid filter 11 is not disposed within the downstream fluid-receiving void 64b, any fluid F that enters the downstream fluid-receiving void 64b from the upstream fluid-receiving void 64a by way of the fluid-flow passage 32 of the tongue portion 28 is not filtered.

Figure 18:
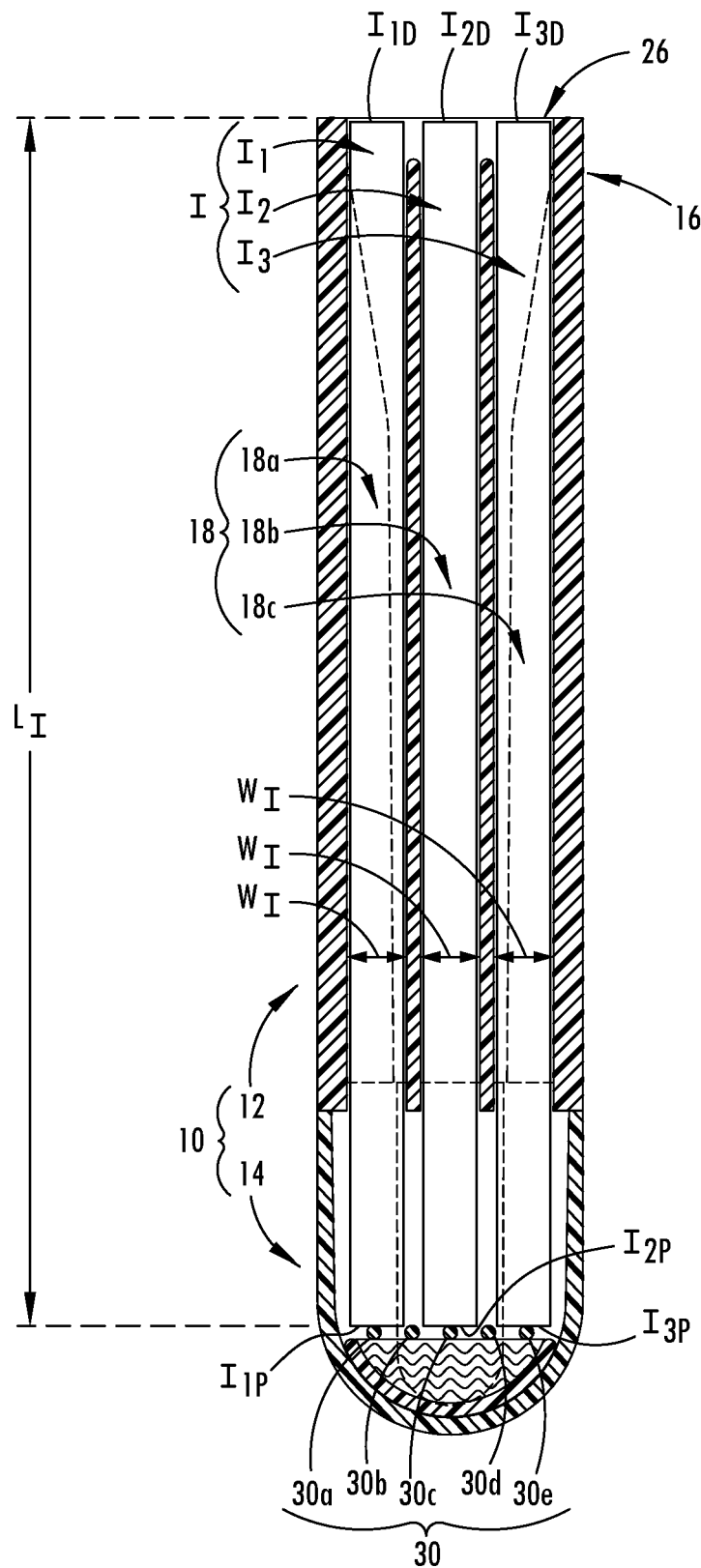
FIG. 18 is a cross-sectional view of the fluid retainer cartridge assembly according to line 18-18 of FIG. 1B.

Referring to FIGS. 1A-1B and 18, a plurality of implements I (e.g., a plurality of test strip assays) are interfaced with the fluid retainer cartridge assembly 10. The plurality of test strip assays I includes three test strip assays, being: a first test strip assay I$_1$, a second test strip assay I$_2$ and a third test strip assay I$_3$.

As seen in FIGS. 1A and 18, the plurality of test strip assays I are disposed into the fluid retainer cartridge assembly 10 by way of the access port 26 formed by the body 16 of the base portion 12 such that the plurality of test strip assays I are arranged within the plurality of implement-receiving channels 18. In an example, the plurality of test strip assays I may be arranged within the plurality of implement-receiving channels 18 as follows: (1) the first test strip assay I$_1$ is arranged within the first implement-receiving channel 18a, (2) the second test strip assay I$_2$ is arranged within the second implement-receiving channel 18b and (3) the third test strip assay I$_3$ is arranged within the third implement-receiving channel 18c.

Referring to FIG. 18, insertion of the plurality of test strip assays I into the fluid retainer cartridge assembly 10 ceases once a proximal end I$_{1P}$, I$_{2P}$, I$_{3P}$ of each test strip assay I$_1$, I$_2$, I$_3$ engages a corresponding projection 30a, 30c, 30e of the plurality of projections 30. For example, as seen in FIG. 18: (1) the proximal end I$_{1P}$ of the first test strip assay I$_1$ engages the first projection 30a that is aligned with the center C$_{18a}$ (see, e.g., FIG. 2) of the first portion W$_{12-1}$ of the width W$_{12}$ of the base portion 12 that defines the first implement-receiving channel 18a, (2) the proximal end I$_{2P}$ of the second test strip assay 12 engages the third projection 30c that is aligned with the center C$_{18b}$ (see, e.g., FIG. 2) of the second portion W$_{12-2}$ of the width W$_{12}$ of the base portion 12 that defines the second implement-receiving channel 18b and (3) the proximal end I$_{3P}$ of the third test strip assay I$_3$ engages the fifth projection 30e that is aligned with the center C$_{18c}$ (see, e.g., FIG. 2) of the third portion W$_{12-3}$ of the width W$_{12}$ of the base portion 12 that defines the third implement-receiving channel 18c.

As seen in FIG. 18, each test strip assay I$_1$, I$_2$, I$_3$ of the plurality of test strip assays I includes a width W$_I$ and a length L$_I$. The width W$_I$ of each test strip assay I$_1$, I$_2$, I$_3$ is respectively approximately equal to the width portion W$_{12-1}$, W$_{12-2}$, W$_{12-3}$ (see, e.g., FIG. 2) of the width W$_{12}$ of the base portion 12 that defines each implement-receiving channel 18a, 18b, 18c of the plurality of implement-receiving channels 18. With reference to FIGS. 1B and 18, the length L$_I$ of each test strip assay I$_1$, I$_2$, I$_3$ is selectively sized such that when the proximal end I$_{1P}$, I$_{2P}$, I$_{3P}$ of each test strip assay I$_1$, I$_2$, I$_3$ engages a corresponding projection 30a, 30c, 30e of the plurality of projections 30, a distal end I$_{1D}$, I$_{2D}$, I$_{3D}$ of each test strip assay I$_1$, I$_2$, I$_3$ is accessible at the access port 26 for permitting, for example, insertion of a user's finger therein for grasping any of the first, second or third test strip assays I$_1$, I$_2$, I$_3$ for inserting or removing any of the first, second or third test strip assays I$_1$, I$_2$, I$_3$ from any of the first, second or third implement-receiving channels 18a, 18b, 18c.

Figure 19:
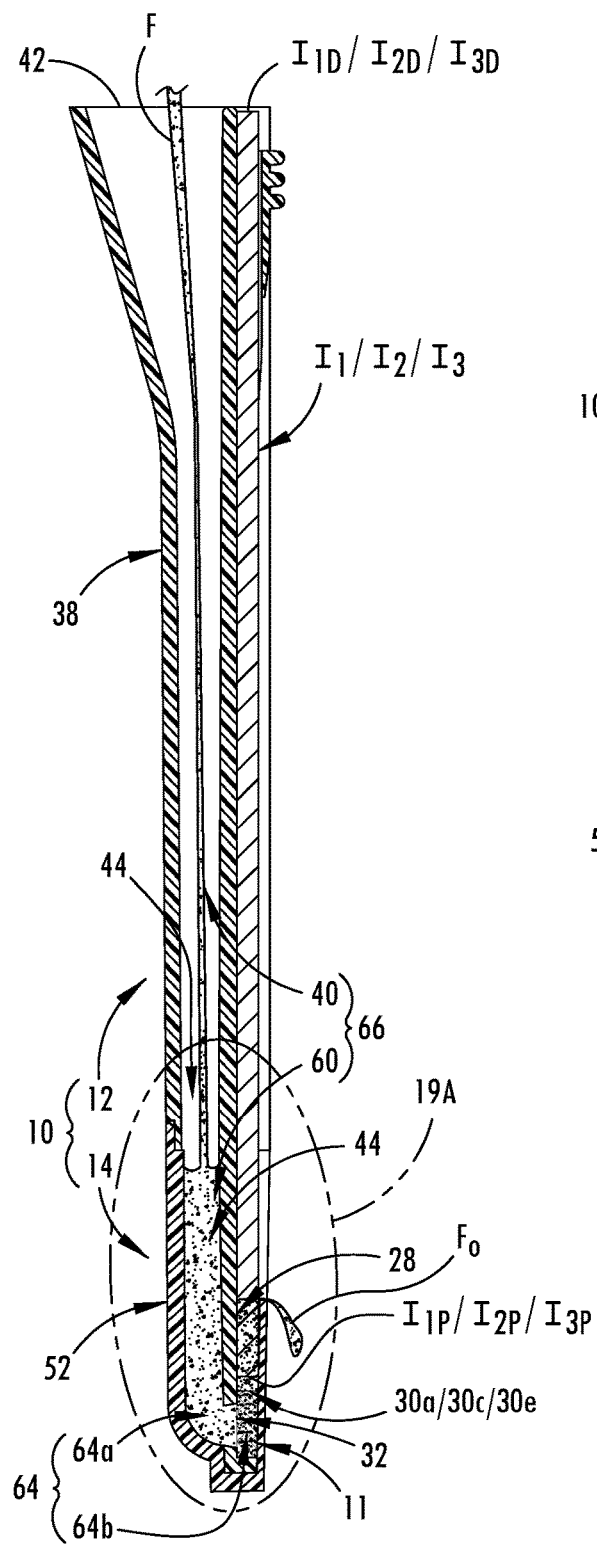
FIG. 19 is a cross-sectional view of the fluid retainer cartridge assembly according to line 19-19 of FIG. 1B.
Figure 19A:
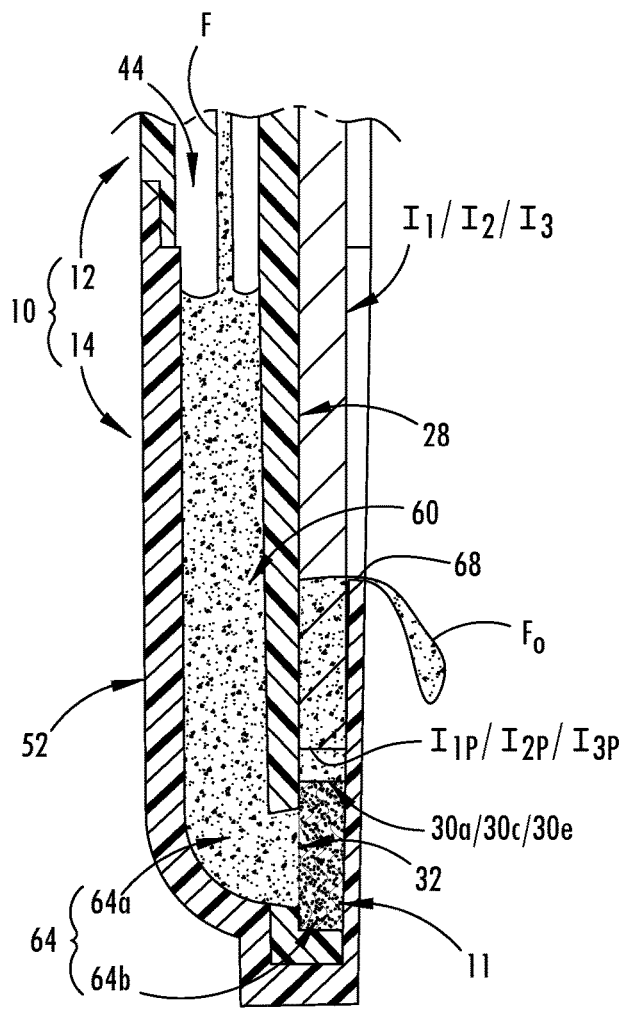
FIG. 19A is an enlarged view according to line 19A of FIG. 19.

Referring to FIGS. 1B and 19-21A, fluid F is poured into the fluid retainer cartridge assembly 10. As seen in FIGS. 1B, 19 and 19A, the fluid F initially enters the axial fluid conduit 66 of the fluid retainer cartridge assembly 10 by way of the upstream opening 42 of the funnel body 38 formed by the base portion 12. The fluid F passes through the fluid-flow passage 40 of the funnel body 38 of the base portion 12 and subsequently exits the fluid-flow passage 40 of the funnel body 38 of the base portion 12 at the downstream opening 44. The fluid F then enters the arcuate-shaped channel 60 formed by the body 52 of the cap portion 14 that is in fluid communication with the fluid-flow passage 40 of the funnel body 38 of the base portion 12 at the downstream opening 44 such that the fluid F ultimately arrives at the upstream fluid-receiving void 64a of the fluid-receiving void 64. In an example, as seen in FIG. 19A, fluid $F_O$ (which is an amount of the fluid F that exceeds the volume of the fluid-receiving void 64) exits the fluid retainer cartridge assembly 10 by spilling over a fluid overflow edge 68, which may be a portion of the distal end surface $52_D$, formed by the front surface $52_F$ of the body 52 of the cap portion 14.

Figures 20, 20A:
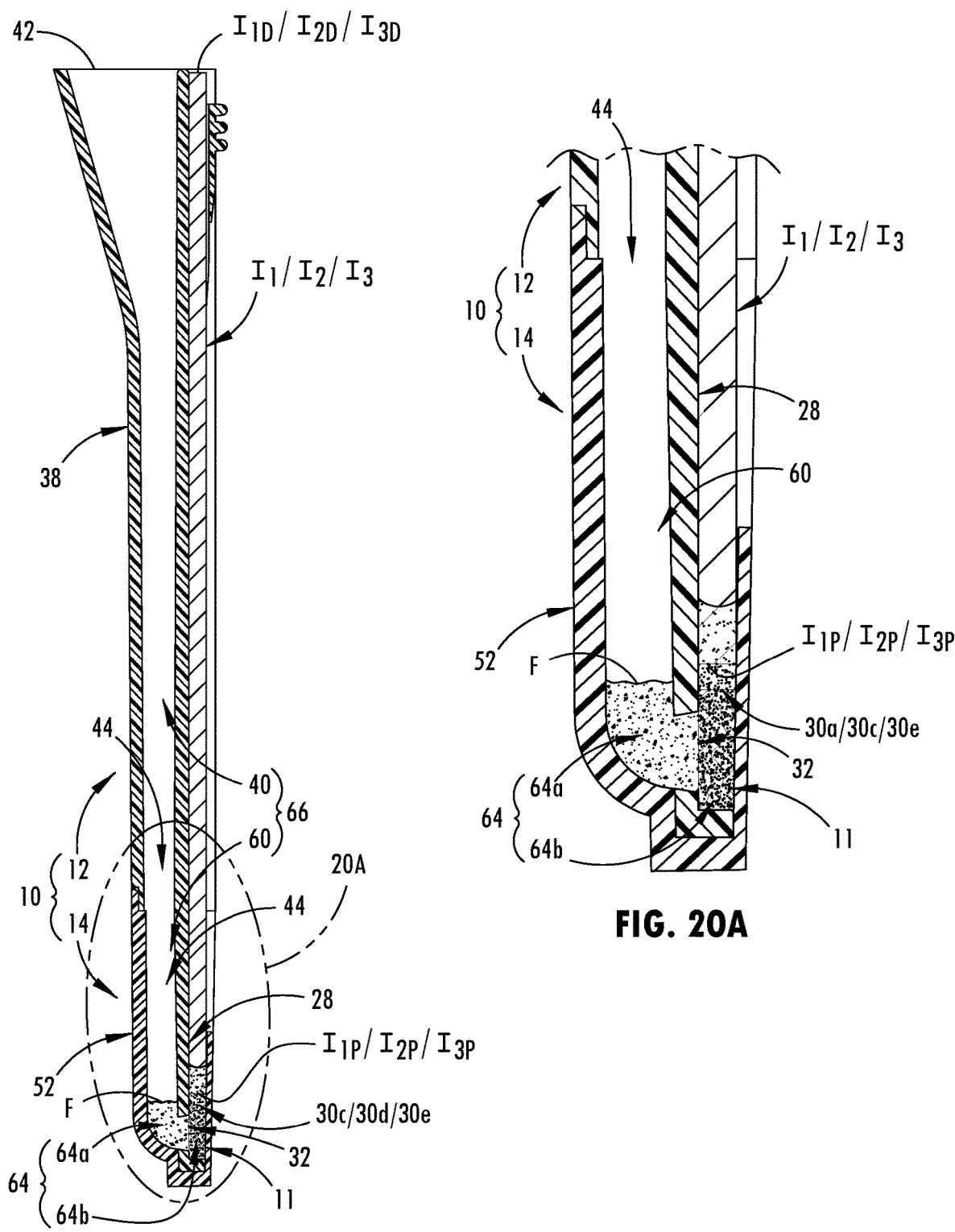
FIG. 20 is another cross-sectional view of the fluid retainer cartridge assembly according to FIG. 19.
FIG. 20A is an enlarged view according to line 20A of FIG. 20.

As seen in FIGS. 20 and 20A, the fluid F may radially pass from the upstream fluid-receiving void 64a of the fluid-receiving void 64 and into the downstream fluid-receiving void 64b of the fluid-receiving void 64. As seen in FIGS. 20 and 20A, the fluid filter 11 is shown optionally inserted into the downstream fluid-receiving void 64b for filtering the fluid F as the fluid F migrates radially through the fluid filter 11 from the upstream fluid-receiving void 64a into the downstream fluid-receiving void 64b.

As seen in FIGS. 21 and 21A, after the fluid F arrives in the downstream fluid-receiving void 64b of the fluid-receiving void 64 and moves around projections 30, the fluid F comes into contact with the proximal end $I_{1P}, I_{2P}, I_{3P}$ of each test strip assay $I_1, I_2, I_3$ and fluid F is drawn up each test strip assay $I_1, I_2, I_3$, for example, by capillary action. The shape, quantity and arrangement (e.g., centering along the dashed lines $C_{18a}, C_{18b}, C_{18c}, C_{22a}, C_{22b}$ of FIG. 2) of the plurality of projections 30 may assist in evenly distributing and selectively flowing the fluid F about the proximal end $I_{1P}, I_{2P}, I_{3P}$ of each test strip assay $I_1, I_2, I_3$ for adequately dosing each test strip assay $I_1, I_2, I_3$ with a sufficient amount of fluid F.

Figure 22:
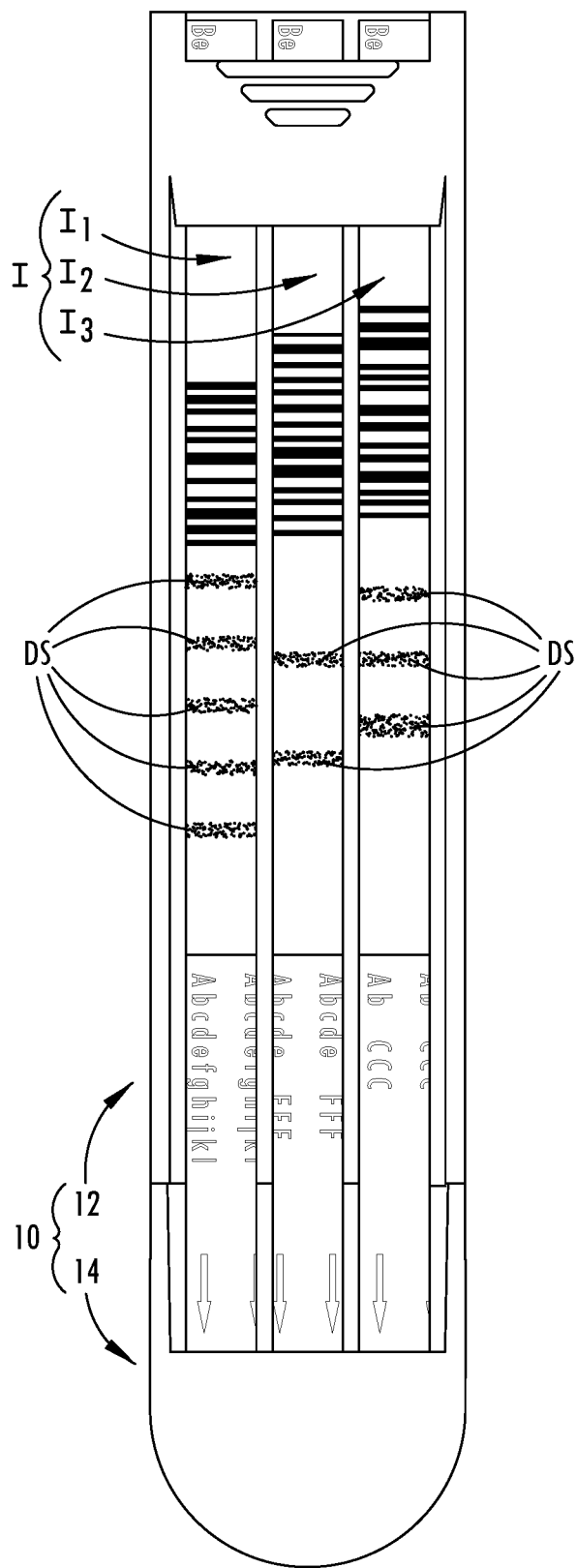
FIG. 22 is a front view of the fluid retainer cartridge assembly according to line 22 of FIG. 1B.

Referring to FIG. 22, in one use of the fluid retainer cartridge assembly 10, after being contacted with the fluid F, each test strip assay $I_1, I_2, I_3$ may include a result region R configured to provide a detectable signal DS (e.g., a color change or intensity information) indicating the presence and/or concentration of a chemical analyte within the fluid (F) when the fluid (F) is in contact with the result region R; and the detectable signal DS may be determined by exposing each test strip assay $I_1, I_2, I_3$ to an imaging device 136 (see, e.g., FIGS. 25-26) of an implement analyzing device 100 (see, e.g., FIG. 23) that can monitor, read and analyze the one or more test strip assays $I_1, I_2, I_3$ during or after being contacted with the fluid F. As used herein, the detectable signal DS is associated with color and/or intensity information within the result region R (FIGS. 1A and 22) located on each of the one or more test strip assays $I_1, I_2, I_3$. Exposure of each test strip assay $I_1, I_2, I_3$ to an imaging device 136 of an implement analyzing device 100 may be permitted by a viewing window or viewing port 70 of the fluid retainer cartridge assembly 10. With reference to FIG. 1B, the viewing window or viewing port 70 is defined by an absence of material of one or both of the base portion 12 and the cap portion 14. In an example, the viewing window or viewing port 70 is generally bound by: (1) the first sidewall flange 20a of the front surface $16_F$ of the body 16 of the base portion 12, (2) the second sidewall flange 20b of the front surface $16_F$ of the body 16 of the base portion 12, (3) the proximal end $24_P$ of the implement distal end retainer portion 24 the front surface $16_F$ of the body 16 of the base portion 12 and (4) the fluid overflow edge 68 formed by the front surface $52_F$ of the body 52 of the cap portion 14.

In other examples (as shown in FIGS. 7 and 13), the inner surface $38_I$ of the funnel body 38 formed by the base portion 12, the portion $52_{F-P}$ of the front surface $52_F$ that extends along the length $L_{56}$ of the implement proximal end retainer portion 56, and/or the inner surface $56_I$ of the implement proximal end retainer portion 56 may include an optional dried reagent 72 disposed thereon. Such reagents may include acids, bases, buffers, surfactants, dyes, colorometric signaling agents, fluorometric signaling agents, antibodies, enzymes, receptors, antigens, cofactors, chemical filtration agents, anticoagulants, blocking agents, chelating agents, and leaching agents.

In yet another implementation, the fluid retainer cartridge assembly 10 may include a seal 74 (not shown), which may be formed from, for example, a foil material. The seal 74 may be disposed over, adjacent, proximate or near the distal surface $38_D$ of the funnel body 38. The seal 74 may serve one or more purposes, for example, to prevent contamination of the inner surface $38_I$ of the funnel body 38 and/or for retention of dried reagent 72 on the inner surface $38_I$ of the funnel body 38 of base portion 12.

Figure 23:
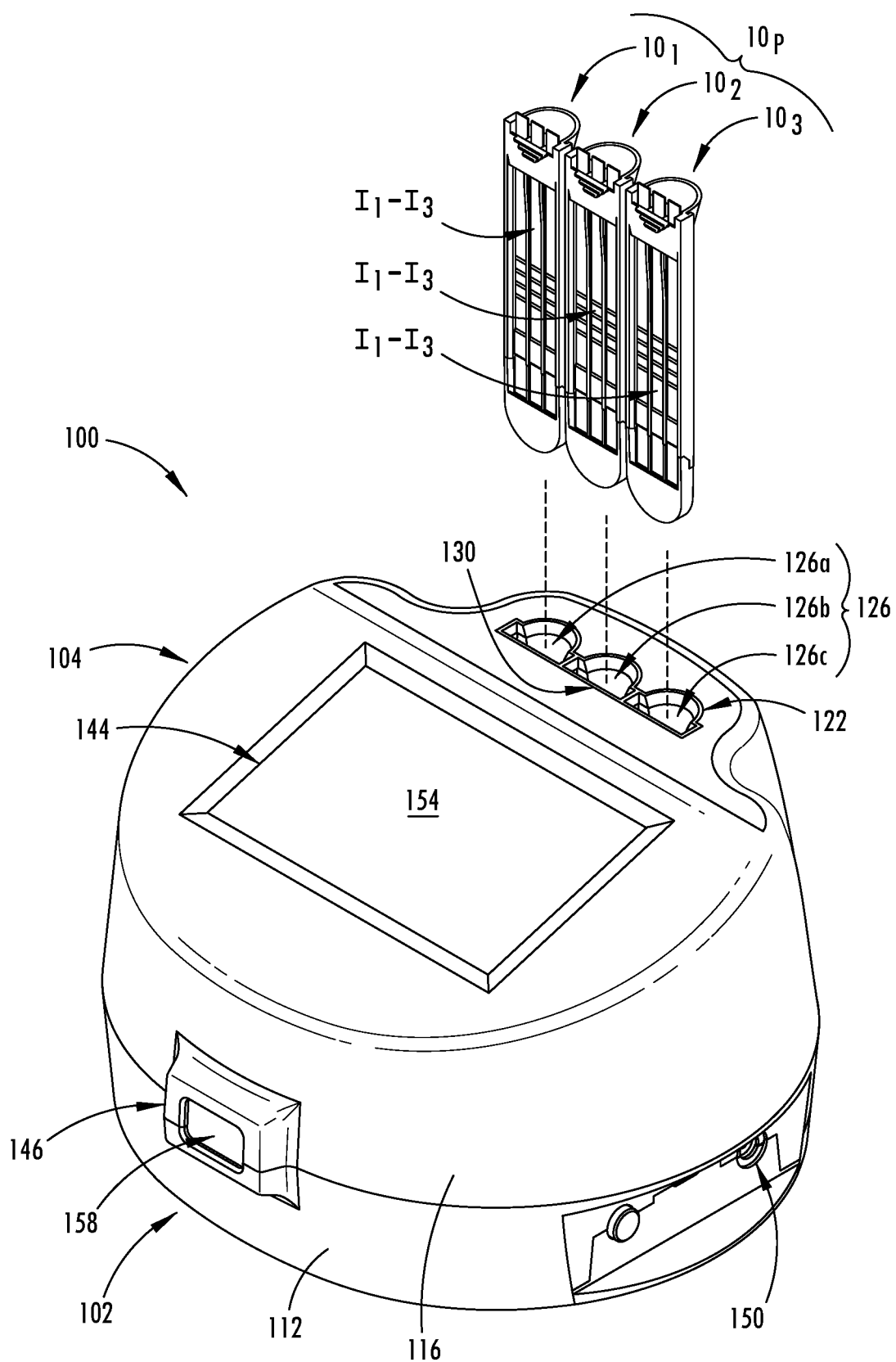
FIG. 23 is an exploded perspective view of an implement analyzing device and a plurality of fluid retainer cartridge assemblies containing a plurality of implements positioned located within the plurality of fluid retainer cartridge assemblies.

Referring to FIG. 23, an implement analyzing device 100 is shown generally at 100. The implement analyzing device 100 is sized for receiving more than one fluid retainer cartridge assembly 10, which has been described above at FIGS. 1A-22. As seen in FIG. 23, the more than one fluid retainer cartridge assembly 10 may be, for example: a first fluid retainer cartridge assembly $10_1$; a second fluid retainer cartridge assembly $10_2$; and a third fluid retainer cartridge assembly $10_3$. The first fluid retainer cartridge assembly $10_1$, the second fluid retainer cartridge assembly $10_2$ and the third fluid retainer cartridge assembly $10_3$ may be collectively referred to as a plurality of fluid retainer cartridge assemblies $10_P$.

The exemplary first fluid retainer cartridge assembly $10_1$, the exemplary second fluid retainer cartridge assembly $10_2$ and the exemplary third fluid retainer cartridge assembly $10_3$ that may be interfaced with the implement analyzing device 100 may be substantially similar to the fluid retainer cartridge assembly 10 described above at FIGS. 1A-22. Although the following disclosure is directed to the exemplary fluid retainer cartridge assemblies $10_1, 10_2, 10_3$ being interfaced with the implement analyzing device 100, the implement analyzing device 100 is not limited to being interfaced with the exemplary fluid retainer cartridge assemblies $10_1, 10_2, 10_3$; as such, the functionality of the implement analyzing device 100 may remain the same when other fluid retainer cartridge assemblies having different shapes or sizes are interfaced with the implement analyzing device 100.

In association with what has been described above at FIGS. 1A-22, the exemplary fluid retainer cartridge assemblies $10_1, 10_2, 10_3$ are each sized for containing a plurality of implements I, such as, for example, a first test strip assay $I_1$, a second test strip assay $I_2$ and a third test strip assay $I_3$. Furthermore, because the implement analyzing device 100 is sized for receiving more than one fluid retainer cartridge assembly (e.g., three fluid retainer cartridge assemblies $10_1, 10_2, 10_3$), and, if each of the first fluid retainer cartridge assembly $10_1$, the second fluid retainer cartridge assembly $10_2$ and the third fluid retainer cartridge assembly $10_3$ are respectively loaded with a plurality of implements I such as, for example, a first test strip assay $I_1$, a second test strip assay $I_2$ and a third test strip assay $I_3$, each of the first fluid retainer cartridge assembly $10_1$, the second fluid retainer cartridge assembly $10_2$, and the third fluid retainer cartridge assembly $10_3$ may be said to contain a plurality of test strip assays $I_1$-$I_3$ (defined respectively, for example, by: a first plurality of test strip assays $I_1$-$I_3$ contained by the first fluid retainer cartridge assembly $10_1$; a second plurality of test strip assays $I_1$-$I_3$ contained by the second fluid retainer cartridge assembly $10_2$; and a third plurality of test strip assays $I_1$-$I_3$ contained by the third fluid retainer cartridge assembly $10_3$). Therefore, in use, the implement analyzing device 100 may simultaneously, sequentially, selectively or randomly analyze all or any test strip assay $I_1$, $I_2$, $I_3$ that is secured by all or any of the first fluid retainer cartridge assembly $10_1$, the second fluid retainer cartridge assembly $10_2$ and the third fluid retainer cartridge assembly $10_3$.

In an example, simultaneous analysis of the first plurality of test strip assays $I_1$-$I_3$, the second plurality of test strip assays $I_1$-$I_3$ and the third plurality of test strip assays $I_1$-$I_3$ by the implement analyzing device 100 may expedite an analysis of what may otherwise be one analysis of one plurality of test strip assays $I_1$-$I_3$ (if the implement analyzing device 100 was configured to only receive one fluid cartridge retainer assembly). In an example, the implement analyzing device 100 may conduct simultaneous analysis of one implement (e.g., the first test strip assay $I_1$) of the first plurality of test strip assays $I_1$-$I_3$, the second plurality of test strip assays $I_1$-$I_3$ and the third plurality of test strip assays $I_1$-$I_3$; therefore, if desired, a user may comparatively study three unique species studies (e.g., that is associated with a unique sample associated with each first test strip assay $I_1$ of: the first plurality of test strip assays $I_1$-$I_3$; the second plurality of test strip assays $I_1$-$I_3$; and the third plurality of test strip assays $I_1$-$I_3$) of a genus study (e.g., a genus test associated with a common sample type related to the each first test strip assay $I_1$ and not each of the second test strip assay $I_2$ and each of the third test strip assay $I_3$) in one instance.

Figure 24A:
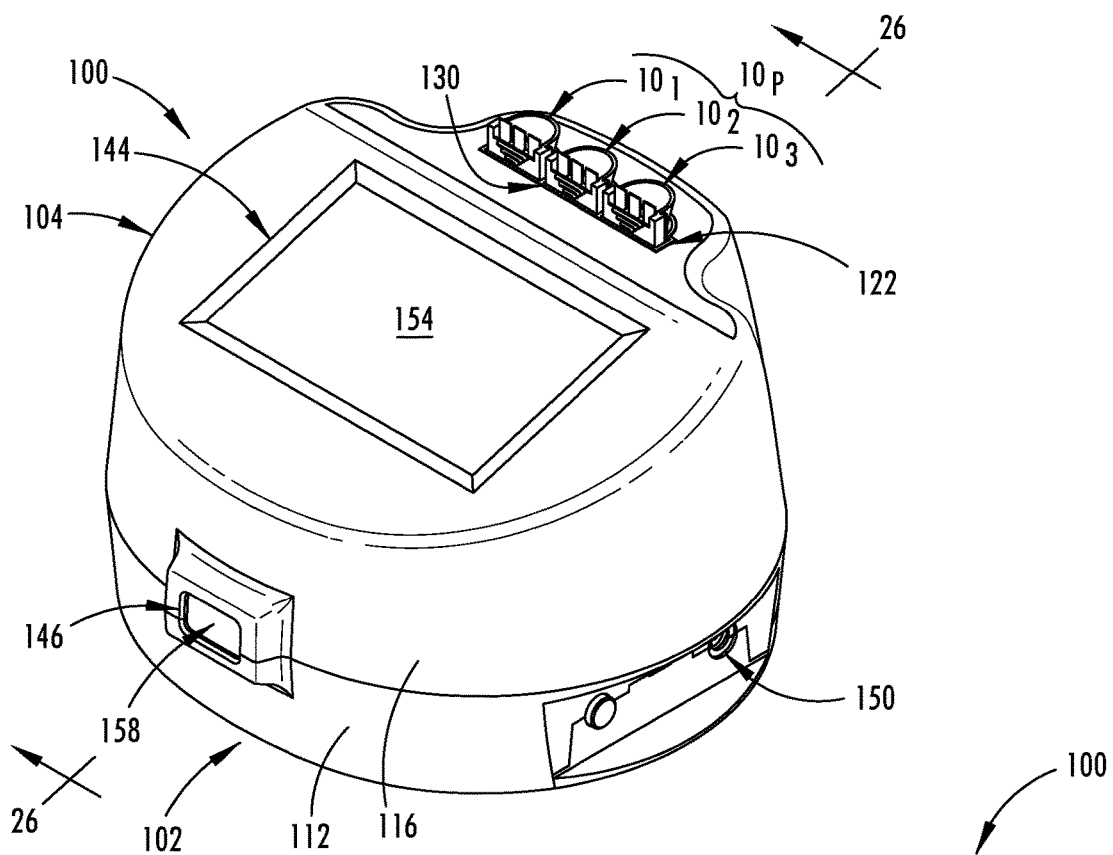
FIG. 24A is a right side perspective view of FIG. 23 illustrating the plurality of fluid retainer cartridge assemblies disposed within the implement analyzing device.
Figure 24B:
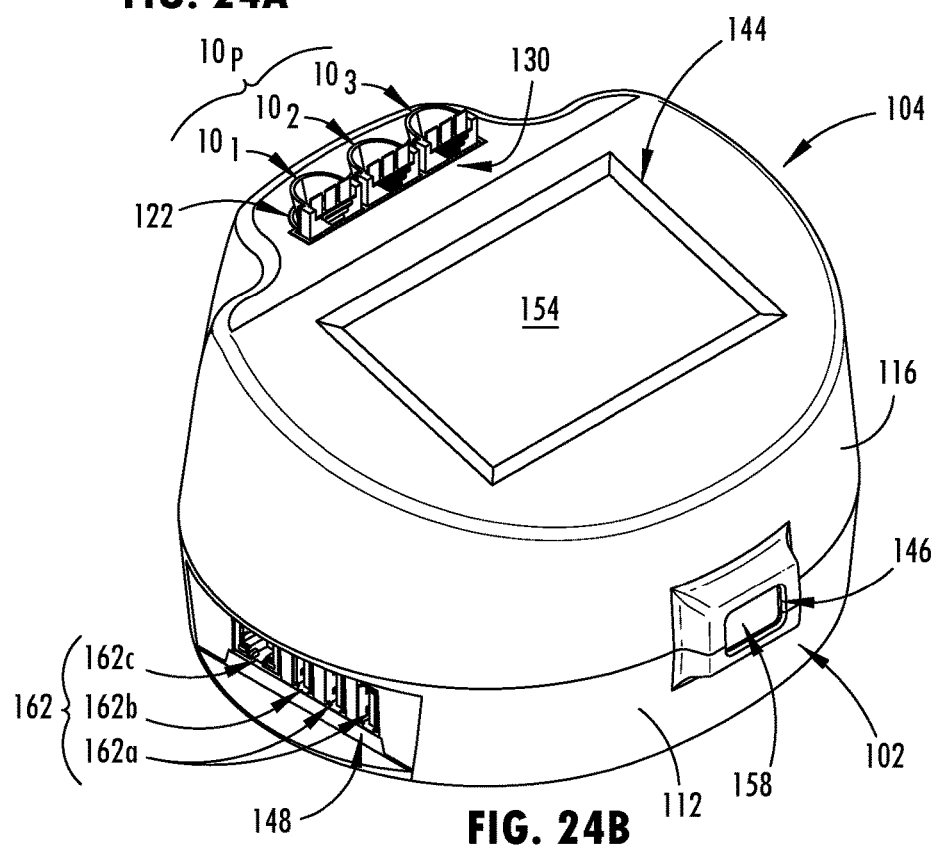
FIG. 24B is a left side perspective view of FIG. 23 illustrating the plurality of fluid retainer cartridge assemblies disposed within the implement analyzing device.
Figure 25:
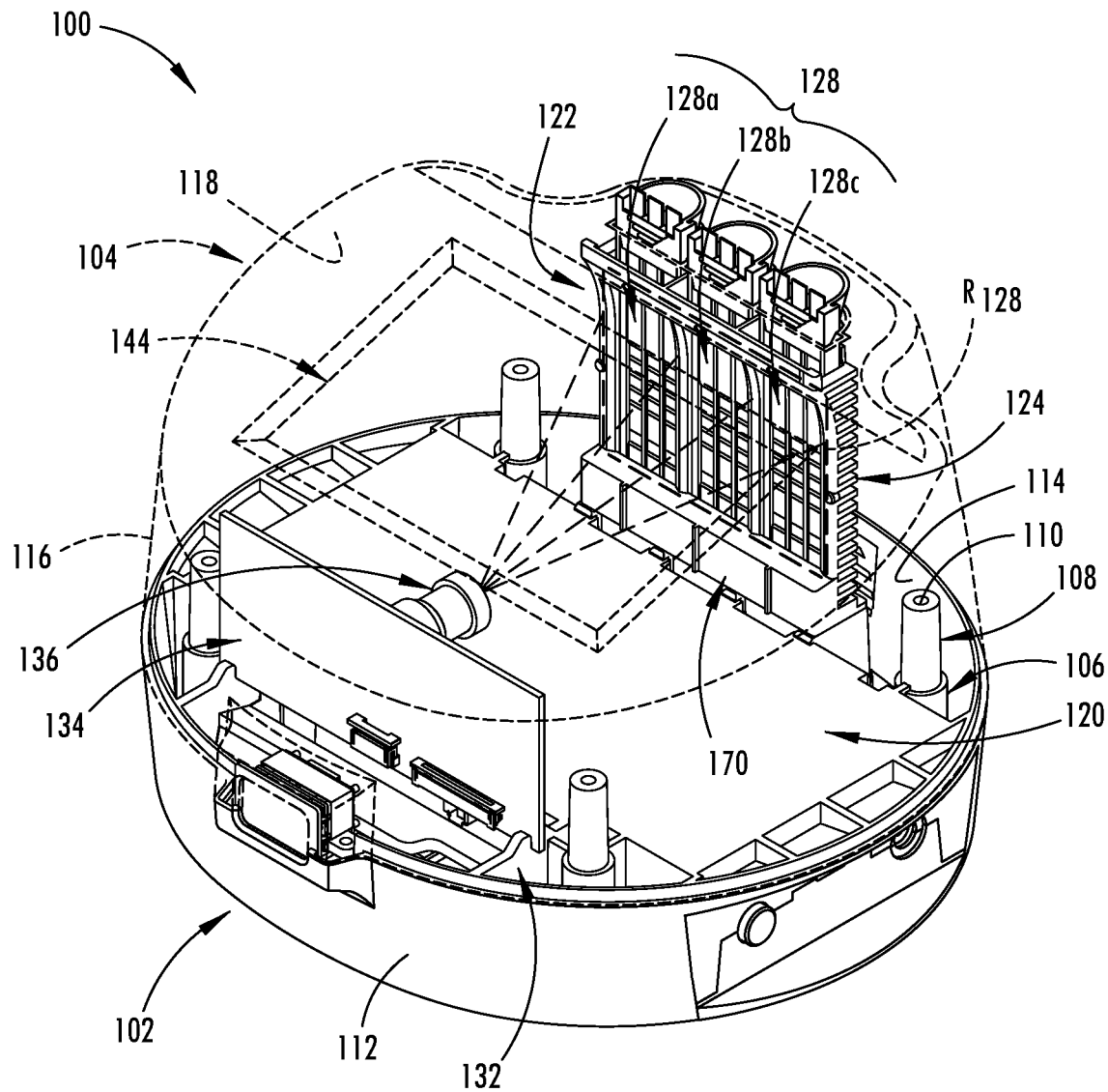
FIG. 25 is a right side perspective view of the plurality of fluid retainer cartridge assemblies disposed within the implement analyzing device that corresponds to FIG. 24A, illustrating a housing of the implement analyzing device in phantom in order to reveal components located within a cavity of the implement analyzing device.

Referring to FIGS. 23 and 24A-24B, the implement analyzing device 100 includes a support member 102 and a housing 104 connected to the support member 102. As seen in FIG. 25, each of the support member 102 and the housing 104 may respectively form one or more fastener passages 106, 108 that correspond to one another that are sized for receiving one or more fasteners 110. The one or fasteners 110 permit selective attachment of the housing 104 to the support member 102.

Figure 26:
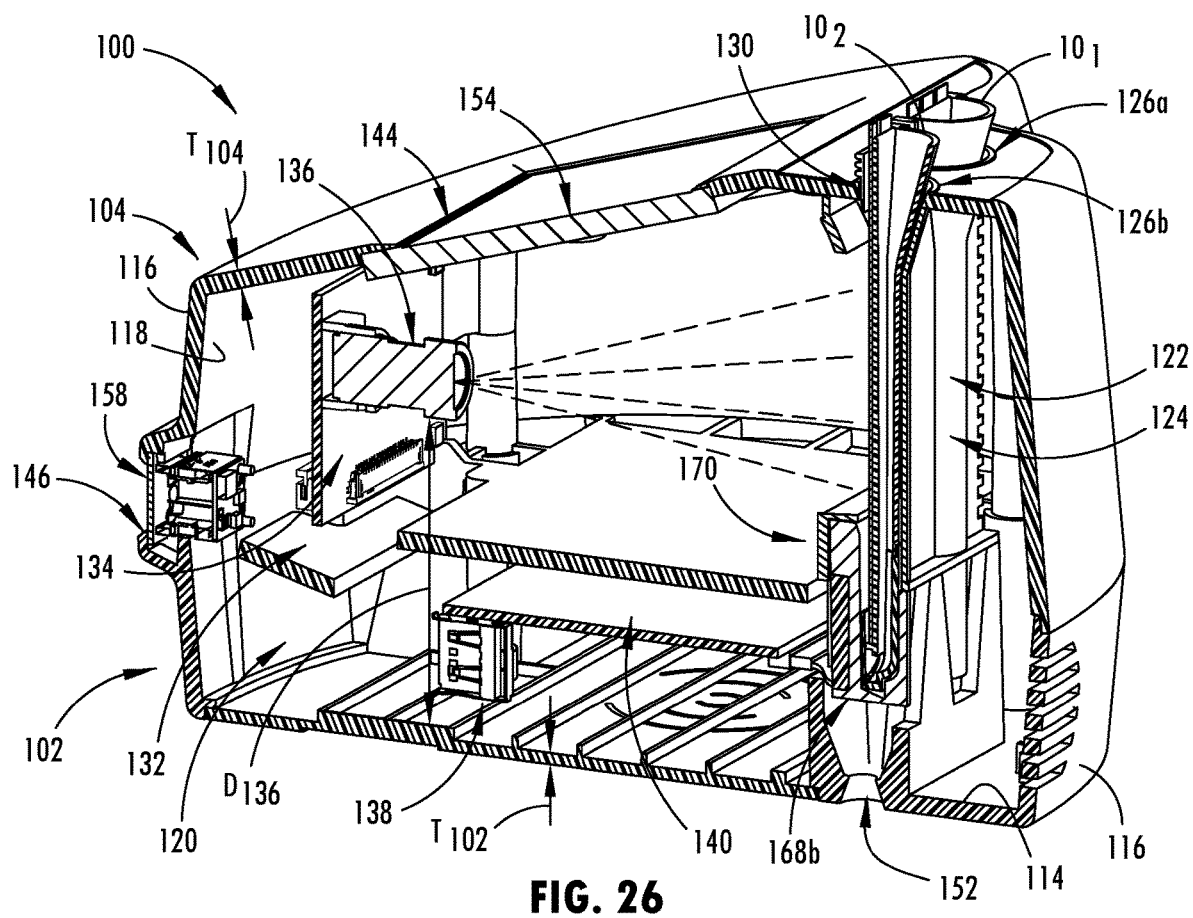
FIG. 26 is a cross-sectional view of the implement analyzing device according to line 26-26 of FIG. 24A.
Figure 27:
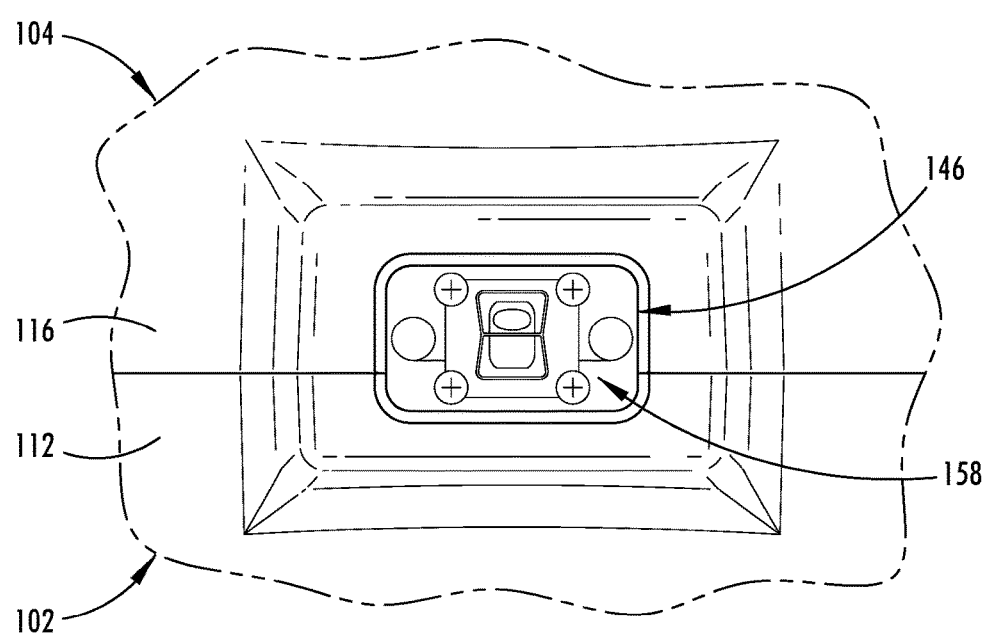
FIG. 27 a front view of a portion of the implement analyzing device, illustrating an exemplary data input passage and an exemplary optical scanner.

With reference to FIGS. 23, 24A-24B, 25 and 26, the support member 102 may define an outer surface 112 and an inner surface 114 (see, e.g., FIGS. 25-26). Similarly, the housing 104 may define an outer surface 116 and an inner surface 118 (see, e.g., FIGS. 25-26). The inner surface 114 of the support member 102 and the inner surface 118 of the housing 104 cooperate to form a cavity 120 (see, e.g., FIGS. 25-26).

As seen in FIGS. 23, 24A-24B, 25, 26 and 32-34, the implement analyzing device 100 may further include a cartridge receiver 122 disposed within the cavity 120. In an example, the cartridge receiver 122 is secured to the inner surface 114 of the support member 102.

Referring to FIGS. 23, 26 and 32, the cartridge receiver 122 includes a body 124 defining at least one first opening 126 and at least one second opening 128 (see, e.g., FIG. 32). The at least one first opening 126 formed by the body 124 of the cartridge receiver 122 is aligned with a cartridge receiver passage 130 (see, e.g., FIG. 23) extending through a thickness $T_{104}$ (see, e.g., FIG. 26) of the housing 104 that is bound by the outer surface 116 of the housing 104 and an inner surface 118 of the housing 104. As seen in FIG. 26, the cartridge receiver passage 130 formed by the housing 104 permits access to the cartridge receiver 122 that is substantially contained within the cavity 120.

With reference to FIG. 23, the at least one first opening 126 of the body 124 of the cartridge receiver 122 may be defined by: a first cartridge receiving opening 126a; a second cartridge receiving opening 126b; and a third cartridge receiving opening 126c. The first cartridge receiving opening 126a may be sized for removable-insertion of the first fluid retainer cartridge assembly $10_1$ within the body 124 of the cartridge receiver 122. The second cartridge receiving opening 126b may be sized for removable-insertion of the second fluid retainer cartridge assembly $10_2$ within the body 124 of the cartridge receiver 122. The third cartridge receiving opening 126c may be sized for removable-insertion of the third fluid retainer cartridge assembly $10_3$ within the body 124 of the cartridge receiver 122.

With reference to FIG. 25, in one embodiment, the at least one second opening 128 formed by the body 124 of the cartridge receiver 122 is contained within the cavity 120 and not accessible from any opening or passage formed by the housing 104. As seen in FIGS. 25 and 32, the at least one second opening 128 may be defined by a first cartridge viewing window 128a, a second cartridge viewing window 128b and a third cartridge viewing window 128c. In one embodiment, each of the first cartridge viewing window 128a, the second cartridge viewing window 128b and the third cartridge viewing window 128c may include a shape corresponding to the viewing window 70 (see, e.g., FIG. 1B) of each of the first fluid retainer cartridge assembly $10_1$, the second fluid retainer cartridge assembly $10_2$ and the third fluid retainer cartridge assembly $10_3$.

With reference to FIGS. 25-26, the implement analyzing device 100 may further include an imaging device support member 132 disposed within the cavity 120. In an example, the imaging device support member 132 is secured to or integrally extends from the inner surface 114 of the support member 102.

In an example, the imaging device support member 132 supports an imaging device integrated circuit (IC) 134 that includes an imaging device 136. With reference to FIG. 26, the imaging device support member 132 is deliberately sized for arranging the imaging device 136 (and, correspondingly, the imaging device IC 134) away from the inner surface 114 of the support member 102 at a distance $D_{136}$. With reference to FIGS. 25-26, the resulting distance $D_{136}$ is sufficient for arranging imaging device 136 in alignment with a region (see, e.g., dashed line box $R_{128}$ in FIGS. 25 and 33) of the at least one second openings 128a, 128b, and 128c formed by the body 124 of the cartridge receiver 122. To put it another away, the imaging device 136 is arranged to capture image data 141 (FIG. 35) within a field of view directed toward the second openings 128a, 128b, and 128c formed through the body 124 of the cartridge receiver 122.

By aligning the imaging device 136 with the region $R_{128}$ of the at least one second opening 128 formed by the body 124 of the cartridge receiver 122, an imaging device 136 of the imaging device IC 134 is able to see/view/image/read the detectable signal DS (see, e.g., FIG. 22) formed by one or more of the test strip assays $I_1$, $I_2$, $I_3$ after the one or more test strip assays $I_1$, $I_2$, $I_3$ is/are contacted with the fluid F. And with the field of view (dashed line box $R_{128}$), the imaging device 136 may capture image data 141 from any and all test strip assays I loaded into a cartridge assembly 10 in the cartridge receiver 122. For instance, the image data 141 captured by imaging device 136 may include detectable signal DS (e.g., color and/or intensity information) from result region R located on the one or more test strip assays $I_1$, $I_2$, $I_3$ in contact with the fluid F. In an example, the imaging device 136 may be a complementary metal oxide semiconductor (CMOS) sensor. In other examples, a lens (not shown) may be mounted to or arranged over the CMOS sensor 136.

Referring to FIG. 26, the implement analyzing device 100 may further include an integrated circuit support member 138 disposed within the cavity 120. In an example, the integrated circuit support member 138 is secured to or is integral with the inner surface 114 of the support member $10_2$. The integrated circuit support member 138 may secure or support an implement analyzing device integrated circuit (IC) 140. In an example, the implement analyzing device IC 140 may include embedded Linux software and a 1-GHz Sitara processor.

Figure 35:
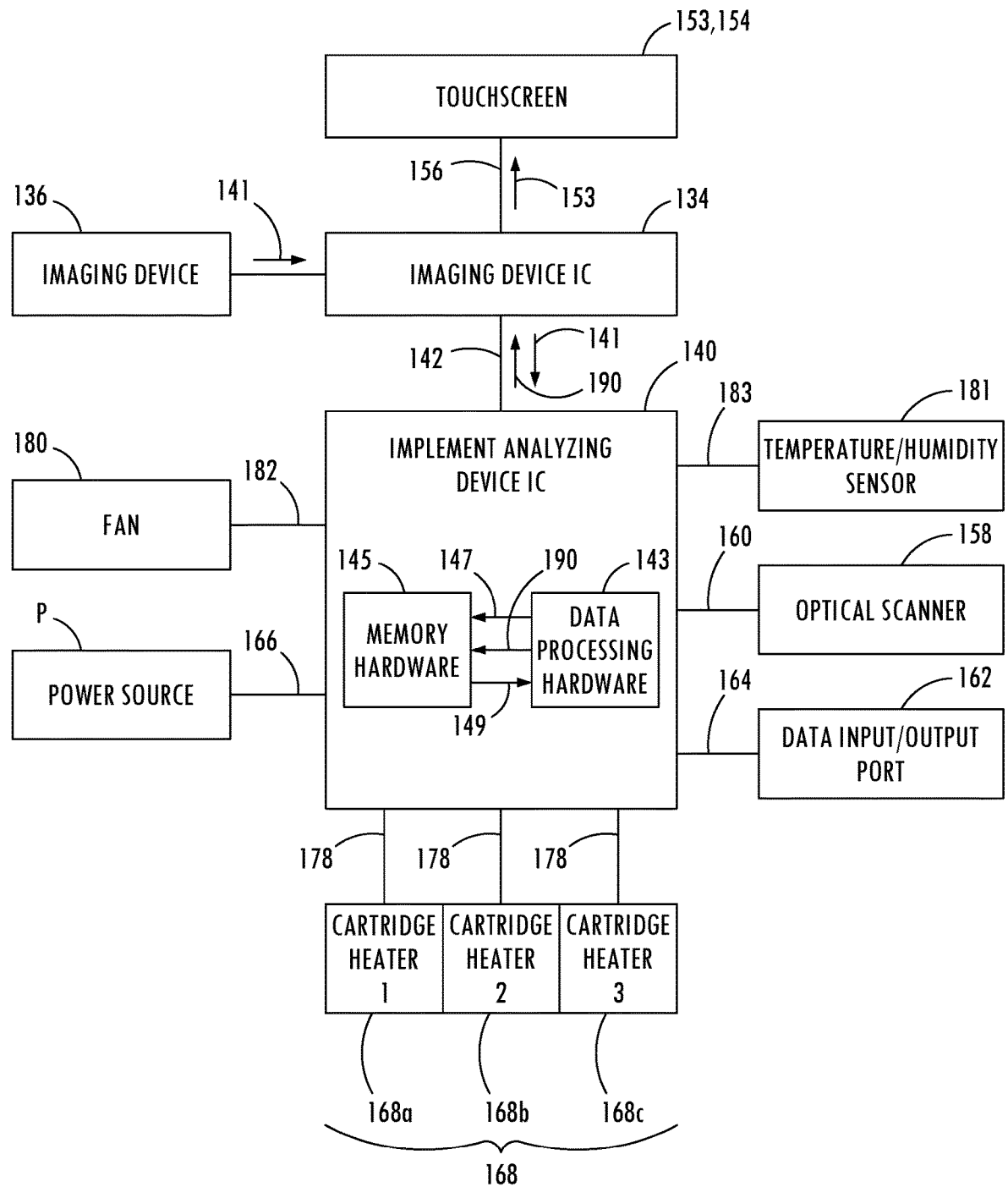
FIG. 35 is a block diagram illustrating a connection of components of the implement analyzing device.

Referring to FIG. 35, the implement analyzing device IC 140 is coupled to the imaging device IC 134 by a communication link 142 (e.g., a flex cable) for communicating one or more readings (e.g., any of the detectable signals DS, barcodes B, and the like) in the image data 141 captured by the imaging device 136 to the implement analyzing device IC 140. Once the one or more readings (e.g., any of the detectable signals DS, barcodes B and the like) in the image data 141 is received by the implement analyzing device IC 140, the implement analyzing device IC 140 may analyze and subsequently interpret the one or more readings (e.g., any of the detectable signals DS, barcodes B and the like) for a user.

Referring back to FIGS. 23 and 24A-24B, in addition to the cartridge receiver passage 130, one or both of the support member 102 and the housing 104 may further defined a plurality of other passages 144-150 extending through a thickness $T_{102}$ (see, e.g., FIG. 26) of the support member 102 or the thickness $T_{104}$ of the housing 104. Like the cartridge receiver passage 130, the plurality of other passages 144-150 may extend through the thickness $T_{102}$ of the support member 102 or the thickness $T_{104}$ of the housing 104. The plurality of other passages 144-150 may include, but is not limited to: a user interface passage 144; one or more data input passages 146; one or more data input/output passages 148; one or more power passages 150 and the like. Furthermore, one or both of the support member 102 and the housing 104 may form a fluid overflow passage 152 (see, FIG. 26).

As seen in FIGS. 23 and 24A-24B, the user interface passage 144 may be sized for permitting access to a user interface 153 displayed on a screen 154. The screen 154 may be a touchscreen, which may be disposed within the cavity 120. At least a portion of a perimeter of the touchscreen 154 may be disposed adjacent or otherwise secured to the inner surface 118 of the housing 104 such that a user may access and read the touchscreen 154 by way of the user interface passage 144. Referring to FIG. 35, the touchscreen 154 may be communicatively coupled to one or more of the imaging device IC 134 and the implement analyzing device IC 140 by a communication link 156. In some examples, data processing hardware 143 at the implement analyzing device IC 140 executes the user interface 153 on the screen 154 for displaying a test result 190 associated with one or more test strip assays I.

In an example, the touchscreen 154 may be a capacitive touch touchscreen. The user interface may be a graphical user interface 153 displayed on the touchscreen 154 for conveying status of a test step being conducted, the test result 190 or the like. Furthermore, a user may interact with the graphical user interface 153 by touching the touchscreen 154. For instance, the user may provide data input or selections to software being executed by the data processing hardware 143 of the implement analyzing device IC 140.

As seen in FIGS. 23, 24A-24B and 27, the one or more data input passages 146 may be sized for permitting access to an optical scanner 158. In an example, the optical scanner 158 may be permitted to scan features or barcode data (e.g., one or more barcodes B) of items (e.g., one or more of the test strip assays $I_1$, $I_2$, $I_3$) arranged externally of the cavity 120. Referring to FIG. 35, the optical scanner 158 may be communicatively coupled to one or more of the imaging device IC 134 and the implement analyzing device IC 140 by a communication link 160. In some examples, the data processing hardware 143 receives barcode data B scanned by the optical scanner 158 that is associated with one or more of the test strip assays $I_1$, $I_2$, $I_3$; determines a unique test strip identifier 147 for each test strip assay $I_1$, $I_2$, $I_3$ based on the scanned barcode data; and retrieves from memory hardware 145 (which is in communication with the data processing hardware 143), test information 149 associated with each of the one or more of the test strip assays $I_1$, $I_2$, $I_3$. The test information 149 may include at least one of a test strip assay type, a test/analysis type, a desired temperature of the fluid F, an analysis duration, and any other information that may be pertinent. As used herein, the analysis duration may correspond to a time threshold or prescribed period of time indicating a minimum duration required for the fluid F to be in contact with the result region R of the test strip assay I associated with the obtained test information 149 before obtaining a corresponding test result 19 (e.g., a presence and/or concentration of the chemical analyte within the fluid F).

Additional uses for the optical scanner 158 may include scanning sample IDs and Lot ID data. Sample IDs are generated by a user to identify a sample fluid F being used. Additional uses for the optical scanner 158 may include scanning testing location information, user information, and any additional information that can be used for testing. The optical scanner 158 may also be used to change the mode of the reader (i.e., Demo mode), to unlock new features, or as a security feature to unlock the reader or specific reader functionality when the user scans a specific barcode.

As seen FIG. 24B, passages 148 may be sized for housing any type of data input/output port 162 such as, for example, one or more universal serial bus (USB) ports 162a. Furthermore, the implement analyzing device IC 140 may also include an on-board USB port; in an implementation, the on-board USB port may be connected to a Wi-Fi dongle (not shown) to permit wireless communication with the implement analyzing device IC 140 (in order to, e.g., permit wireless uploading of a test result or downloading software updates). Referring to FIG. 35, the one or more data input/output ports 162 may be communicatively coupled to one or more of the imaging device IC 134 and the implement analyzing device IC 140 by a communication link 164.

Although the data input/output passages 148 may be sized for housing one or more USB ports 162a, the data input/output passages 148 may be sized for housing other types of data ports 162. In an example, the data input/output passages 148 may be sized for housing one or more secure digital (SD) card ports 162b. Thus, the data port 162 may include memory hardware 151 external to the implement analyzing device IC 140, in addition to, or in lieu of, the memory hardware 151 located at the implement analyzing device IC 140. In another example, the data input/output passages 148 may be sized for housing an Ethernet port 162c for hardwire-connecting the implement analyzing device IC 140 to, for example, a router/wireless router for Internet access in the event that Wi-Fi is not available.

Referring to FIGS. 23 and 24A, the one or more power passages 150 may be sized for permitting insertion of a power cord 166 (see, e.g., FIG. 35). The power cord 166 may couple a power source P (e.g., a wall outlet, battery or the like) to one or more of the imaging device IC 134 and the implement analyzing device IC 140. Although a power cord 166 may provide a source of power to one or more of the imaging device IC 134 and the implement analyzing device IC 140, in some examples, one or more of the imaging device IC 134 and the implement analyzing device IC 140 may include a battery (not shown) for powering one or more the imaging device IC 134 and the implement analyzing device IC 140.

Referring to FIG. 26, the fluid overflow passage 152 may be formed proximate or substantially below the cartridge receiver 122 to permit excess fluid $F_O$ to evacuate the implement analyzing device 100. In one embodiment, the fluid $F_O$ evacuates the implement analyzing device 100 with the assistance of gravity. The excess fluid $F_O$ may flow: (1) over the over the fluid overflow edge 68 (see, e.g., FIG. 1B) of each of the first fluid retainer cartridge assembly $10_1$, the second fluid retainer cartridge assembly $10_2$ and the third fluid retainer cartridge assembly $10_3$, (2) out of the cartridge receiver 122 and then (3) out of the fluid overflow passage 152.

Figure 28:
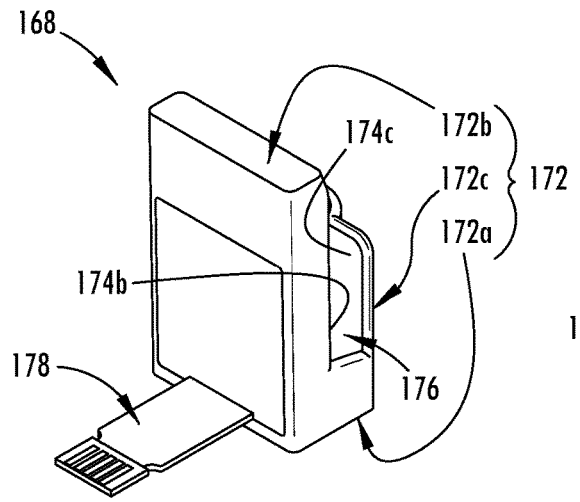
FIG. 28 is a perspective view of an exemplary cartridge heater of the implement analyzing device.
Figure 29:
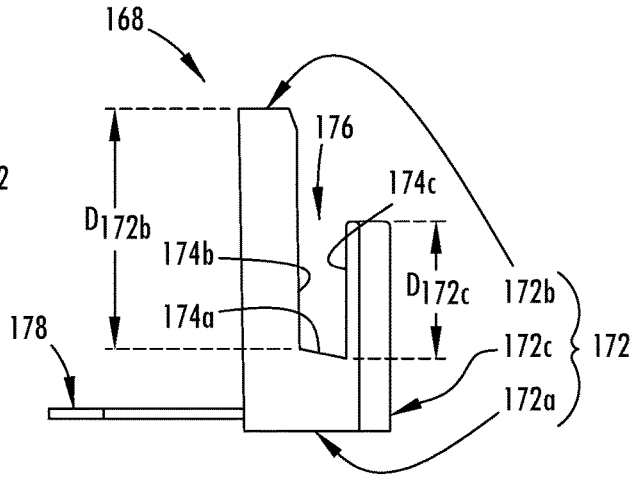
FIG. 29 is a side view of the cartridge heater of FIG. 28.
Figure 30:
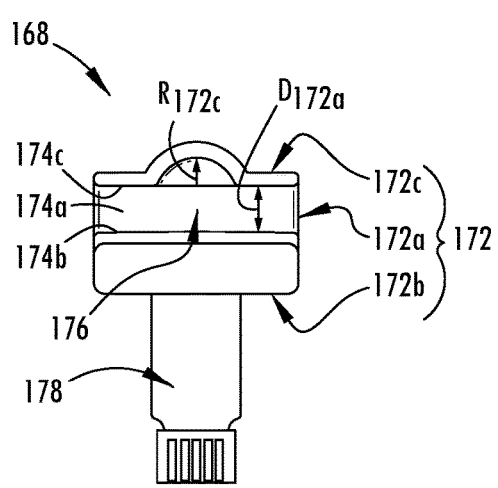
FIG. 30 is a top view of the cartridge heater of FIG. 28.

Referring to FIGS. 28-30, the implement analyzing device 100 may further include at least one cartridge heater 168. The at least one cartridge heater 168 may be disposed within or secured to a base portion 170 (see, e.g., FIGS. 25-26) of the body 124 of the cartridge receiver 122. The base portion 170 of the body 124 of the cartridge receiver 122 may be located opposite the at least one first opening 126 formed by the body 124 of the cartridge receiver 122.

The at least one cartridge heater 168 is defined by a body 172 having a base portion 172a, a front portion 172b and a rear portion 172c. The body 172 may be an aluminum die cast cube containing heater tape with a thermistor embedded in thermal epoxy. Optionally, the aluminum die cast cube may also house a small vibration motor (not shown) that may impart vibrations to the exemplary fluid retainer cartridge assemblies $10_1$, $10_2$, $10_3$ for mixing and agitating the fluid F contained by the exemplary fluid retainer cartridge assemblies $10_1$, $10_2$, $10_3$.

Each of the base portion 172a, the front portion 172b and the rear portion 172c is defined by a cartridge supporting surface 174a, 174b, 174c. In an example, the cartridge supporting surface 174a, 174b of each of the base portion 172a and the front portion 172b may be defined by a substantially flat or planar surface. In another example, the cartridge supporting surface 174c of the rear portion 172c may include a substantially flat or planar surface that is interrupted by a curved or arcuate surface portion defined by a radius $R_{172c}$ (see, e.g., FIG. 30).

The cartridge supporting surface 174a, 174b, 174c of each of the base portion 172a, the front portion 172b and the rear portion 172c defines a cartridge-receiving gap 176. As seen in FIG. 29, the cartridge-receiving gap 176 is partially defined by the cartridge supporting surface 174b of the front portion 172b extending away from the cartridge supporting surface 174a of the base portion 172a at a distance $D_{172b}$. With further reference to FIG. 29, the cartridge-receiving gap 176 is further partially defined by the cartridge supporting surface 174c of the rear portion 172c extending away from the cartridge supporting surface 174a of the base portion 172a at a distance $D_{172c}$. The distance $D_{172b}$ may be greater than the distance $D_{172c}$. Furthermore, as seen in FIG. 30, the cartridge-receiving gap 176 is further partially defined by the cartridge supporting surface 174b of the front portion 172b being spaced apart from the cartridge supporting surface 174c of the rear portion 172c at a distance $D_{172a}$.

Figure 31:
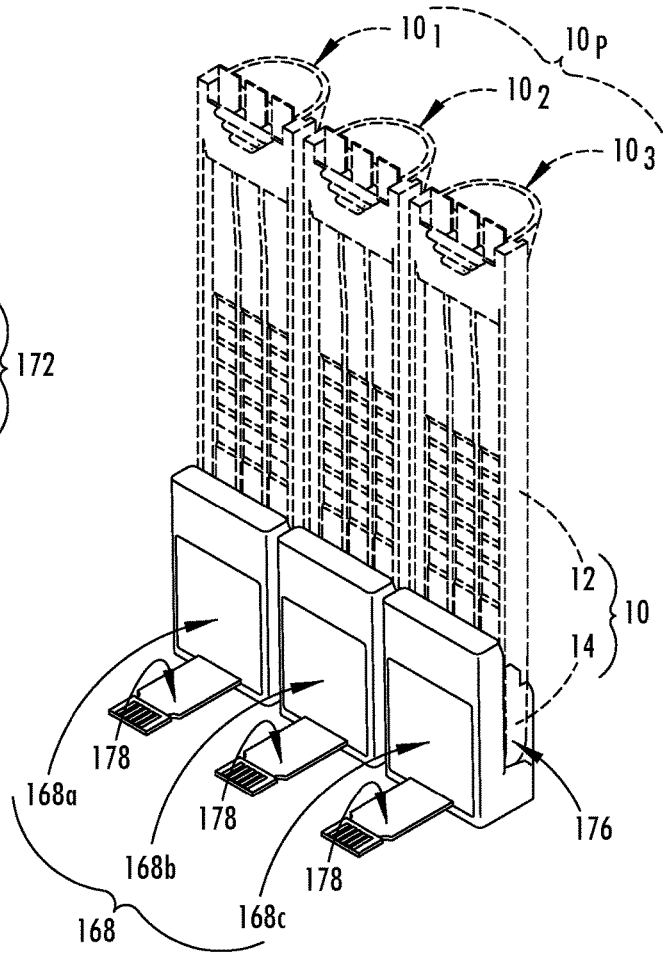
FIG. 31 is a perspective view of a plurality of cartridge heaters interfaced with a plurality of fluid retainer cartridge assemblies.

As seen in FIG. 31, the cartridge-receiving gap 176 defined by the cartridge supporting surface 174a, 174b, 174c of each of the base portion 172a, the front portion 172b and the rear portion 172c may be sized for receiving at least the cap portion 14 of the exemplary fluid retainer cartridge assemblies $10_1$, $10_2$, $10_3$. In an example, the distance $D_{172b}$, defining the cartridge supporting surface 174b of the front portion 172b may be sized for extending across at least the length $L_{56}$ (see, e.g., FIG. 8) of the implement proximal end retainer portion 56 of the tongue-receiving housing 54 of the cap portion 14. In an example, the distance $D_{172c}$ defining the cartridge supporting surface 174c of the rear portion 172c may be sized for extending across at least a portion the length $L_{60}$ (see, e.g., FIG. 9) of at least the arcuate-shaped channel 60 of the body 52 of the cap portion 14. Furthermore, the radius $R_{172c}$ defining the curved or arcuate surface portion of the cartridge supporting surface 174c of the rear portion 172c may be sized for receiving and corresponding to the radius $R_{60}$ (see, e.g., FIGS. 10, 13) or radial geometric component extending into the front surface $52_F$ of the body 52 of the cap portion 14 that defines the arcuate-shaped channel 60.

Once the cap portion 14 is disposed within the cartridge-receiving gap 176 of the body 172 of the at least one cartridge heater 168, portions of the outer surface of the body 52 of the cap portion 14 may be disposed adjacent the cartridge supporting surface 174a, 174b, 174c of each of the base portion 172a, the front portion 172b and the rear portion 172c of the body 172 of the at least one cartridge heater 168 for thermally transferring heat from the at least one cartridge heater 168 to the body 52 of the cap portion 14 (and, ultimately, to the fluid F contained within the body 52 of the cap portion 14). In an example, the proximal end surface $52_P$ of the body 52 of the cap portion 14 may be disposed adjacent or proximate the cartridge supporting surface 174a of the base portion 172a of the body 172 of the at least one cartridge heater 168. Further, in an example, the front surface $52_F$ defined the by implement proximal end retainer portion 56 of the tongue-receiving housing 54 of the cap portion 14 may be disposed adjacent or proximate the cartridge supporting surface 174b of the front portion 172b of the body 172 of the at least one cartridge heater 168. Yet even further, in an example, the rear surface $52_R$ defined by the body 52 of the cap portion 14 may be disposed adjacent or proximate the cartridge supporting surface 174c of the rear portion 172c of the body 172 of the at least one cartridge heater 168.

After the cap portion 14 is disposed within the cartridge-receiving gap 176 of the body 172 of the at least one cartridge heater 168 as described above and the body 52 of the cap portion 14 makes contact with the at least one cartridge heater 168 as described above, the corresponding contact there-between acts as thermal transfer regions, to thereby thermally couple a test strip assay I at the cap portion with the at least one cartridge heater 168. The rear and front surfaces $52_R$ and $52_F$ defined by the body 52 of the cap portion 14 preheats the fluid F before the fluid F flows through the fluid-flow passage 32 formed by the flange 28 of the base portion 12. Thereafter, the implement proximal end retainer portion 56 of the tongue-receiving housing 54 of the cap portion 14 heats the fluid F prior to and after the fluid F comes into contact with the test strip assays $I_1$, $I_2$, $I_3$. The ability to provide heat to both of the rear and front surfaces $52_R$ and $52_F$ of the body 52 of the cap portion 14 and to the implement proximal end retainer portion 56 of the tongue-receiving housing 54 of the cap portion 14 may ensure a more consistent testing temperature of the fluid F.

Figure 34:
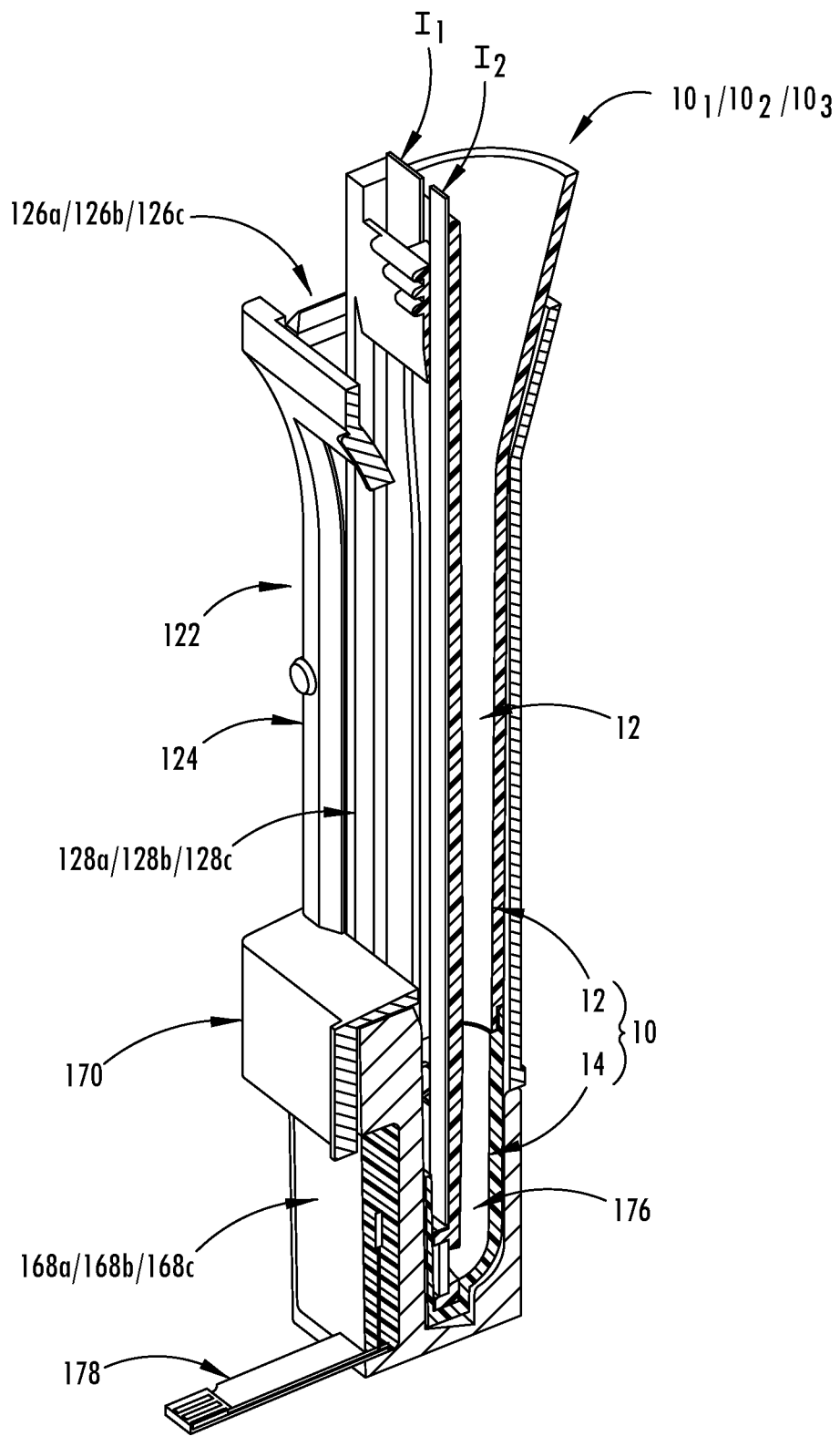
FIG. 34 is a cross-sectional view of the subassembly according to line 34-34 of FIG. 33.

With reference to FIGS. 32-34 and as described above, the base portion 170 (that receives or houses the at least one cartridge heater 168) of the body 124 of the cartridge receiver 122 is located axially opposite the at least one first opening 126 formed by the body 124 of the cartridge receiver 122. Furthermore, as seen in FIGS. 31-32, the at least one cartridge heater 168 may include: a first cartridge heater 168a; a second cartridge heater 168b; and a third cartridge heater 168c. In an example, the first cartridge heater 168a corresponds to, is located opposite and axially aligned with the first cartridge receiving opening 126a of the at least one first opening 126. In another example, the second cartridge heater 168b corresponds to, is located opposite and axially aligned with the second cartridge receiving opening 126b of the at least one first opening 126. In yet another example, the third cartridge heater 168c corresponds to, is located opposite and axially aligned with the third cartridge receiving opening 126c of the at least one first opening 126.

Referring to FIGS. 28-31 and 35, each of the first cartridge heater 168a, the second cartridge heater 168b and the third cartridge heater 168c may be connected to the implement analyzing device IC 140 by one or more communication links 178. The one or more communication conduits 178 may permit the implement analyzing device IC 140 to selectively activate any of the first cartridge heater 168a, the second cartridge heater 168b and the third cartridge heater 168c. Selective activation of any of the first cartridge heater 168a, the second cartridge heater 168b and the third cartridge heater 168c may result from software/instructions stored in the memory hardware 145 and executed by the data processing hardware 143 of the implement analyzing device IC 140.

In an example, selective activation of any of the first cartridge heater 168a, the second cartridge heater 168b and the third cartridge heater 168c may arise from different test types (e.g., specified by the test information 149) to be conducted on the first plurality of test strip assays $I_1$-$I_3$ contained by the first fluid retainer cartridge assembly $10_1$, the second plurality of test strip assays $I_1$-$I_3$ contained by the second fluid retainer cartridge assembly $10_2$ and the third plurality of test strip assays $I_1$-$I_3$ contained by the third fluid retainer cartridge assembly $10_3$, which may each require different testing temperatures. For instance, the test information 149 associated with each test strip assay $I_1$-$I_3$ retained within one of the fluid retainer cartridge assemblies $10_1$-$10_3$ may specify a desired temperature of the fluid (F) retained therein. Accordingly, each of the first cartridge heater 168a, the second cartridge heater 168b and the third cartridge heater 168c that is associated with each of the first, second and third cartridge receiving openings 126a, 126b, 126c may be controlled independently to carry out such non-similar temperature tests.

Referring back to FIGS. 28-30, the front portion 172b and the rear portion 172c of the body 172 are not connected by corresponding side portions. The lack of side portions reduces an amount of heat transfer between neighboring cartridge heaters 168a-168b and 168b-168c, and, thus, between neighboring fluid retainer cartridge assemblies $10_1$, $10_2$, $10_3$ contained therein. By reducing heat transfer between neighboring fluid retainer cartridge assemblies $10_1$, $10_2$, $10_3$, independent heating of each fluid retainer cartridge assembly $10_1$, $10_2$, $10_3$ may be more accurately controlled. Accordingly, cartridge heaters 168a-c may be selectively activated independently from one another such that each heating device 168a-c is thermally coupled to a corresponding removably-inserted fluid retainer cartridge assembly 10 (e.g., assembly $10_1$) and thermally isolated from the one or more other fluid retainer cartridge assemblies 10 (e.g., assemblies $10_2$ and $10_3$). Moreover, each heating device (e.g., each cartridge heater 168a-c) may be selectively deactivated after a prescribed period of time specified by the test information 149. Here, the prescribed period of time may refer to the analysis duration during which the fluid (F) is in contact with the result region R on the one or more test strip assays $I_1$-$I_3$, or the prescribed period of time may refer to a time duration required to heat the fluid (F) to the desired temperature.

Activation of any of the first cartridge heater 168a, the second cartridge heater 168b and the third cartridge heater 168c results in any of the first cartridge heater 168a, the second cartridge heater 168b and the third cartridge heater 168c generating heat. The generated heat by any of the first cartridge heater 168a, the second cartridge heater 168b and the third cartridge heater 168c may be directed to any portion (e.g., the cap portion 14) of the fluid retainer cartridge assembly 10 that is disposed within the cartridge-receiving gap 176 defined by the cartridge supporting surface 174a, 174b, 174c of each of the base portion 172a, the front portion 172b and the rear portion 172c of the body 172 of the at least one cartridge heater 168.

Referring to FIG. 35, the implement analyzing device 100 may also include a fan 180 that is located within the cavity 120. The fan 180 may be secured to one or more of the inner surface 114 of the support member 102 and the inner surface 118 of the housing 104. The fan 180 may include a motor (not shown) that is connected to the implement analyzing device IC 140 by a communication link 182. The motor associated with the fan 180 may be activated or deactivated upon the implement analyzing device IC 140 sending an activation or deactivation signal to the fan 180 by way of the communication link 182.

Activation of the fan 180 may occur in order to cool one or more components that are located within the cavity 120 of the implement analyzing device 100. The one or more components within the cavity 120 that may need to be cooled may include, but is not limited to one or more of the: the imaging device IC 134, the implement analyzing device IC 140 and the at least one cartridge heater 168. In some implementations, the fan 180 may be automatically activated if, for example, the implement analyzing device IC 140 determines (e.g., senses) that the at least one cartridge heater 168 exceeds a predetermined test temperature (i.e., the desired temperature specified by the test information 149) for the purpose of reducing or maintaining the at least one cartridge heater 168 at or a below the predetermined test temperature. Such a determination made by the implement analyzing device IC 140, may occur in response to a temperature and/or humidity sensor 181 positioned within the cavity 120 and communicatively-coupled to the implement analyzing device IC 140 by a communication link 183.

The implement analyzing device 100 may include other components not shown in the Figures. For example, the implement analyzing device 100 may also include a vibration motor that provides haptic feedback during a test or for agitating the fluid F within any fluid retainer cartridge assembly 10. In another example, the implement analyzing device 100 may also include an onboard three axis accelerometer for indicating to a user if the implement analyzing device 100 is not level in order to mitigate an adverse condition that may negatively impact fluid flow within any fluid retainer cartridge assembly 10. In yet another example, the implement analyzing device 100 may also include antennas or sensors for a variety of functions relating to global positioning systems (GPS), radio frequency identification (RFID) recognition, barometer readings and the like; such additional antennas or sensors may provide additional information about testing conditions that may be considered during analysis.

A method for utilizing the implement analyzing device 100 is now described. Firstly, as seen in FIG. 23, at least one fluid retainer cartridge assembly $10_1$, $10_2$, $10_3$ of a plurality of fluid retainer cartridge assemblies $10_P$ may be loaded with one or more of the test strip assays $I_1$, $I_2$, $I_3$. As seen in FIGS. 24A-24B, 25, 26, the at least one fluid retainer cartridge assembly $10_1$, $10_2$, $10_3$ of the plurality of fluid retainer cartridge assemblies $10p$ that have been loaded with the test strip assays $I_1$, $I_2$, $I_3$ then may be interfaced with the implement analyzing device 100, e.g., by inserting the at least one fluid retainer cartridge assembly $10_1$, $10_2$, $10_3$ of the plurality of fluid retainer cartridge assemblies $10p$ through the at least one first opening 126 (e.g., 126a, 126b, and 126c) of the body 124 of the cartridge receiver 122. Alternatively, test strip assays $I_1$, $I_2$, $I_3$ may be loaded into the at least one fluid retainer cartridge assembly $10_1$, $10_2$, $10_3$ of a plurality of fluid retainer cartridge assemblies $10_P$ after the at least one fluid retainer cartridge assembly $10_1$, $10_2$, $10_3$ of a plurality of fluid retainer cartridge assemblies $10_P$ have been interfaced with the implement analyzing device 100. In one embodiment, as seen in FIG. 1B, each loaded at least one fluid retainer cartridge assembly $10_1$, $10_2$, $10_3$ of a plurality of fluid retainer cartridge assemblies $10_P$ may be dosed with an amount of fluid F while, if desired, each loaded at least one fluid retainer cartridge assembly $10_1$, $10_2$, $10_3$ of a plurality of fluid retainer cartridge assemblies $10_P$ is disposed within the implement analyzing device 100. Alternatively, the plurality of fluid retainer cartridge assemblies $10p$ may be dosed with an amount of fluid F before test strip assays $I_1$, $I_2$, $I_3$ are loaded into the at least one fluid retainer cartridge assembly $10_1$, $10_2$, $10_3$ of a plurality of fluid retainer cartridge assemblies $10_P$.

The implement analyzing device 100 may be actuated before, during or after dosing each loaded at least one fluid retainer cartridge assembly $10_1$, $10_2$, $10_3$ of a plurality of fluid retainer cartridge assemblies $10_P$ with the amount of fluid F such that the implement analyzing device 100 can monitor, read, and analyze the one or more of the test strip assays $I_1$, $I_2$, $I_3$ before, during, and after dosing. Actuation of the implement analyzing device 100 may include one or more of the imaging device 136 obtaining one or more images I (see, e.g., FIGS. 25-26) of the of the one or more of the test strip assays $I_1$, $I_2$, $I_3$ and may include activating the at least one cartridge heater 168.

In an example, as seen in FIGS. 25-26, the imaging device 136 of the imaging device IC 134 may continuously capture image data 141 of the one or more of the test strip assays $I_1$, $I_2$, $I_3$. The image data 141 captured by the imaging device 136 are communicated from the imaging device IC 134 to the implement analyzing device IC 140 by way of the communication link 142.

Referring back to FIG. 35, the data processing hardware 143 of the implement analyzing device IC 140 may execute a test strip assay recognition algorithm to detect one or more test strip assays I received by the cartridge receiver 122 based on the image data 141 received by the imaging device 136. For instance, the test strip assay recognition algorithm may determine when a test strip assay $I_1$, $I_2$, $I_3$ is arranged within the region $R_{128}$ of the at least one second opening 128 formed by the body 124 of the cartridge receiver 122 for the purpose of executing an analysis routine on each detected corresponding test strip assay $I_1$, $I_2$, $I_3$ based on the corresponding test information 149. In one embodiment, the test strip assay recognition algorithm may continuously determine whether a test strip assay $I_1$, $I_2$, $I_3$ is arranged within the region $R_{128}$ of the at least one second opening 128 formed by the body 124 of the cartridge receiver 122 for the purpose of executing an analysis routine on each detected corresponding test strip assay $I_1$, $I_2$, $I_3$.

In some scenarios, the test strip assay recognition algorithm analyzes multiple cartridge assemblies $10_1$, $10_2$, $10_3$ through corresponding second openings 128a, 128b, 128c independently from one another to detect whether one or more test strip assays I are arranged in each independent cartridge assembly $10_1$, $10_2$, $10_3$. For instance, the data processing hardware 143 may select any cartridge assembly $10_1$, $10_2$, $10_3$ and use the image data 141 to detect whether one or more test strip assays I are arranged within the selected port/cartridge assembly $10_1$, $10_2$, $10_3$ independently from the other cartridge assemblies $10_1$, $10_2$, $10_3$. Thus, the imaging device 136 may capture image data 141 directed toward the region $R_{128}$ of the at least one second opening 128 formed by the body 124 of the cartridge receiver 122 and the data processing hardware 143 of the implement analyzing device IC 140 may use the image data 141 to individually monitor each cartridge assembly $10_1$, $10_2$, $10_3$ for the presence of one or more test strip assays I arranged therein. Accordingly, each cartridge assembly 10 that has been inserted into the cartridge receiver 122 may be monitored separately for the presence of test strip assays I, or two or more cartridge assemblies 10 may be monitored simultaneously for the presence of test strip assays I. Similarly, each cartridge assembly 10 that has been inserted into the cartridge receiver 122 may be independently heated and/or the capture image data 141 independently analyzed (for the test strip assays $I_1$, $I_2$, $I_3$ in that cartridge assembly 10) separate from any other cartridge assembly 10; or two or more cartridge assemblies 10 may be simultaneously heated and/or the capture image data 141 simultaneously analyzed (for the test strip assays $I_1$, $I_2$, $I_3$ in those cartridge assemblies 10). Furthermore, the test strip assay recognition algorithm may analyze the image data 141 received from the imaging device 136 to identify one or more indicia markings disposed on each detected test strip assay $I_1$, $I_2$, $I_3$. The indicia markings may include at least one of the barcode data B, the alphanumerical data #, or the color data (see, FIG. 1A). Thereafter, the data processing hardware 143 may determine the unique test strip identifier 147 associated with each detected test strip assay $I_1$, $I_2$, $I_3$ based on the identified indicia markings, and retrieve the test information 149 associated with each detected test strip assay $I_1$, $I_2$, $I_3$ using the corresponding unique test strip identifier 147. Here, the memory hardware 145 contains a database/data store linking unique test strip identifiers 147 with corresponding test information 149. Manufacturers of the test strip assays may provide the test strip information 149. The memory hardware 145 may be internal (e.g., associated with the implement analyzing device IC 140) or externally connected as one of the data input/output devices 162. Additionally or alternatively, the optical scanner 158 may scan the barcode data B and provide the scanned barcode data B to the data processing hardware 143 for determining the unique test strip identifier 147. Here, the unique test strip identifier 147 may be obtained for test strip assays $I_1$, $I_2$, $I_3$ prior to being inserted into the implement analyzing device 100.

With continued reference to FIG. 35, the data processing hardware 143 may execute, for each detected test strip assay $I_1$, $I_2$, $I_3$, the analysis routine on the corresponding test strip assay I after being contacted with the fluid F based on the corresponding test information 149. The analysis routine is configured to analyze the detectable signal DS (e.g., a color change or intensity information) within the result region R located on the corresponding test strip assay I based on the image data 141, and determine the test result 190 indicating the presence and/or concentration of the chemical analyte within the fluid F. Each test result 190 may be tagged with the corresponding unique test strip identifier 147 and stored in the memory hardware 145. In some examples, the data processing hardware 143 displays the test result 190 for each detected test strip assay I on the graphical user interface 153 executing on the touchscreen 154.

In some implementations, the data processing hardware 143 automatically executes an analysis routine on a corresponding detected test strip assay I in response to obtaining the test information 149 associated therewith. In other implementations, after obtaining the test information 149, the data processing hardware 143 analyzes the image data 141 received from the imaging device 136 to measure a level of the fluid (F) retained by the corresponding removably-inserted fluid retainer cartridge assembly 10, and determines whether the measured level of the fluid F is at least a threshold fluid level. The test information 149 may specify the threshold fluid level, whereby the threshold fluid level is a volume of fluid F sufficient for contacting the results region R on each detected test strip assay I retained by the corresponding fluid retainer cartridge assembly 10 to initiate the chemical reaction (if any) with a chemical analyte. Thereafter, the data processing hardware 143 may execute the analysis routine on each detected test strip assay I retained by the corresponding fluid retainer cartridge assembly 10 in response to determining the measured level of the fluid is at least the threshold fluid level. In some examples, the data processing hardware 143 initiates a timer responsive to the measured level of the fluid F being at least the threshold fluid level. In these examples, the analysis routine determines the test result 190 associated with each detected test strip assay I retained by the corresponding fluid retainer cartridge assembly 10 when the timer satisfies the analysis duration specified by the test information 149. In some configurations, the cap portion 14 of the fluid retainer cartridge assembly 10 is translucent so that the fluid F is visible through the second opening 126 of the cartridge 122 and, thus, measurable from the image data 141 captured by the imaging device 136.

Similar to how the test strip assay recognition algorithm analyzes multiple cartridge assemblies $10_1$, $10_2$, $10_3$ independently from one another for detecting the presence of test strip assays I, the data processing hardware 143 may execute the analysis routine on each detected test strip assay I retained by a corresponding selected fluid retainer cartridge assembly 10 independently from other detected test strip assays I retained by other corresponding fluid retainer cartridge assemblies 10. Thus, while cartridge assemblies $10_1$, $10_2$, $10_3$ may each retain at least one test strip assay I detected by the recognition algorithm, the analysis routine may analyze the at least one test strip assay I retained by the cartridge assembly $10_2$ independently from the at least one test strip assay I retained by the other cartridge assembly $10_1$, $10_3$. For instance, the analysis routine may analyze assays I within cartridge assembly $10_2$ while waiting for the measured fluid level of the fluid within at least one of the other cartridge assemblies $10_1$, $10_3$ to reach the threshold fluid level. In another scenario, the analysis routine may analyze assays I retained within cartridge assembly $10_2$ the recognition algorithm is continuously monitoring the other cartridge assemblies $10_1$, $10_3$ for the presence of test strip assays I. In some implementations, the analysis routine analyzes test strip assays I retained by at least two different cartridge assemblies 10 simultaneously.

In an example, activation of the at least one cartridge heater 168 during, for example, a period of time results in the at least one cartridge heater 168 imparting heat to at least, for example, the cap portion 14 of the fluid retainer cartridge assembly 10, which may also contain the fluid F. The imparted heat serves to incubate at least, for example, the cap portion 14 of the fluid retainer cartridge assembly 10 if a particular test requires the fluid F contained therein to be heated to a desired temperature specified by the test information 149.

In some implementations, the color and/or intensity information associated with the detectable signal DS includes line intensity of one or more result lines (e.g. control lines) superimposed in the result region R of the corresponding test strip assay $I_1$, $I_2$, $I_3$. The line intensity of the one or more result lines is analyzed by the analysis routine. In some examples, to expedite the analysis routine, the analysis routine may be further configured to determine a rate of change in the line intensity of the one or more result lines, and predict the test result 190 indicating the presence and/or concentration of the chemical analyte before result lines are fully developed, i.e., before the end of the analysis duration.

Before or after the image data 141 is ready to be analyzed, the data processing hardware 143 (i.e., processor) of the implement analyzing device IC 140 may also execute a series of result line centering routines each used to ensure that the region of interest (i.e. result region R) for each test and result line is centered. Line centering information specified by the testing information 149 associated with each test strip assay $I_1$, $I_2$, $I_3$ may vary by the lot in which each test strip assay $I_1$, $I_2$, $I_3$ was manufactured. In some instances, the series of line centering algorithms may auto-detect and position the center using the line centering information, even with the inherent positional variation. The line intensity of each line on each test strip assay $I_1$, $I_2$, $I_3$ is read and the quantified results are calculated, displayed and saved in the memory hardware 145. Accordingly, execution of the analysis routine may include execution of the result line centering routine on the corresponding test strip assay (I) to center one or more result lines superimposed in the result region R. Here, the result line centering routine is configured to identify the one or more result lines superimposed in the result region R based on the image data 141 received from the imaging device 136, and adjust a position of the one or more result lines to align with result line centering information specified by the test information 149.

Figure 36:
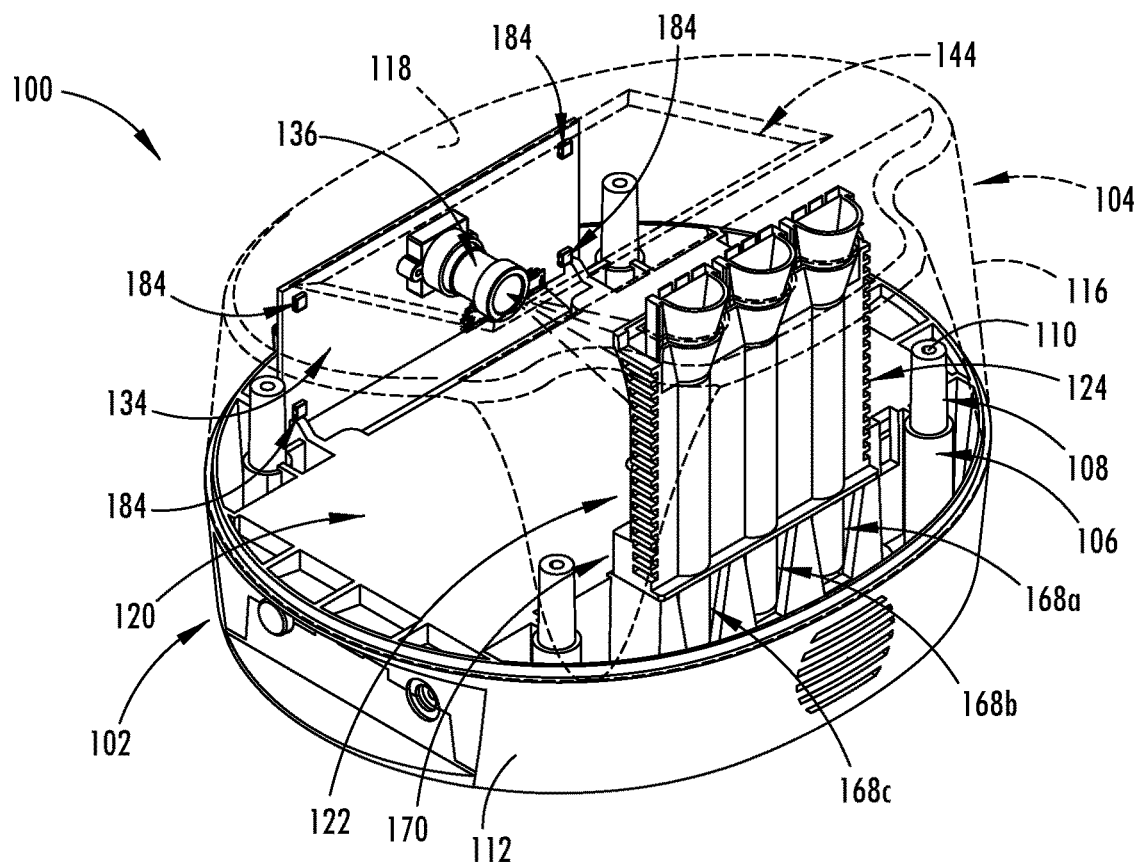
FIG. 36 is a partial perspective of the implement analyzing device with the housing removed from a support member of the implement analyzing device.

Referring to FIG. 36, the implement analyzing device 100 may further include a plurality of light sources 184 arranged within the cavity 120 and directed toward the region 8128 of the at least one second opening 128 formed by the body 124 of the cartridge receiver 122 for the purpose of illuminating regions of each test strip assay $I_1$, $I_2$, $I_3$ that is to be imaged by the imaging device 136 as described above.

In an example, the plurality of light sources 184 are secured to the imaging device IC 134. In an implementation, the plurality of light sources 184 include light emitting diode (LED) light sources. In some instances, the plurality of light sources 184 include eight LED light sources. The plurality of LED light sources may emit any desired type of color light (that is defined, e.g., by wavelength) including but not limited to: visible light; white light; colored light; and infrared light.

In an example, the imaging device IC 134 may include two sets of four LED light sources 184. In an example, the imaging device IC 134 may independently operate each LED light source 184 of the two sets of four LED light sources 184. Furthermore, in an example, the imaging device IC 134 may include two independent lighting circuits that allow for different illumination conditions within the cavity 120 that may increase the potential of test types that may be conducted by the implement analyzing device 100.

The method may also include one or more calibration steps for ensuring that the inter-unit variability is low. Many of the calibration steps may be performed a single time before the implement analyzing device 100 is utilized for a first time. Calibration may occur at the manufacturer or by a user in the field.

Figure 37:
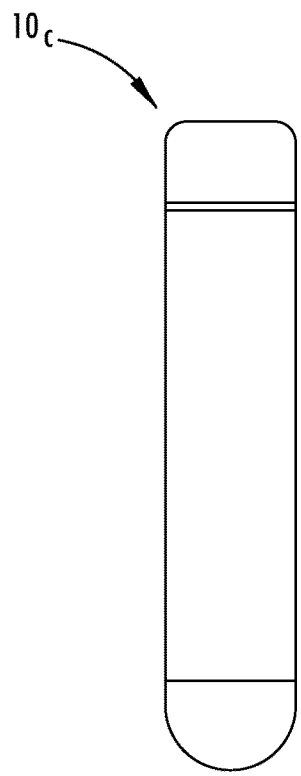
FIG. 37 is a rear view of a calibration cartridge that is interfacably-connectable to the implement analyzing device.
Figure 38:
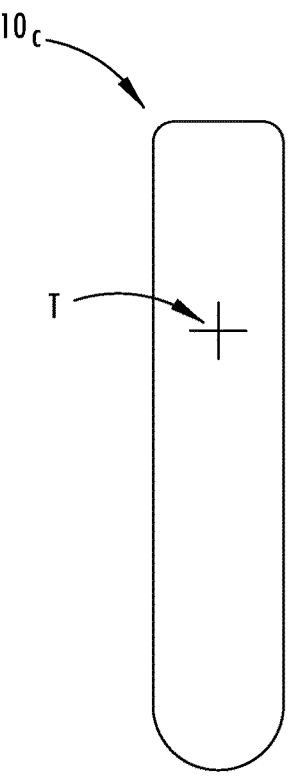
FIG. 38 is a front view of the calibration cartridge of FIG. 37.

In an example, illumination calibration may set an illumination percentage of all the plurality of light sources 184 associated with the imaging device IC 134. A target brightness may be determined through testing and the goal of the illumination calibration routine is to match actual brightness to a target brightness. Referring to FIGS. 37-38, illumination calibration may be conducted by inserting a calibration cartridge 10c into a central port (e.g., the second cartridge receiving opening 126b) of the at least one first opening 126 formed by the body 124 of the cartridge receiver 122. The imaging device 136 may obtain an image of the calibration cartridge 10c, which is subsequently provided to the implement analyzing device IC 140 for conducting the calibration process. An average brightness value is determined for the region of interest of the calibration cartridge 10c with all settings of the imaging device 136 set to default values. The illumination value is then adjusted so that the average brightness value is within a set tolerance of the target brightness value.

In another example, white balance calibration may be used for setting one or more color balance settings on the imaging device IC 134; calibrating these values reduces a color variance between different implement analyzing devices 100 due to any inherent differences of the imaging devices 136 and plurality of light sources 184 installed therein. The same calibrator cartridge $10_C$ and region of interest described above may be used for achieving white balance calibration as was used for brightness calibration. The imaging device 136 may obtain an image of the calibration cartridge $10_C$, which is subsequently provided to the implement analyzing device IC 140 for conducting the calibration process. In some instances, the red balance value and the blue balance value are determined through an iterative process aimed at reducing the chrominance values to zero.

In yet another example, a lens calibration routine (for calibrating a lens associated with/attached to the imaging device 136) may be used for post-processing correction of a vignetting effect that is inherent in the imaging device/lens setup. The lens calibration routine (that is conducted in response to the imaging device 136 obtaining an image of the calibration cartridge $10_C$, which is subsequently provided to the implement analyzing device IC 140 for conducting the calibration process) may determine the intensity throughout the calibrator cartridge $10_C$ and fits a curve to the white region; this curve can then be used to correct the image, reducing the color variance between ports within the implement analyzing device 100.

In another example, port calibration may be used for locating each of the first, second and third cartridge receiving openings 126a, 126b, 126c to make the identification of each test strip assay $I_1$, $I_2$, $I_3$ easier and more accurate. The first, second and third cartridge receiving openings 126a, 126b, 126c are found by inserting a calibrator cartridge $10_C$ into each of the first, second and third cartridge receiving openings 126a, 126b, 126c. The imaging device 136 may obtain an image of the calibration cartridge $10_C$, which is subsequently provided to the implement analyzing device IC 140 for conducting the calibration process. The black regions of the calibrator cartridge $10_C$ are used as fiducial markers, allowing for accurate determination of the cartridge boundaries. Techniques such as edge detection may additionally or alternatively be used to locate the boundary of each port within the captured image data 141.

The data processing hardware 143 of the implement analyzing device IC 140 may execute a test strip assay recognition algorithm to detect one or more test strip assays I received by the cartridge receiver 122 based on the image data 141 received by the imaging device 136. A third test strip assay 13 may be detected and includes a location within the first fluid retainer cartridge assembly $10_1$, while first, second, and third test strip assays $I_1$, $I_2$, $I_3$ may be detected and include locations within the second fluid retainer cartridge assembly $10_2$. Both the port calibration and test strip recognition algorithm may use a dynamic threshold to more accurately identify the bounds. When a strip is found, its specific position within in the cartridge receiver 122 can be saved for testing purposes. The data processing hardware 143 may execute the recognition algorithm to continuously look for the presence of test strips to automatically trigger the analysis. This feature can also be used to monitor the test and ensure the strip has not been removed during analysis.

In yet another example, crosshair calibration is an additional positional calibration of the internal components of the implement analyzing device 100. In an example, a t-shaped crosshair T (see, e.g., FIG. 38) of the calibrator cartridge $10_C$ allows for both X and Y positional calibration offsets to be generated; the offsets are determined as the distance, both in X and in Y, from the expected location. The imaging device 136 may obtain an image of the calibration cartridge 10c, which is subsequently provided to the implement analyzing device IC 140 for conducting the calibration process. Using the offsets, the implement analyzing device 100 can more accurately locate specific characteristics on the cartridges or inserted test strip assays $I_1$, $I_2$, $I_3$.

In another example, a cartridge track may include white circular markers on either side that are imaged by the imaging device 136, which is subsequently provided to the implement analyzing device IC 140 for conducting the calibration process for validating both position of internal components as well as illumination. The position and illumination values of these spots are saved during the overall calibration routine. These values are then checked every time the implement analyzing device 100 is turned on. If the position or illumination of the regions of interest are outside of the set threshold, the validation will not pass. This can indicate to the user that there is an issue with the implement analyzing device 100 that could cause invalid results. If the illumination values are not within tolerance for the predetermined regions of interest, this could indicate that the alignment of the internal components has been compromised or that the plurality of light sources 184 associated with the imaging device IC 134 are not functioning how they did during calibration.

Figure 39:
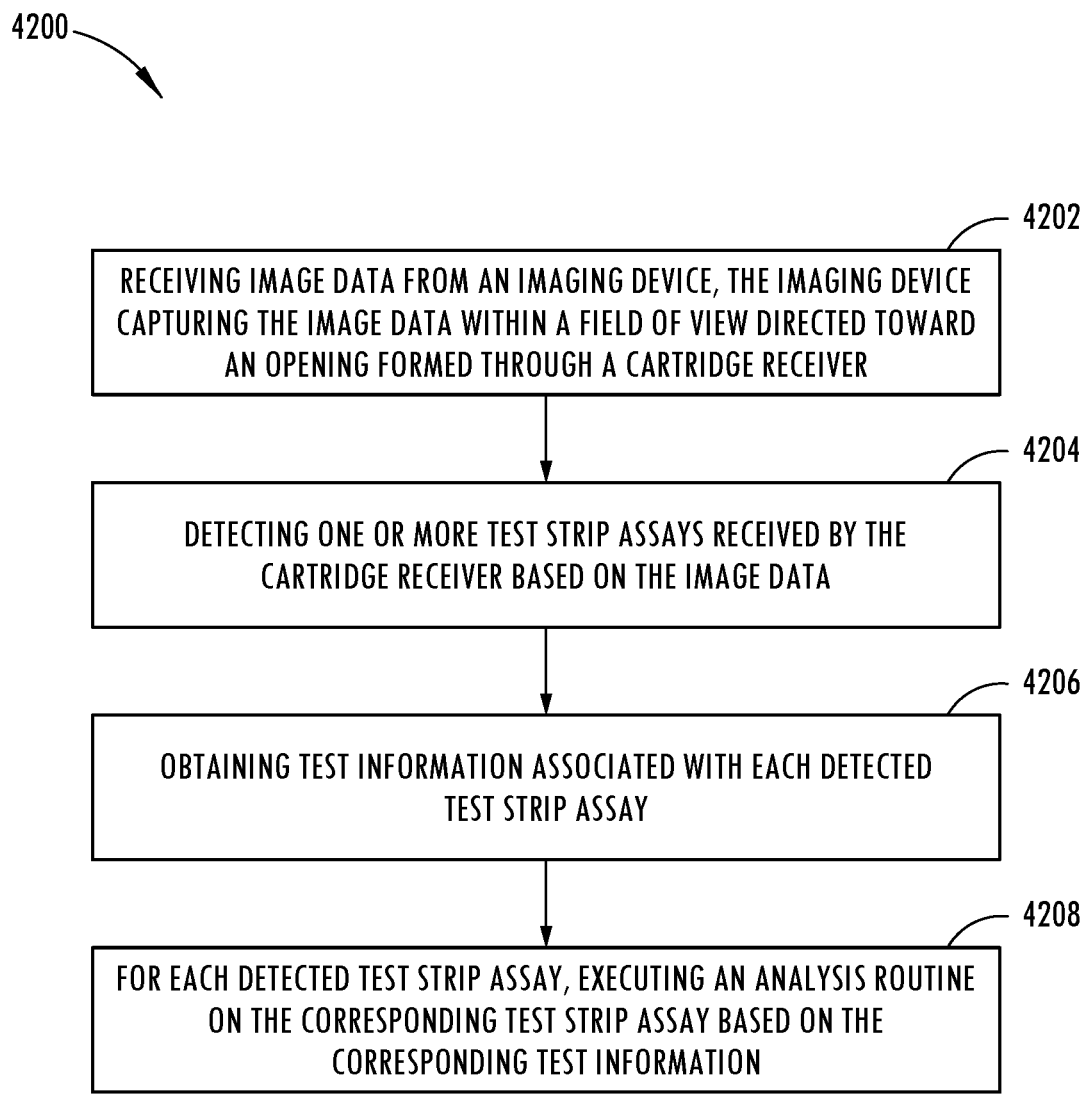
FIG. 39 is a flow chart of an example method for determining a test result indicating a presence and/or concentration of a chemical analyte within a fluid in contact with a test strip assay.

FIG. 39 is a flow chart of an example method 4200 for determining a test result 190 indicating a presence and/or concentration of a chemical analyte within a fluid F in contact with a test strip assay I. The method includes, at block 4202, receiving image data 141 from an imaging device 136. The imaging device 136 captures the image data 141 within a field of view directed toward an opening 128 formed through a cartridge receiver 122. At block 4204, the method 4200 includes detecting, by the data processing hardware 143, one or more test strip assays I received by the cartridge receiver 122 based on the image data 141. Here, the test strip assays I are configured to chemically react with the chemical analyte after contact with a fluid F. At block 4206, the method 4200 includes obtaining, by the data processing hardware 143, test information 149 associated with each detected test strip essay I. For instance, the test information 149 may be retrieved from memory hardware 145 using a unique test strip identifier 147 linked to the test information 149. For each detected test strip assay I, the method 4200 includes, at block 4408, executing, by the data processing hardware 143, an analysis routine on the corresponding test strip assay I based on the corresponding test information 149. The analysis routine is configured to analyze a detectable signal DS (e.g., color and/or intensity information) within a result region R located on the corresponding test strip assay (I) based on the image data 141 received from the imaging device 136, and determine the test result 190 indicating the presence and/or concentration of the chemical analyte within the fluid (F) based on the analyzed color and/or intensity information.

A number of implementations have been described. Nevertheless, it will be understood that various modifications may be made without departing from the spirit and scope of the disclosure. Accordingly, other implementations are within the scope of the following claims.

What is claimed is:

1. An implement analyzing system, comprising:
    at least one fluid retainer cartridge assembly that is sized to receive at least one implement for indicating one or both of a presence and a concentration of an analyte; and
    an implement analyzing device that is configured to receive the at least one fluid retainer cartridge assembly, wherein the implement analyzing device includes
    a support member,
    a housing connected to the support member, wherein each of the support member and the housing defines an outer surface and an inner surface, wherein the inner surface of each of the support member and the housing form a cavity,
    a vertically-oriented cartridge receiver disposed within the cavity and connected to the inner surface of one or both of the support member and the housing, wherein the cartridge receiver includes a proximal end and a distal end, and wherein the cartridge receiver defines at least one cartridge viewing window and at least one first opening adjacent the proximal end of the cartridge receiver,
    at least one cartridge heater disposed within the cavity and located at the distal end of the cartridge receiver,
    an imaging device disposed within the cavity and arranged opposite the at least one cartridge viewing window, and
    an implement analyzing device integrated circuit communicatively coupled to the at least one cartridge heater and the imaging device, wherein the implement analyzing device integrated circuit includes data processing hardware that executes instructions stored on memory hardware for operating the at least one cartridge heater and the imaging device.

2. The implement analyzing system of claim 1, wherein the at least one first opening of the cartridge receiver is aligned with a cartridge receiver passage extending through the housing.

3. The implement analyzing system of claim 2, wherein the at least one cartridge heater is defined by a body that includes:
    a base portion, a front portion, and a rear portion;
    wherein each of the base portion, the front portion and the rear portion is defined by a cartridge supporting surface;
    wherein the cartridge supporting surface of each of the base portion and the front portion are defined by a substantially flat surface; and wherein the cartridge supporting surface of the rear portion includes a substantially flat surface that is interrupted by a curved or arcuate surface portion.

4. The implement analyzing system of claim 2, wherein the at least one first opening is defined by:
    a first cartridge receiving opening;
    a second cartridge receiving opening; and
    a third cartridge receiving opening.

5. The implement analyzing system of claim 4, wherein the at least one cartridge heater includes:
    a first cartridge heater;
    a second cartridge heater; and
    a third cartridge heater, wherein the first cartridge heater corresponds to, is located opposite and axially aligned with the first cartridge receiving opening of the at least one first opening, wherein the second cartridge heater corresponds to, is located opposite and axially aligned with the second cartridge receiving opening of the at least one first opening, wherein the third cartridge heater corresponds to, is located opposite and axially aligned with the third cartridge receiving opening of the at least one first opening.

6. The implement analyzing system of claim 5, wherein each of the first cartridge heater, the second cartridge heater and the third cartridge heater are connected to the implement analyzing device integrated circuit.

7. The implement analyzing system of claim 6, wherein the implement analyzing device integrated circuit selectively activates each of the first cartridge heater, the second cartridge heater and the third cartridge heater.

8. The implement analyzing system of claim 3, wherein the front portion and the rear portion of the body are not connected by side portions.

9. The implement analyzing system of claim 1 further comprising:
    a fan located within the cavity, wherein the fan is connected to the implement analyzing device integrated circuit; or
    a temperature sensor located within the cavity, wherein the temperature sensor is connected to the implement analyzing device integrated circuit.

10. The implement analyzing system of claim 1 further comprising:
    an imaging device integrated circuit connected to the imaging device, wherein the imaging device integrated circuit is communicatively-coupled to the implement analyzing device integrated circuit.

11. The implement analyzing system of claim 10, further comprising:
    a plurality of light sources arranged within the cavity and connected to the imaging device integrated circuit, wherein the plurality of light sources are directed toward the at least one cartridge viewing window.

12. The implement analyzing system of claim 11, wherein the imaging device integrated circuit independently operates each light source of the plurality of light sources.

13. The implement analyzing system of claim 12, wherein the plurality of light sources are light emitting diode light sources.

14. The implement analyzing system of claim 1, wherein the imaging device is aligned with a region of the at least one cartridge viewing window.

15. The implement analyzing system of claim 1, wherein the cartridge receiver is sized to receive more than one fluid retainer cartridge assembly.

16. The implement analyzing system of claim 15, wherein the at least one cartridge viewing window of the cartridge receiver is sized to permit the imaging device to capture image data from more than one fluid retainer cartridge assembly.

17. The implement analyzing system of claim 1, wherein one or both of the support member and the housing forms a fluid overflow passage.

18. The implement analyzing system of claim 1, wherein the cartridge receiver is formed from a first material and at least one cartridge heater is formed from a second material, and wherein the first material is different from the second material.

19. A method comprising:
obtaining the implement analyzing system according to claim 1,
obtaining at least one implement;
obtaining a test sample;
inserting the at least one implement into the cartridge receiver;
pouring the test sample into the cartridge receiver;
receiving, at the data processing hardware, image data from the imaging device, the imaging device capturing the image data within a field of view directed toward the at least one cartridge viewing window of the cartridge receiver;
obtaining, by the data processing hardware, test information associated with the at least one implement;
executing, by the data processing hardware, an analysis routine on the test information; and
determining a test result indicating one or both of the presence and the concentration of the analyte.

20. The method of claim 19, wherein the at least one fluid retainer cartridge assembly includes two fluid retainer cartridge assemblies and the at least one implement includes two implements; and
wherein the inserting step includes inserting one implement into one of the two fluid retainer cartridge assemblies and inserting the other implement into the other of the fluid retainer cartridge assemblies.

21. The method of claim 19, wherein executing the analysis routine comprises executing a first analysis routine on a first implement and a second analysis routine on a second implement.

22. The method of claim 21, wherein the first and second implements are retained by a single fluid retainer cartridge assembly inserted into the cartridge receiver.

23. An implement analyzing device that is sized for receiving more than one fluid retainer cartridge assembly, comprising:
a support member;
a housing connected to the support member, wherein each of the support member and the housing defines an outer surface and an inner surface, wherein the inner surface of each of the support member and the housing form a cavity;
a vertically-oriented cartridge receiver disposed within the cavity and connected to the inner surface of one or both of the support member and the housing, wherein the cartridge receiver includes a proximal end and a distal end, and wherein the cartridge receiver defines at least one cartridge viewing window and at least one first opening adjacent the proximal end of the cartridge receiver;
at least one cartridge heater disposed within the cavity and located at the distal end of the cartridge receiver;
an imaging device disposed within the cavity; and
an implement analyzing device integrated circuit communicatively coupled to the at least one cartridge heater and the imaging device, wherein the implement analyzing device integrated circuit includes data processing hardware that executes instructions stored on memory hardware for operating the at least one cartridge heater and the imaging device,
wherein the cartridge receiver includes a lower surface portion,
wherein the at least one cartridge heater includes a front portion having a first upper surface portion and a rear portion having a second upper surface portion, and the first upper surface portion is offset from the second upper surface portion,
wherein the lower surface portion of the cartridge receiver is disposed adjacent the first and second upper surface portions of the at least one cartridge heater, and
wherein the cartridge receiver is connected to the at least one cartridge heater.

24. The implement analyzing device of claim 23, wherein the at least one first opening of the cartridge receiver is aligned with a cartridge receiver passage extending through the housing.

25. The implement analyzing device of claim 23, wherein the imaging device is aligned with a region of the at least one cartridge viewing window.

26. The implement analyzing device of claim 23, wherein the cartridge receiver is sized to receive more than one fluid retainer cartridge assembly.

27. The implement analyzing device of claim 26, wherein the at least one cartridge viewing window of the cartridge receiver is sized to permit the imaging device to capture image data from more than one fluid retainer cartridge assembly.

* * * * *